United States Patent [19]

Eizenhöfer et al.

[11] Patent Number: 5,420,256
[45] Date of Patent: May 30, 1995

[54] 2-AMINO-4-PHENYLAMINO-1,3,5-TRIAZINYL REACTIVE DYESTUFFS, PROCESS FOR THEIR PREPARATION AND THEIR USE DYE CELLULOSE OR POLYAMIDES

[75] Inventors: Thomas Eizenhöfer, Cologne; Wolfgang Harms, Odenthal; Karl-Josef Herd, Odenthal-Holz, all of Germany

[73] Assignee: Bayer Aktiengesellschaft, Leverkusen, Germany

[21] Appl. No.: 9,436

[22] Filed: Jan. 27, 1993

Related U.S. Application Data

[63] Continuation of Ser. No. 839,457, Feb. 20, 1992, abandoned.

[30] Foreign Application Priority Data

Feb. 27, 1991 [DE] Germany ............... 41 06 099.7
Nov. 29, 1991 [DE] Germany ............... 41 39 319.8

[51] Int. Cl.⁶ ............... C09B 62/04; C09B 62/503; D06P 1/38; C07C 317/28
[52] U.S. Cl. ............... 534/618; 534/605; 534/612; 534/617; 534/624; 534/625; 534/632; 534/634; 534/635; 534/636; 534/637; 534/638; 540/126; 544/76; 544/189
[58] Field of Search ............... 534/605, 612, 618, 624, 534/625, 632, 634, 635, 636, 637, 638; 540/126; 544/76, 189

[56] References Cited

U.S. PATENT DOCUMENTS

| | | | |
|---|---|---|---|
| 4,396,549 | 8/1983 | Nakamatsu et al. | 540/126 |
| 4,622,390 | 11/1986 | Meininger et al. | 534/637 X |
| 4,626,589 | 12/1986 | Omura et al. | 534/637 X |
| 4,720,542 | 1/1988 | Omura et al. | 534/618 |
| 4,730,038 | 3/1988 | Meininger et al. | 534/638 X |
| 5,068,327 | 11/1991 | Miyamoto et al. | 544/76 |

FOREIGN PATENT DOCUMENTS

| | | |
|---|---|---|
| 0085025 | 8/1983 | European Pat. Off. |
| 0085654 | 8/1983 | European Pat. Off. |
| 307817 | 3/1989 | European Pat. Off. ............ 534/638 |
| 46-41432 | 12/1971 | Japan ............... 534/638 |
| 47-23708 | 7/1972 | Japan . |
| 9109914 | 7/1991 | WIPO . |

OTHER PUBLICATIONS

Asahi et al, *Chemical Abstracts*, vol. 78, No. 59786z (1973).
Japanese Abstract A-72-23708 (Jul. 1, 1972).

*Primary Examiner*—Mary C. Lee
*Assistant Examiner*—Fiona T. Powers
*Attorney, Agent, or Firm*—Sprung Horn Kramer & Woods

[57] ABSTRACT

Reactive dyestuffs have the following formula

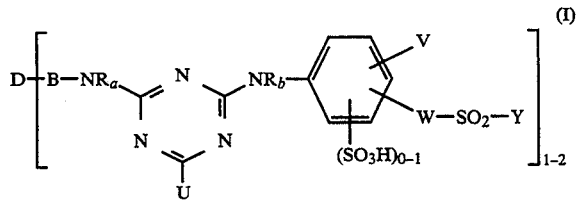

in which

D is the radical of an organic dyestuff

B is a direct bond or a bridging member on a ring C atom of an aromatic-carbocyclic or on a ring C atom or N atom of an aromatic-heterocyclic ring in D, $R_a$, $R_b$, identical or different, are H, $C_1$-$C_4$-alkyl or $C_1$-$C_4$-alkyl substituted by OH, CN, $CO_2H$, $OSO_3H$ or $SO_3H$, U is Cl, F or a pyridinium radical which is unsubstituted or substituted by $CO_2H$, $CONH_2$, $SO_3H$ or $C_1$-$C_4$-alkyl, W is straight-chain or branched $C_1$-$C_6$-alkylene, Y is $CH=CH_2$ or $CH_2$—$CH_2$—X, in which X is a radical which can be eliminated by alkali, V is H, halogen, $C_1$-$C_4$-alkoxy, $C_1$-$C_3$-alkyl, CN, COOH, $CONH_2$, $SO_3H$.

10 Claims, No Drawings

2-AMINO-4-PHENYLAMINO-1,3,5-TRIAZINYL REACTIVE DYESTUFFS, PROCESS FOR THEIR PREPARATION AND THEIR USE DYE CELLULOSE OR POLYAMIDES

This application is a continuation of application Ser. No. 839,457, filed Feb. 20, 1992, now abandoned.

The present invention relates to new water-soluble reactive dyestuffs, processes for their preparation and their use for dyeing.

Dyeing with reactive dyestuffs has recently led to increasing demands on the quality and economy of the dyeing processes. As a result, there is still a demand for new reactive dyestuffs which have improved properties with respect to fastness properties and processability. EP-A-307 817 and JP-A-72/23708 have already disclosed reactive dyestuffs which are based on azo dyestuffs and have two reactive groups.

The present invention relates to new reactive dyestuffs of the formula

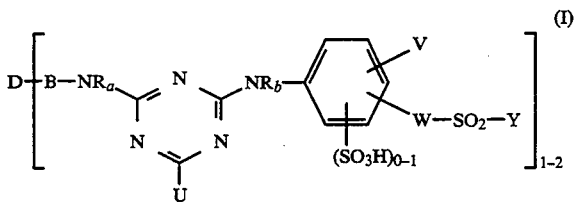

in which
D is the radical of an organic dyestuff
B is a direct bond or a bridging member on a ring C atom of an aromatic-carbocyclic or on a ring C atom or N atom of an aromatic-heterocyclic ring in D,
$R_a$, $R_b$, identical or different, are H, $C_1$–$C_4$-alkyl or $C_1$–$C_4$-alkyl substituted by OH, CN, $CO_2H$, $OSO_3H$ or $SO_3H$,
U is Cl, F or a pyridinium radical which is unsubstituted or substituted by $CO_2H$, $CONH_2$, $SO_3H$ or $C_1$–$C_4$-alkyl,
W is straight-chain or branched $C_1$–$C_6$-alkylene,
Y is $CH=CH_2$ or $CH_2$—$CH_2$—X, in which
X is a radical which can be eliminated by alkali,
V is H, halogen, $CC_1$–$C_4$-alkoxy, $CC_1$–$C_3$-alkyl, CN, COOH, $CONH_2$,
with the proviso that
a) D is the radical of a dyestuff from the formazan, phthalocyanine, anthraquinone and triphendioxazine series if W is —$CH_2$—,
b) D is the radical of a dyestuff from the formazan, phthalocyanine, anthraquinone and triphendioxazine series and
U has the abovementioned meaning if W is $C_2$-alkylene.
or
c) D is the radical of an organic dyestuff and U is F or a pyridinium radical which is unsubstituted or substituted by $CO_2H$, $CONH_2$, $SO_3H$ or $C_1$–$C_4$-alkyl. if W is $C_2$-alkylene.

D is preferably the radical of an organic dyestuff from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series.

X is preferably $OSO_3H$, $SSO_3H$, $OCOCH_3$, $OPO_3H_2$, $OSO_2CH_3$, SCN, $NHSO_2CH_3$, Cl, F, Br, $OCOC_6H_5$, $OSO_2$—$C_6H_4CH_3$, $N(CH_3)_3$; if W is —$CH_2$—, X is in particular $OSO_3H$, Cl, Br, F.

Examples of suitable bridging members B, which may be identical or different, are:

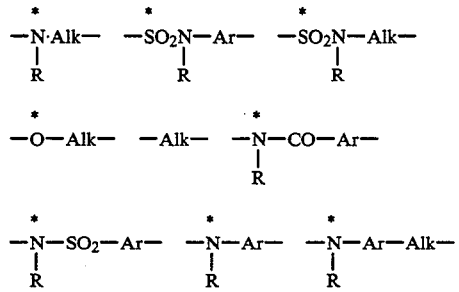

in which the asterisk marks the linkage point with D,
R has a meaning mentioned under $R_a$,
Alk is straight-chain or branched $CC_1$–$C_6$-alkylene which may be interrupted by hetero atoms, such as O, S,

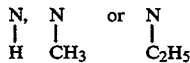

Ar is substituted or unsubstituted phenylene or naphthylene and
Alk or Ar can contain further substituents, for example F, Cl, Br, $C_1$–$C_4$-alkyl, $C_1$–$C_4$-alkoxy, carboxyl or sulpho.

The radical D in formula (1) can be substituted in the usual manner. Examples of further substituents of the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulphato-ethylamino, sulphobenzylamino, N,N-disulphobenzylamino, alkoxycarbonyl having 1 to 4 carbon atoms in the alkoxy radical, such as methoxycarbonyl or ethoxycarbonyl, alkylsulphonyl having 1 to 4 carbon atoms, such as methylsulphonyl or ethylsulphonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulphamoyl, N-alkylsulphamoyl having 1 to 4 carbon atoms, such as N-methylsulphamoyl, N-propylsulphamoyl, N-isopropylsulphamoyl or N-butylsulphamoyl, N-(4-hydroxyethyl)sulphamoyl, N,N-di-(β-hydroxyethyl)sulphamoyl, N-phenylsulphamoyl, ureido, hydroxyl, carboxyl, sulphomethyl or sulpho. The radical D preferably contains one or more sulpho groups. Reactive dyestuffs of the formula (1) in which D is the radical of an azo dyestuff contain as substituents in particular methyl, ethyl, methoxy, ethoxy, acetylamino, benzoylamino, amino, chlorine, bromine, ureido, hydroxyl, carboxyl, sulphomethyl or sulpho.

The radical $R_a$ and $R_b$ in formula (1) is, if it is an alkyl radical, straight-chain or branched; it can be further substituted, for example by halogen, hydroxyl, cyano, $C_1$–$C_4$-alkoxy, carboxyl or sulpho. Examples of R are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulphomethyl, β-sulphoethyl, aminosulphonylmethyl and β-sulphatoethyl.

Examples of suitable bridging members W are

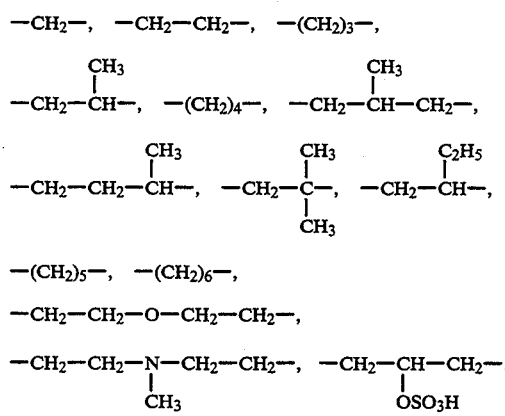

Preferred dyestuffs are those of the formula

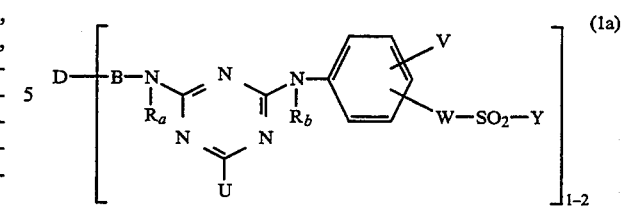

in which

B, D have the abovementioned meaning $R_a$, identical or different, is H or $C_1$–$C_2$-alkyl, $R_b$ is H, $C_1$–$C_3$-alkyl, β-hydroxyethyl, β-sulphatoethyl, β-carboxyethyl, β-cyanoethyl or carboxymethyl, U is Cl, F or a pyridinium radical which is unsubstituted or substituted by $CO_2H$, $CONH_2$, $SO_3H$ or $C_1$–$C_4$-alkyl, W is $CH_2$, $C_2H_4$, $$-CH_2-\underset{\underset{CH_3}{|}}{CH}-,$$

$-(CH_2)_3-$ or $-(CH_2)_4-$,

Y is $CH=CH_2$ or $CH_2-CH_2-X$, where X is Cl or $OSO_3H$

V is H, Cl, $C_1$–$C_2$-alkyl, $C_1$–$C_2$-alkoxy, COOH or $SO_3H$.

Preferred dyestuffs are those of the formulae (4) to (8)

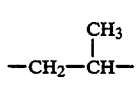

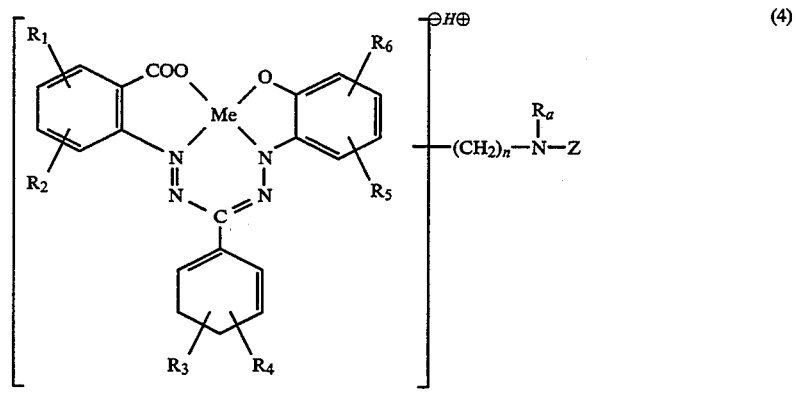

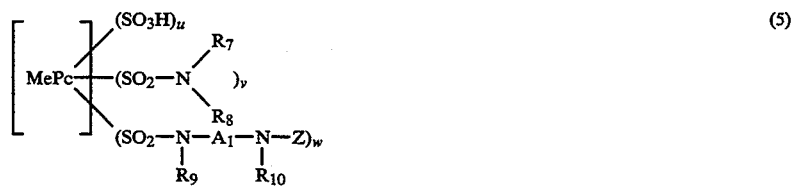

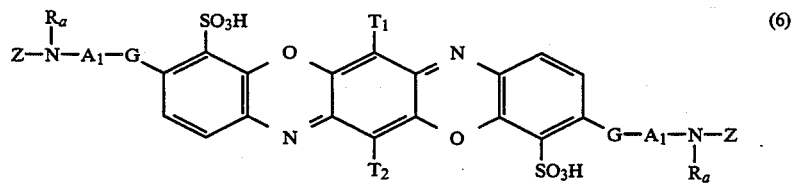

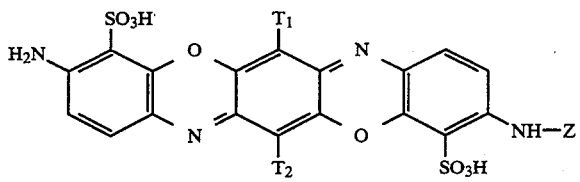
(7)

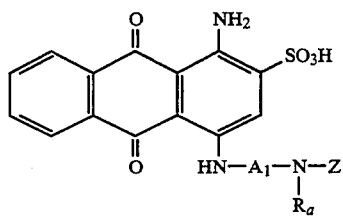
(8)

in which
- $R_a$ is H or $C_1$-$C_2$-alkyl,
- Pc is a phthalocyanine ring,
- Me is a divalent metal ion, for example Fe, Cu, Zn, Co, Ni, preferably Cu, Ni,
- n is 0 or 1,
- u+v+w is 3–4, with the proviso that
- w is 0.8–2.0,
- v is 0–1.0,
- u is 1.0–3.0,
- $A_1$ is an aliphatic, araliphatic or aromatic bridging member,
- G is oxygen or —N—$R_{11}$, in which
- $R_{11}$ is H, $C_1$-$C_2$-alkyl, in which if $A_1$ is $C_2$-alkylene, $R_{11}$ and $R_a$ can be closed to give a ring,
- $T_1$, $T_2$ are H, chlorine, bromine, $C_1$-$C_4$-alkyl, $C_1$-$C_4$-alkoxy or acylamino,
- $R_1$-$R_6$, independently of one another, are H, $C_1$-$C_4$-alkyl, $C_1$-$C_4$-alkoxy, hydroxyl, halogen, carboxyl, sulphonamido, alkyl- or arylcarbonylamino or -sulphonylamino, $\beta$-sulphatoethylsulphonyl or $SO_3H$,
- $R_7$-$R_{10}$ are H, $C_1$-$C_2$-alkyl, which is unsubstituted or substituted by hydroxyl, carboxyl or sulphonyl, in which $R_9$ and $R_{10}$ can also be closed to give a ring if $A_1$ is $C_2$-alkylene,
- Z is a radical of the formula

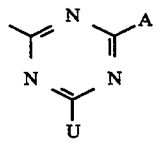
(2a)

in which
- U is Cl, F or a pyridinium radical which is unsubstituted or substituted by $CO_2H$, $CO_2NH_2$, $SO_3H$ or $C_1$-$C_4$-alkyl,
- A is a radical of the formula

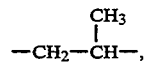
(3a)

in which
- $R_b$ is H, $CH_3$, $C_2H_5$, i—$C_3H_7$, n—$C_3H_7$, $C_2H_4$-OH, carboxymethyl, carboxyethyl or $\beta$-cyanoethyl
- W is —$CH_2$—, —$C_2H_4$—,

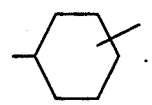

—($CH_2$)$_3$—, —($CH_2$)$_4$—,
- V is H, $SO_3H$, COOH, $C_1$-$C_2$-alkyl, $C_1$-$C_2$-alkoxy, Cl,
- Y is CH=$CH_2$ or $CH_2$—$CH_2$—X
where X is Cl or $OSO_3H$.

Particularly suitable aliphatic radicals $A_1$ are $C_2$-$C_8$-alkyl radicals, which may be interrupted by hetero atoms or hetero atom groupings or may be substituted, such as, for example,

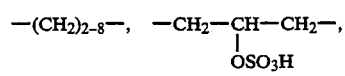

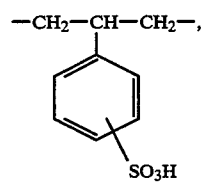

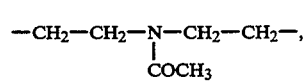

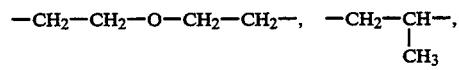

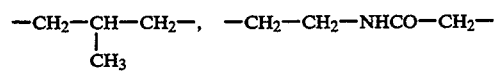

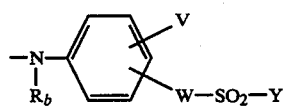

Particularly suitable araliphatic radicals $A_1$ are $C_1$-$C_4$-alkylenephenyl radicals, which may be interrupted by hetero atoms or hetero atom groups, such as, for example,

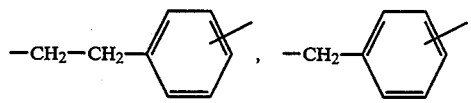 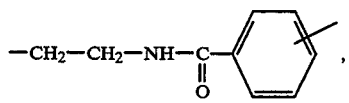 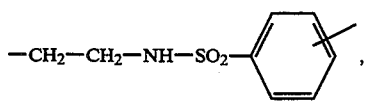 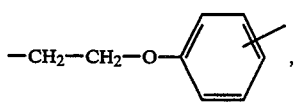 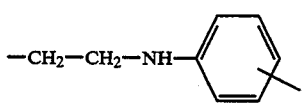

Particularly suitable aromatic radicals $A_1$ are phenylene radicals, which may be substituted by substituents such as, for example $C_1$–$C_2$-alkyl, $SO_3H$ or COOH, such as, for example,

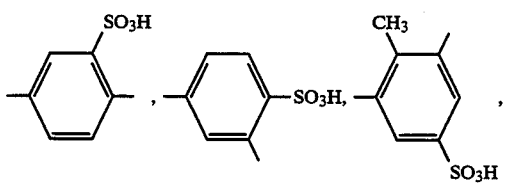

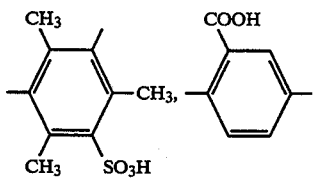

Particular preference is given to copper formazan dyestuffs of the formulae (9)–(12)

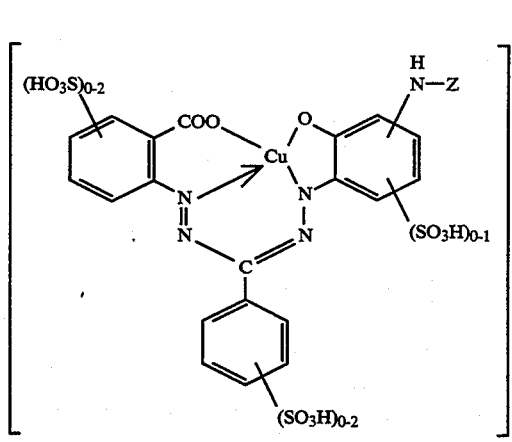

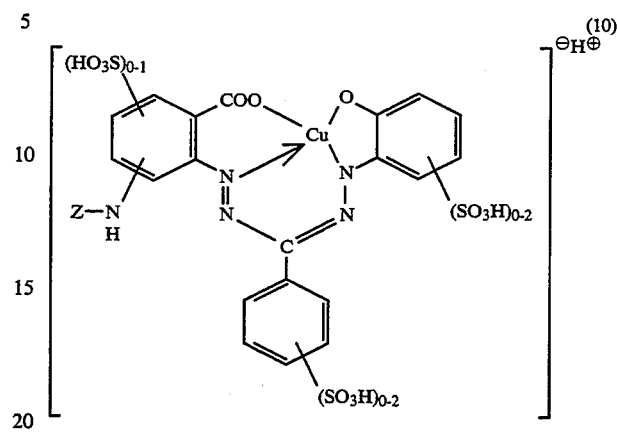

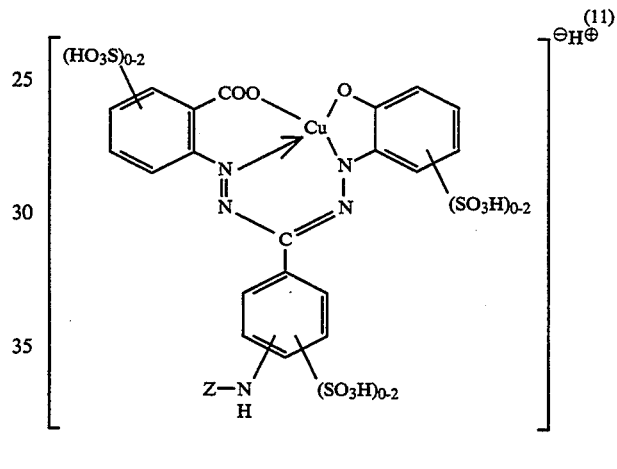

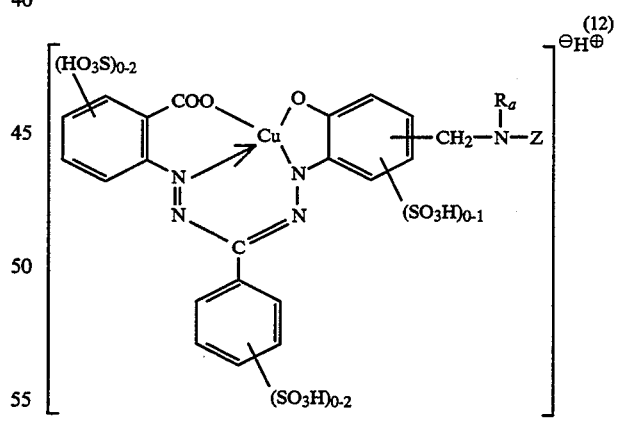

in which $R_a$ is H, $C_1$–$C_2$-alkyl,

Z has the abovementioned meaning of the formula (2a) and the total number of sulpho groups in the dyestuff is at least 2.

Very particular preference is given to copper formazan dyestuffs of the formula

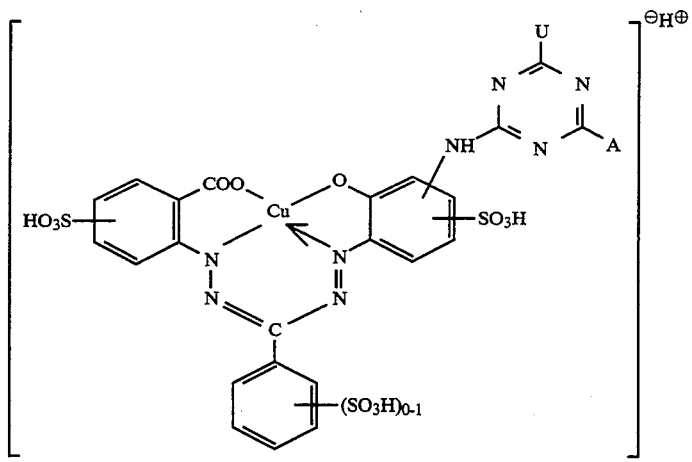

in which

U denotes F, Cl or a pyridinium radical which is unsubstituted or substituted by $CO_2H$, $CO_2NH_2$, $SO_3H$ or $C_1$-$C_4$-alkyl, A denotes

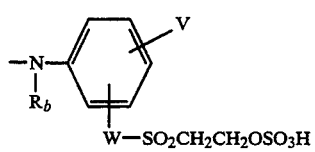

in which V, W and $R_b$ have the meanings mentioned in formula (3a).

Furthermore, particular preference is given to phthalocyanine dyestuffs of the formula (13)

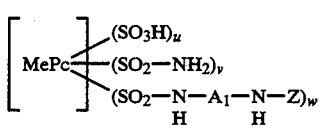

in which

Z, Pc, u, v, w have the abovementioned meaning,

Me is Cu or Ni, $A_1$ is $C_2$-$C_4$-alkylene, 1,3-phenylene, 1,3-sulphophenylene or 1,3-carboxyphenylene.

Furthermore, particular preference is given to triphendioxazine dyestuffs of the formulae (14) and (15)

Z is the radical of the formula (2a)

$R_a$ is H or $C_1$-$C_2$-alkyl

G is O, N—$R_{11}$ (where $R_{11}$ is H, $C_1$-$C_2$-alkyl, in which if $A_1$ is $C_2H_4$ $R_a$ and $R_{11}$ can also be closed to give a ring), $T_1$, $T_2$ are Cl or Br.

Particular preference is also given to anthraquinone dyestuffs of the formula (16)

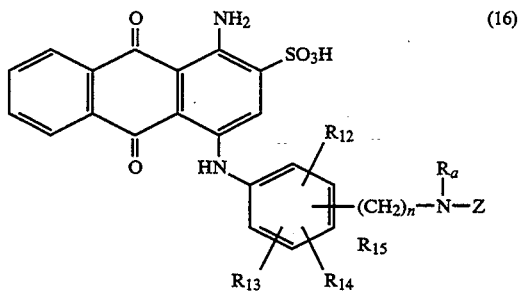

in which n is 0 or 1

$R_a$ is H, $C_1$-$C_2$-alkyl

Z is the radical of the formula (2a)

$R_{12}$ is H, $C_1$-$C_4$-alkyl, alkoxy, halogen, $CO_2H$ or $SO_3H$, $R_{13}$-$R_{15}$, independently of one another, are H, $C_1$-$C_4$-alkyl or $SO_3H$.

Further preference is given to the azo-dyestuffs of the formula: (II)

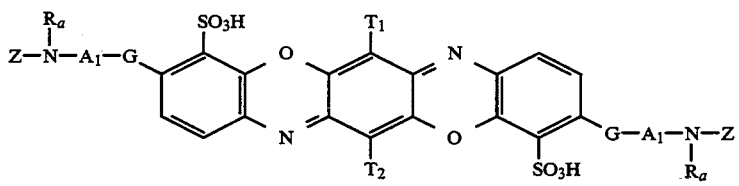

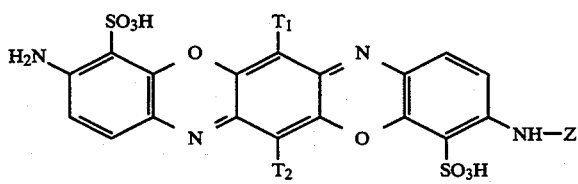

in which

 (II)

in which
D is the radical of a dyestuff from the mono- or polyazo, metal complex azo series,
B has the abovementioned meaning
$R_a$ is H, $C_1-C_2$-alkyl
Z is the radical of the formula

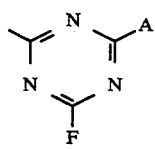 (2b)

in which
A is

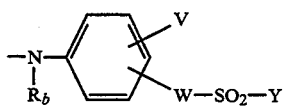 (3b)

in which
$R_b$ is H, $CH_3$, $C_2H_5$, i—$C_3H_7$, n-$C_3H_7$, $C_2H_4OH$, carboxymethyl, carboxyethyl
W is —$C_2H_4$—,

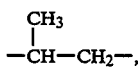
—$(CH_2)_3$—,
V, Y have the meaning given in formula (3a).
Preferred azo-dyestuffs are those of the formulae (17) to (28):

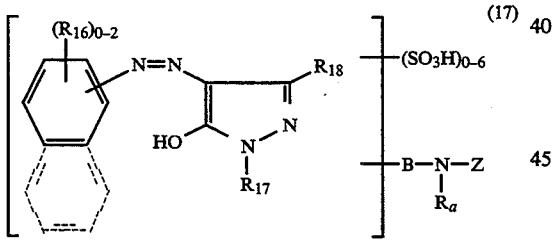 (17)

$R_{16}$ is alkyl, alkoxy, halogen,
$R_{17}$ is H, alkyl, aryl, hetaryl, aralkyl
$R_{18}$ is COOH, $CH_3$

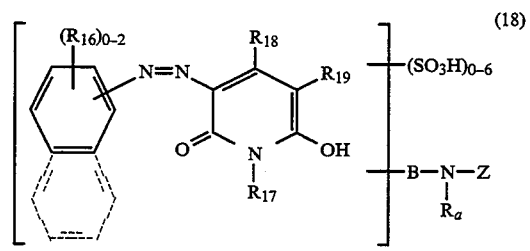 (18)

$R_{16}$ is alkyl, alkoxy, halogen,
$R_{17}$ is H, alkyl, aralkyl, aryl,
$R_{18}$ is alkyl, aryl, aralkyl, hetaryl,
$R_{19}$ is H, $COOR_3$,

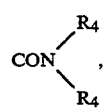

CN, $CH_2$—$SO^3$, $SO_3H$,

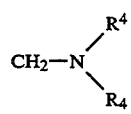

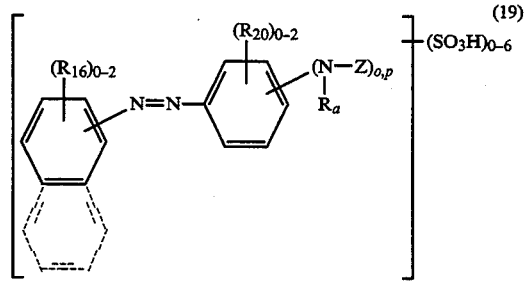 (19)

$R_{16}$ is alkyl, alkoxy, halogen
$R_{20}$ is alkyl, alkoxy, acylamino, amino
o,p are in the o or p position relative to the azo group

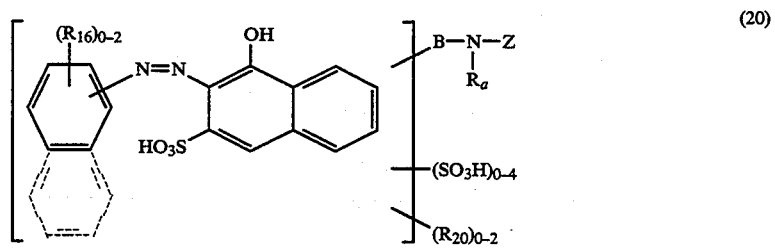 (20)

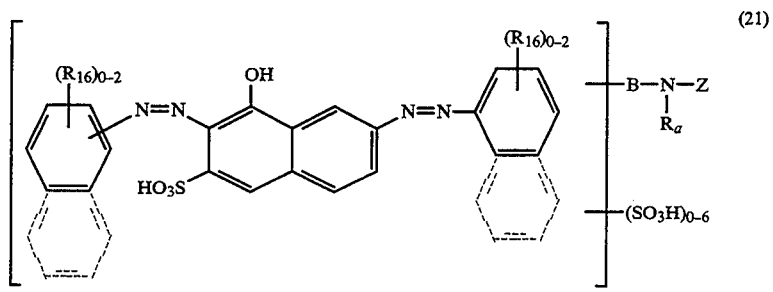

(21)

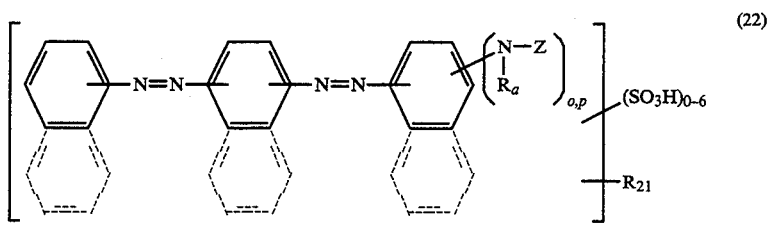

(22)

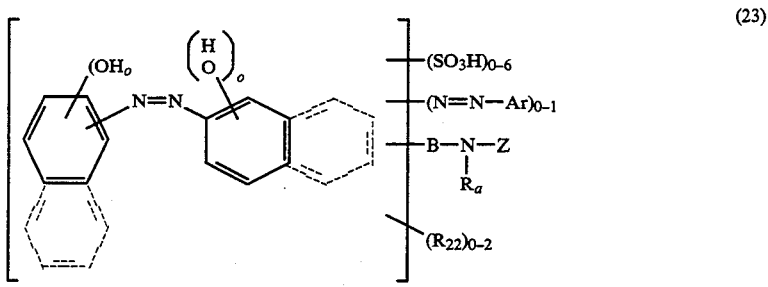

(23)

$R_{16}$ is alkyl, alkoxy, halogen
$R_{20}$ is alkyl, alkoxy, arylamino
o, p are the ortho or para position relative to the azo group
$R_{21}$ is H, $C_1$–$C_2$-alkyl, acylamino, ureido
$R_{22}$ is $R_8$, $NO_2$

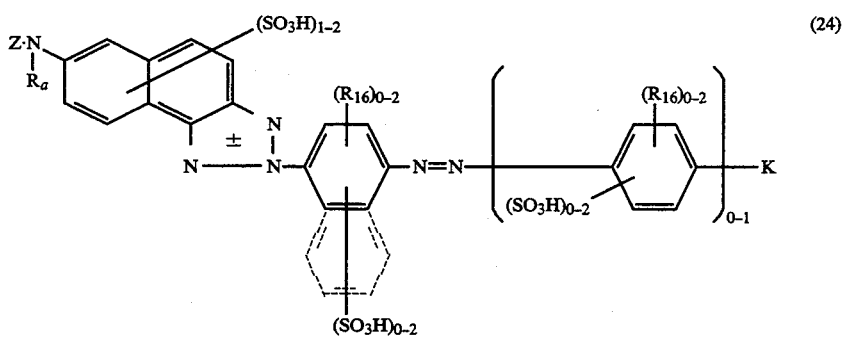

(24)

$R_{16}$ is alkyl, alkoxy, halogen
K is the radical of a coupling component, suitable coupling components being in particular those from the pyridone, pyrazolone, aceto acid arylide and naphtholsulphonic acid series.

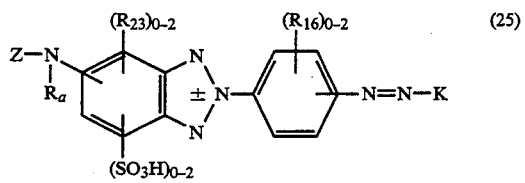

(25)

where
$R_{23}$ is alkyl, halogen
$R_{16}$ is alkyl, alkoxy
K is the radical of a coupling component

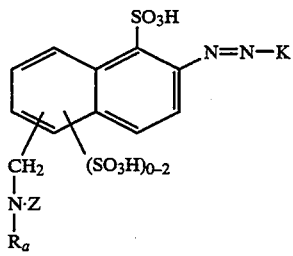
(26)

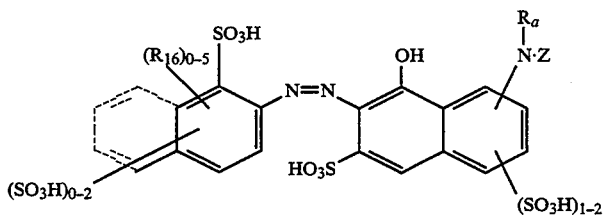
(27)

$R_{16}$ is alkyl, alkoxy, arylamino

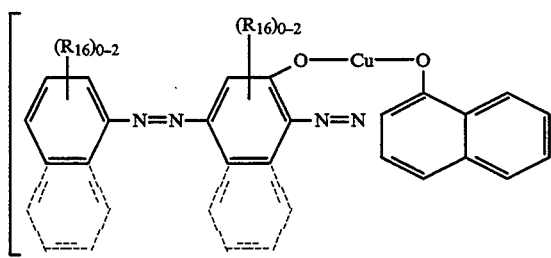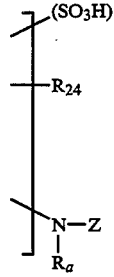
(28)

$R_{16}$ is alkyl, alkoxy
$R_{24}$ is H, $NH_2$, arylamino.

The present invention also relates to the preparation of the reactive dyestuffs of the formula (1) by methods known per se.

The following may be mentioned:

1. Preparation of the reactive dyestuffs takes place by condensing a dyestuff base of the general formula $$D\text{-}B\text{-}NR_a\text{-}H \quad (29)$$

in which D, B and $R_a$ have the abovementioned meaning with 2,4,6-trichloro- or 2,4,6-trifluorotriazine.

The intermediate is converted in a further reaction step with an aminosulphone of the formula

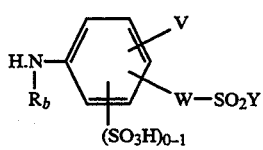
(30)

in which $R_b$, V, Y and W have the abovementioned meaning,
into the reactive dyestuff.

2. Preparation of the dyestuffs of the formula (1) can also take place by condensing a dyestuff base of the general formula (29), in which D has the abovementioned meaning, with the fibre-reactive compound of the formula (31).

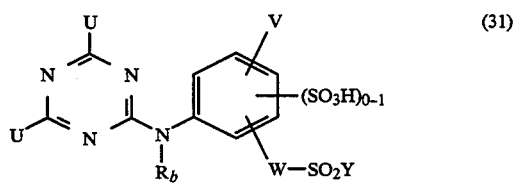
(31)

W, U, $R_b$, V and Y have the abovementioned meanings.

3. Suitable dyestuff precursors are condensed with trihalogenotriazines and the components of the formula (30) or suitable precursors are condensed with the primary condensation products of the formula (31) and then converted into the dyestuff.

4. If desired, the halogen atom in the synthesised halogenotriazine dyestuff is exchanged for the radical of a pyridine which may be substituted by COOH, $CONH_2$, $SO_3H$, $C_1$-$C_4$-alkyl.

The condensations of the starting components with the trihalogenotriazines and the components of the formula (30) or with the reactive components of the formula (31) are carried out, irrespective of the order, in aqueous or organic-aqueous media in the presence of acid-binding agents. The first step of the condensation is carried out, depending on the nature of the starting components, in pH ranges from 2 to 8, preferably 3 to 7, and at temperatures from 0° to 40° C., preferably 0° to 25° C. The exchange of the second halogen atom of the triazine is completed in a pH range from 4 to 10, preferably 5 to 9, and in a temperature range from 0° to 60° C., preferably 0° to 30° C.

Examples of acid-binding agents are carbonates, hydroxides or phosphates, such as sodium carbonate, sodium bicarbonate, dilute sodium hydroxide solution, di- or trisodium phosphate or sodium fluoride.

If the condensation or the dyestuff synthesis is intended to lead directly to a dyestuff solution or to a liquid dyestuff preparation, the use of lithium carbonate or lithium hydroxide may be advantageous, possibly together with solubilisers and/or stabilising buffer systems. Other conversion reactions of the dyestuffs or precursors thereof, such as metallisation reactions, sulphonations or introduction of acylamino groupings can in general be carried out during any desired steps of the dyestuff syntheses.

Particularly valuable dyestuffs of this series are water-soluble formazan, anthraquinone, triphendioxazine and phthalocyanine and azo dyestuffs, and in particular those having sulpho and/or carboxyl groups. The dyestuffs can be either metal-free or metal-containing, the metal complexes which are preferred being the copper complexes, nickel complexes, chromium complexes and cobalt complexes.

Suitable dyestuff radicals D or amino-containing dyestuff bases on which the dyestuffs of the formula (1) are based have been described in the literature in very large numbers. Examples are:

| | |
|---|---|
| German Auslegeschrift 2,557,141 | Dyestuff bases of the formulae 9–11 |
| German Auslegeschrift 3,239,364 A1 | Dyestuff bases of the formula 12 |
| German Offenlegungsschrift 164,463 US 4,007,164 | Dyestuff bases of the formula 13 |
| German Offenlegungsschrift 2,503,011 German Offenlegungsschrift 2,124,080 German Offenlegungsschrift 3,423,581 | Dyestuff bases of the formulae 14–15 |
| U. Venkataraman "The Chemistry of Synthetic Dyes", Vol. III, Academic Press, New York, 1952 | Dyestuff bases of the formula 16 |

Further examples are mentioned in the following publications: EP-A 54,515, EP-A 69,703, EP-A 70,807, EP-A 73,267, German Auslegeschrift 3,222,726, German Auslegeschrift 2,557,141, German Auslegeschrift 2,650,555, German Auslegeschrift 3,023,855, German Auslegeschrift 2,847,938, German Auslegeschrift 2,817,780, GB-A 2,057,479, German Auslegeschrift 2,916,715, German Auslegeschrift 2,814,206, German Auslegeschrift 3,019,936, EP-A 45,488 and Venkataraman: The Chemistry of Synthetic Dyes, Vol. VI, Chapter II, p. 211–325, New York, London; 1972.

The invention also relates to the new amines of the formula

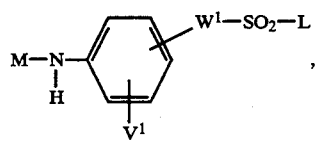

in which
M is $C_2H_5$, $C_3H_7$, $C_2H_5OH$,
$V^1$ is H, Cl, $SO_3H$, $CH_3$, $CO_2H$, $OCH_3$,
L is $CH=CH_2$, $CH_2-CH_2-Q$,
Q is Cl, OH, $-OSO_3H$,
$W^1$ is $CH_2$, $C_2H_4$,

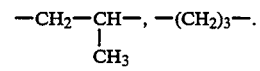

The new amines of the formula (32) are prepared by methods known per se:

Nitro- or acylamino compounds of the formula (33)

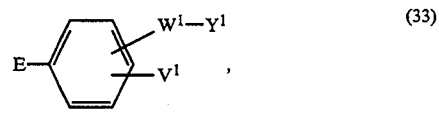

in which
$V^1$, $W^1$ have the abovementioned meaning,
E is $NO_2$ or acylamino,
$Y^1$ is Cl, Br, $-OSO_3H$,

$O-SO_2-CH_3$ are reacted in a manner known per se with 2-mercaptoethanol to give sulphides of the formula

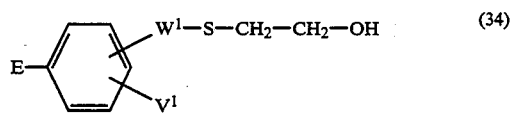

in which
E, $V^1$ and $W^1$ have the abovementioned meaning,
these sulphides are then oxidised in a known manner, for example with $H_2O_2$ or chlorine, to sulphones of the formula (35)

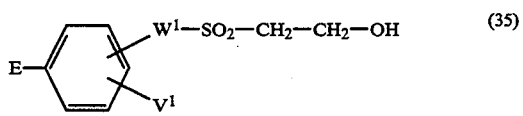

in which
$V^1$, $W^1$ have the abovementioned meaning,
and the nitro group E is then reduced or the acylamino group E is hydrolysed. The resulting known amino compounds of the formula (36)

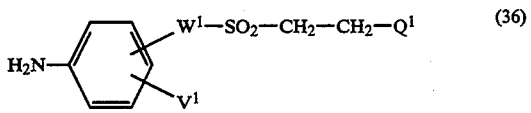

in which
$V^1$, $W^1$ have the abovementioned meaning,
$Q^1$ is HO or Cl,
are N-alkylated in a known manner (for example by reductive alkylation). If desired, the OH group in $Q^1$ is subsequently converted into an $-OSO_3H$ group (in a known manner using sulphuric acid or oleum). By the reaction with oleum, it is additionally possible to introduce, apart from the sulphato groups, sulpho groups ($V^1=SO_3H$) into the phenylene radical. The amines thus obtained can be converted into compounds of the formula (32), in which the grouping L is the grouping —CH=CH$_2$, by treatment with alkaline agents, such as alkali metal hydroxide or alkali metal carbonate.

Compounds of the formula (35) where E is NO$_2$ can also be synthesised starting from compounds of the formula

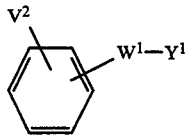 (37)

in which

W$^1$, Y$^1$ have the abovementioned meaning and
V$^2$ is H, C$_1$–C$_2$-alkyl, by reaction with 2-mercaptoethanol, followed by oxidation to give the compounds of the formula

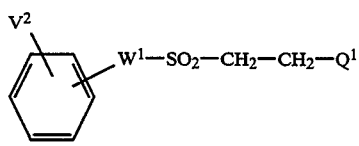 (38)

in which

V$^2$, W$^1$, Q$^1$ have the abovementioned meaning and subsequent nitration of the compounds (38) to give compounds of the formula (35) where E is NO$_2$. Any OH groups Q$^1$ esterified during nitration can be reconverted into OH groups by hydrolysis. When the nitro group is introduced via the compounds of the formula (38), mixtures of isomers W$^1$—SO$_2$—CH$_2$—CH$_2$—Q$^1$ are generally formed with respect to the position of the nitro group relative to the side chain.

An important and specific variant for preparing the compounds of the formula (38) or (35) is the free radical catalysed addition reaction of 2-mercaptoethanol with styrenes or allylbenzenes of the formula

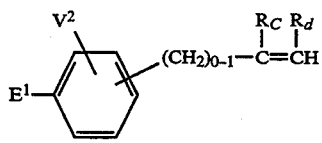 (39)

where

E$^1$ is H, NO$_2$,
R$_c$, R$_d$ are H, C$_1$–C$_2$-alkyl, and
V$^2$ has the abovementioned meaning, subsequent oxidation of the sulphides formed of the formula

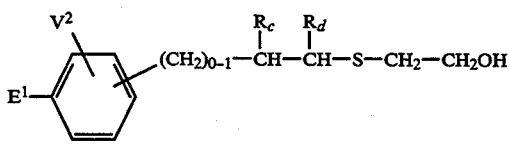 (40)

where E$^1$, V$^2$, R$_c$, R$_d$ have the meanings mentioned to give sulphones of the formula

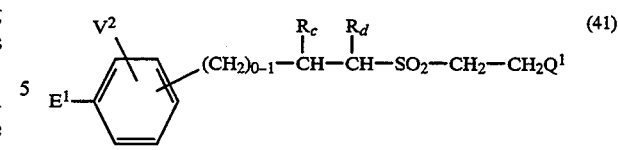 (41)

in which

E$^1$, V$^2$, R$_c$, R$_d$ have the abovementioned meaning, and

Q$^1$ is OH, Cl and, if desired, subsequent nitration, i.e. conversion of E$^1$=H to E$^1$=NO$_2$ to give the compounds of the formula (35).

In a further preferred embodiment, the invention relates to a process for the preparation of amines according to claim 11 (where W is C$_2$H$_4$), characterised in that an addition reaction of 2-mercaptoethanol catalysed by free radicals with ethenyl aromatics of the formula (33a)

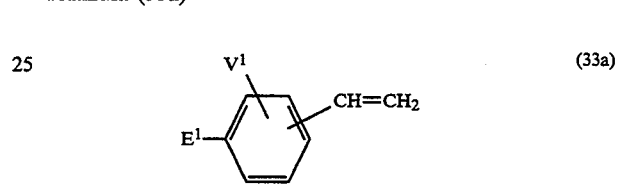 (33a)

in which

E$^1$ is H, NO$_2$ or acylamino, and
V$^1$ has the meaning given in formula (33)

is carried out to give sulphides of the formula (34a)

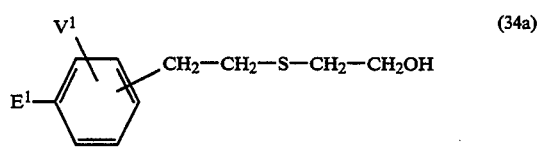 (34a)

these sulphides are oxidised to the sulphones of the formula

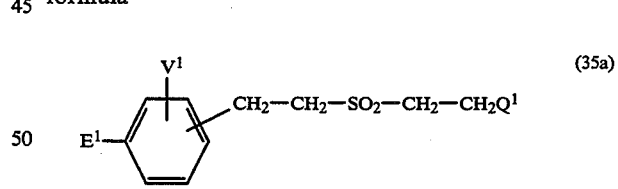 (35a)

in which

Q$^1$ is OH or Cl, and then, if E$^1$ is H,

E$^1$ is nitrated to NO$_2$, the nitro group E$^1$ is reduced or the acylamino group E$^1$ is hydrolysed and the resulting amino compounds are, if desired, N-alkylated and/or the OH group Q$^1$ is converted into an OSO$_3$H group and, if desired, an SO$_3$H group is introduced on the phenyl ring instead of V$^1$=H.

Particularly suitable amines of the formula (30) for reaction with 2,4,6-trichloro- or 2,4,6-trifluorotriazine or with a precondensation product of the dyestuff bases of the formula (29) with the abovementioned triazine are, for example:

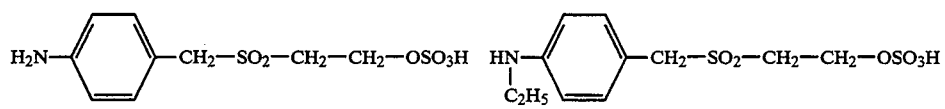
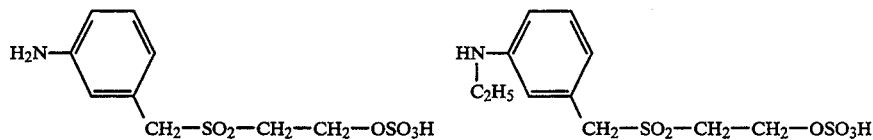
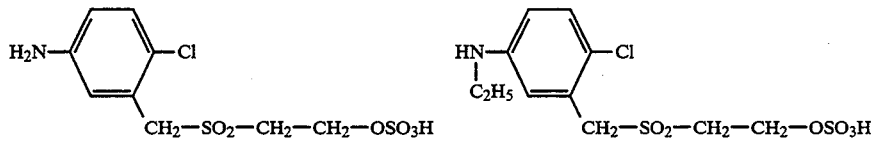
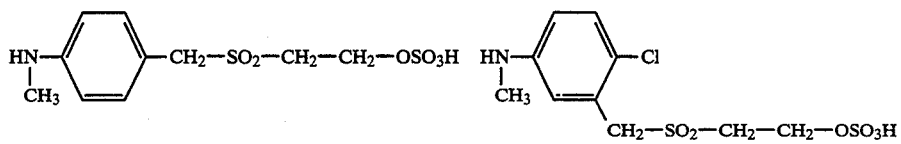
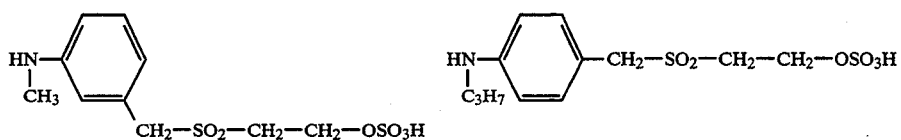
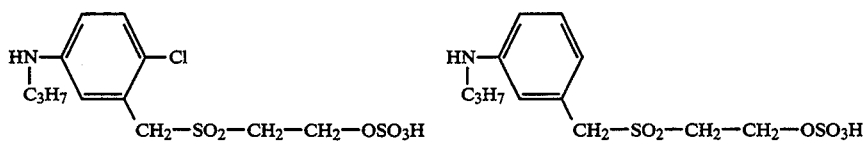
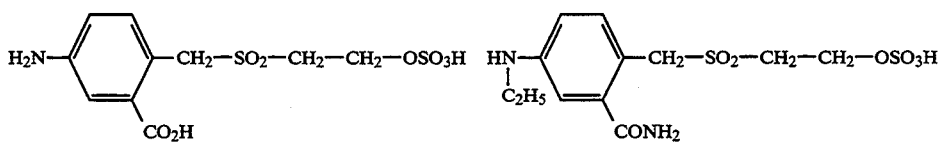
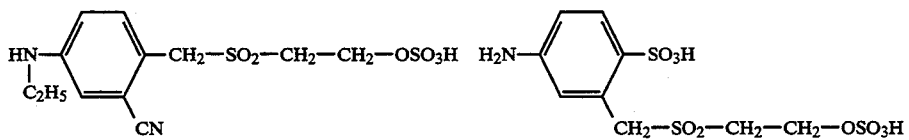
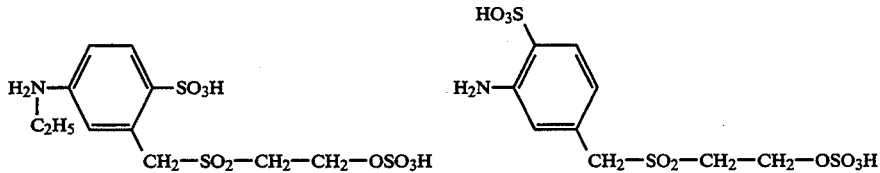
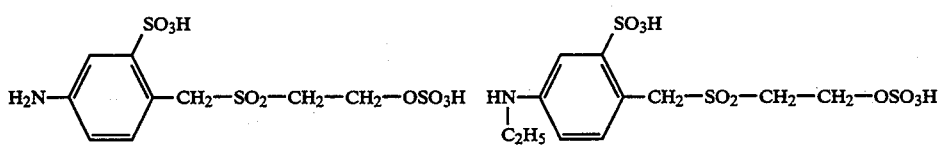

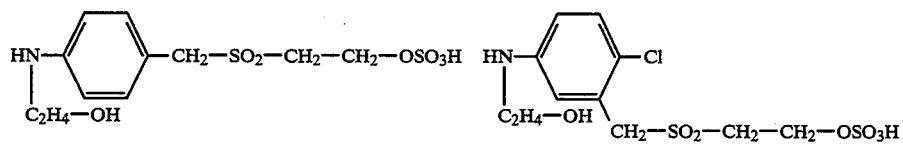
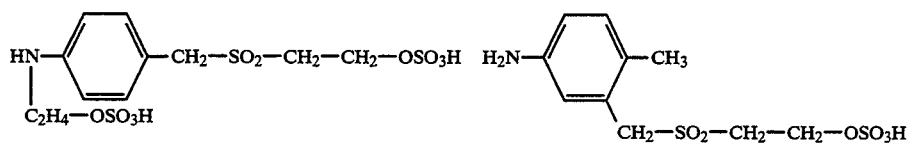
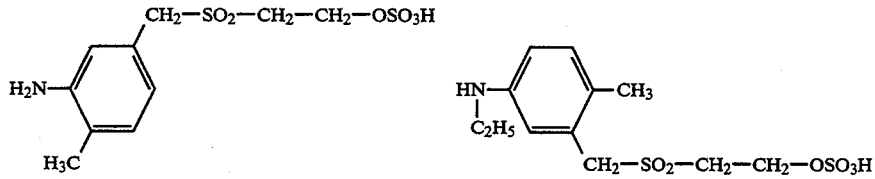
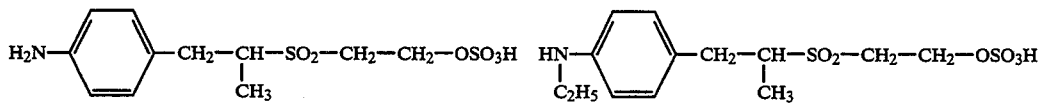
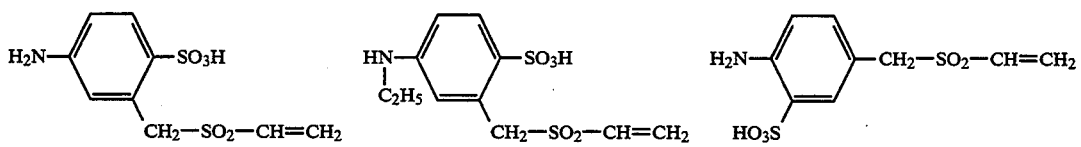
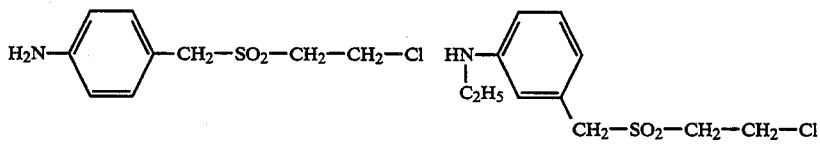
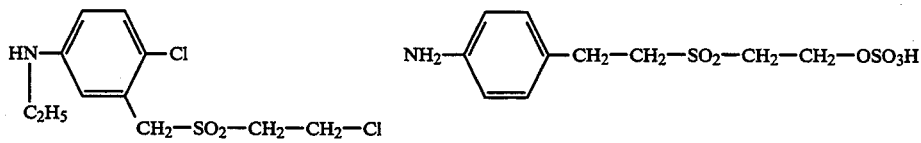
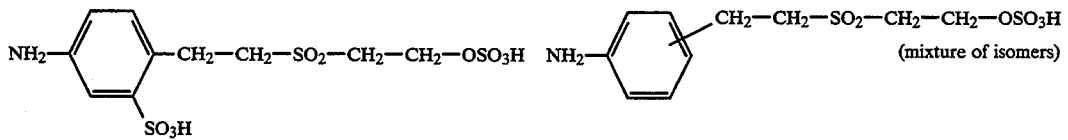
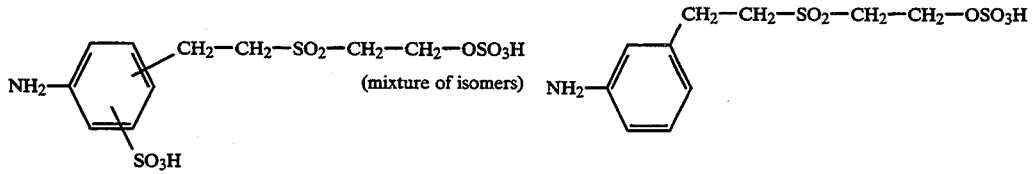
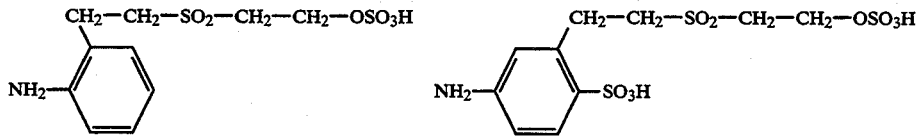

-continued
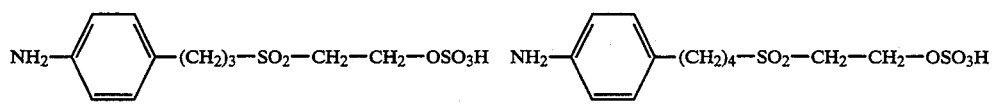
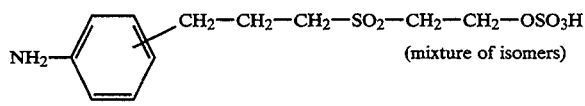
(mixture of isomers)
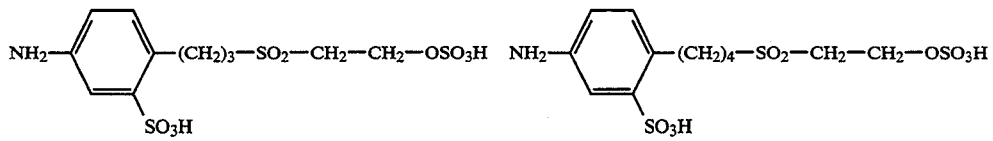
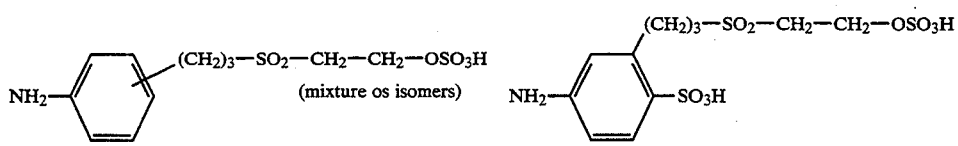
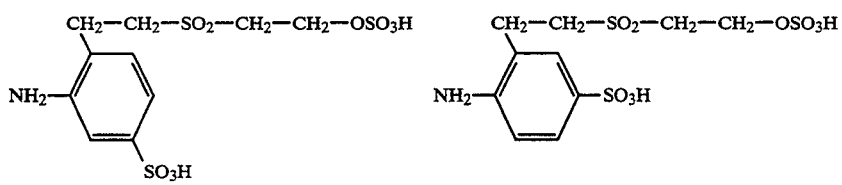
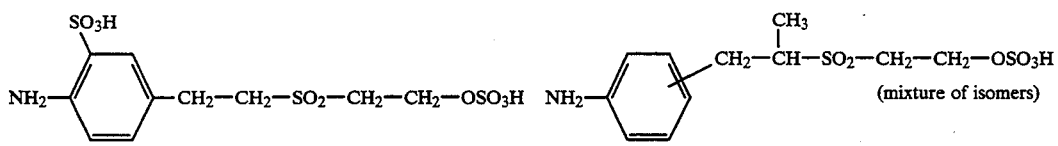
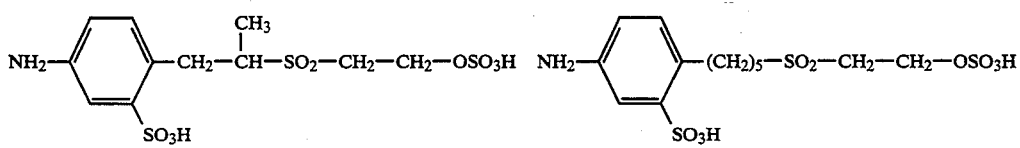
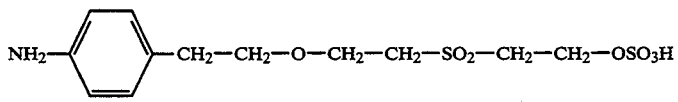
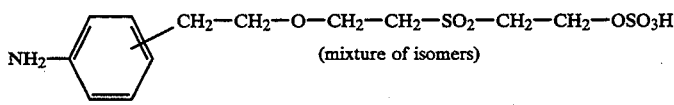
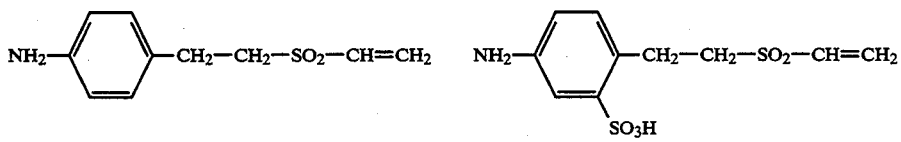
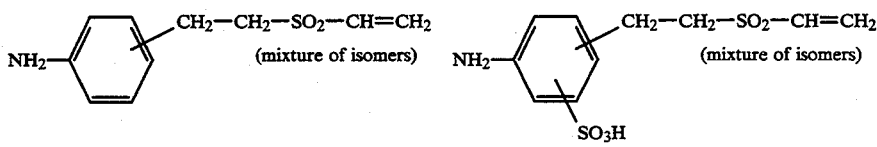

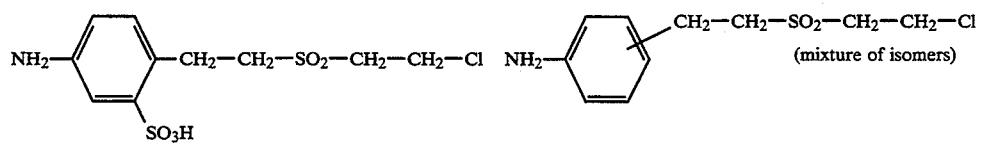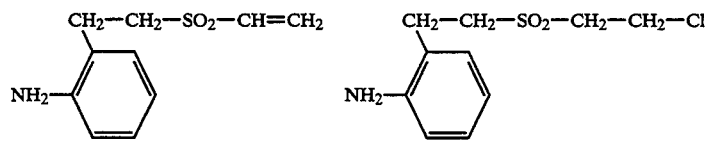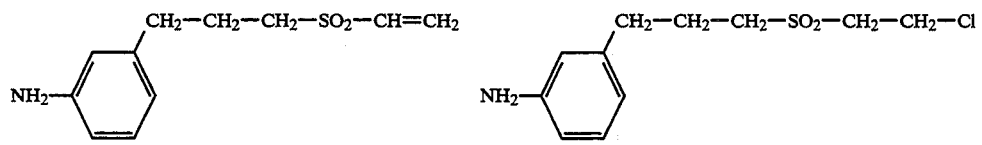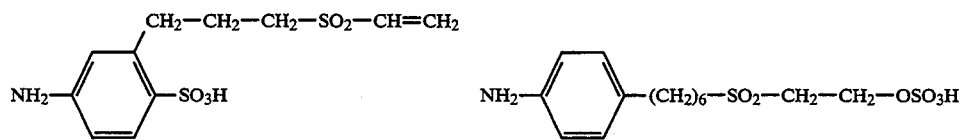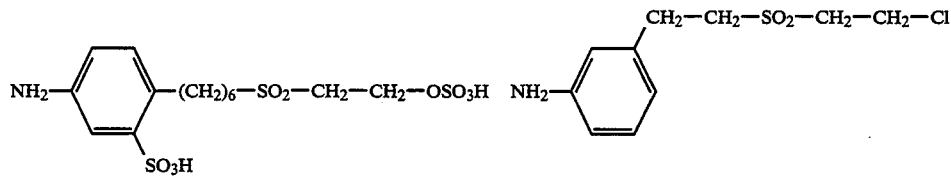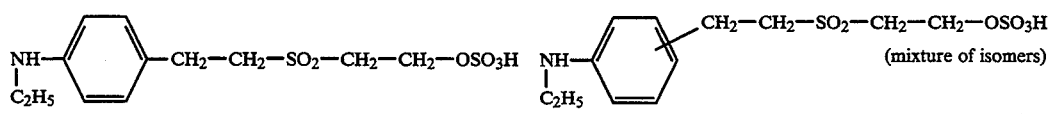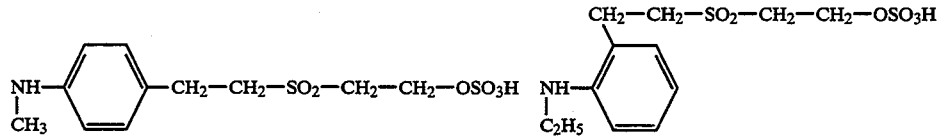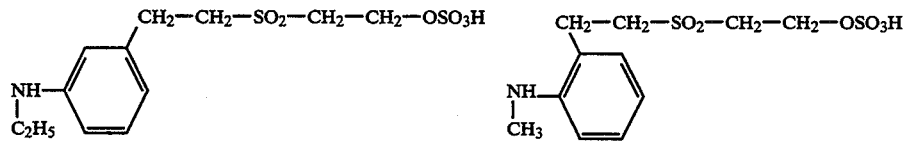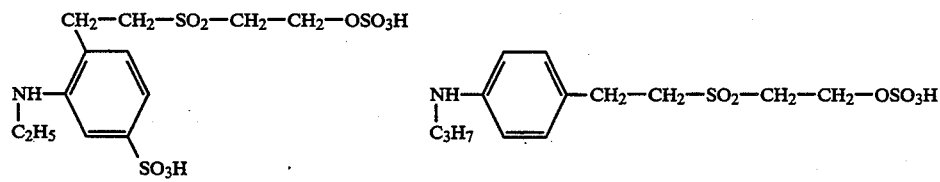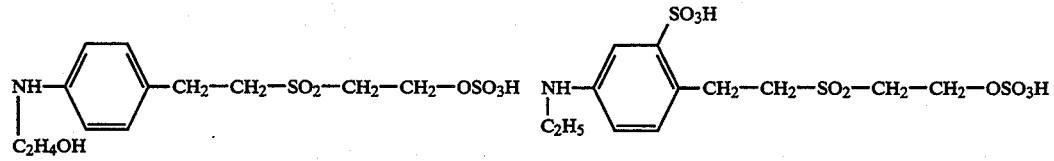

-continued
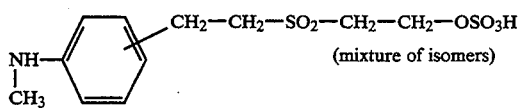
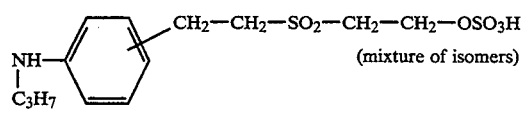
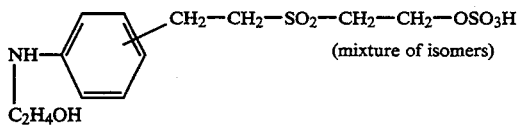
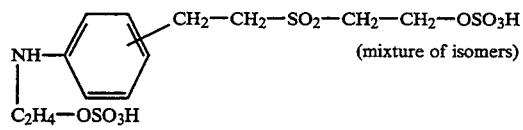
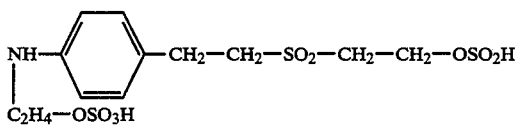
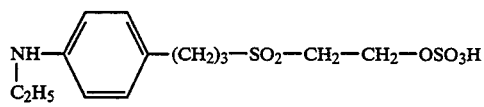
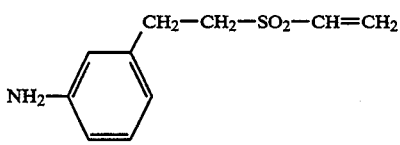
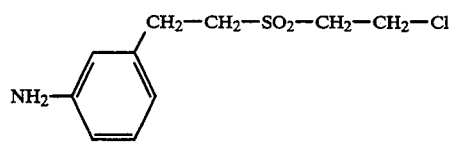
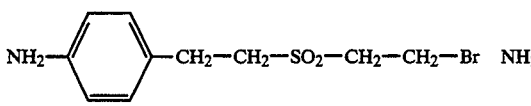
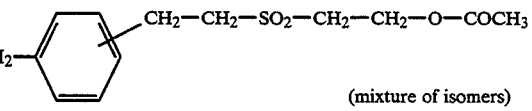
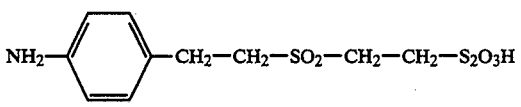
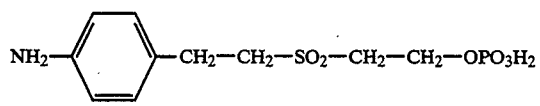
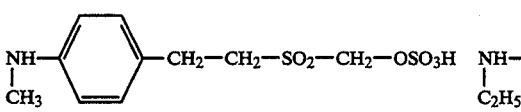
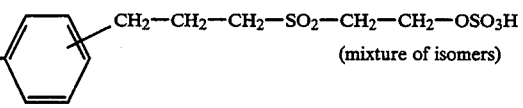
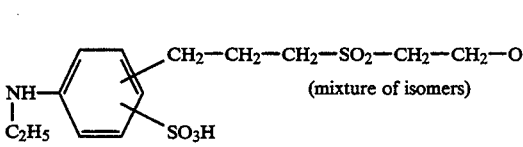
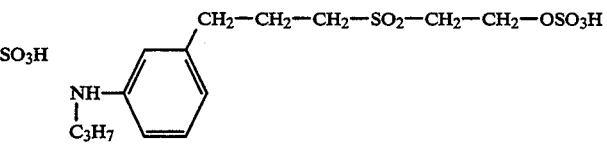
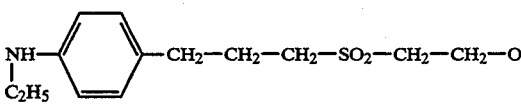
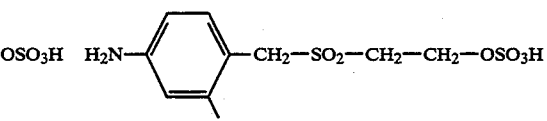
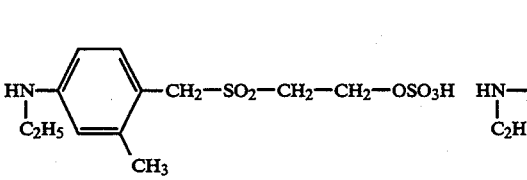
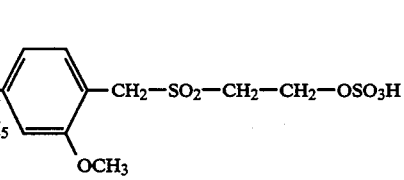
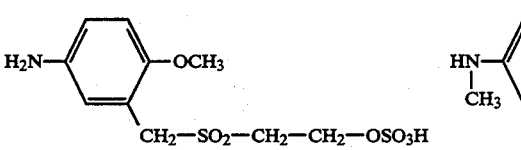
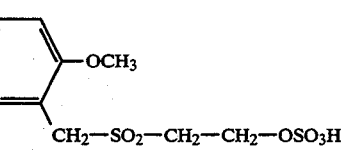

-continued

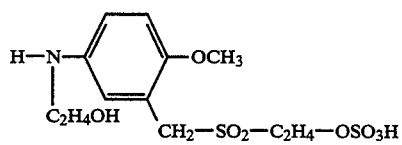
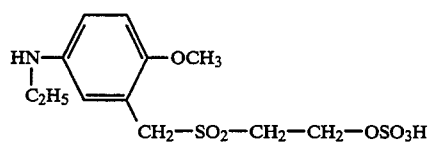

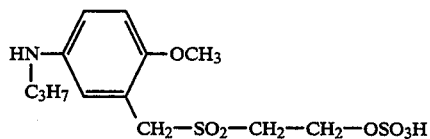
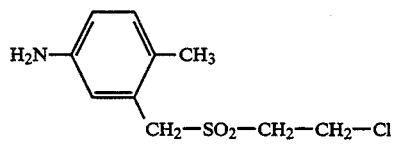

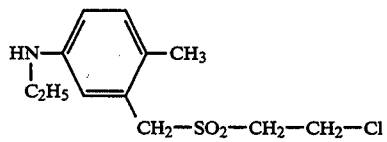
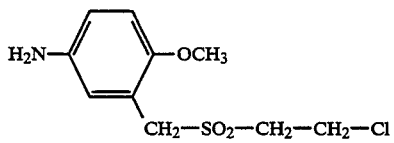
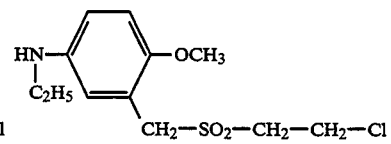

The dyestuffs according to the invention are highly suitable for the dyeing and printing of natural and synthetic hydroxyl- or amido-containing materials, in particular those consisting of cellulose and polyamide. Dyestuff mixtures composed of dyestuffs of the formula (1) have improved solubility properties.

The dyestuffs as well as the dyestuff mixtures are particularly suitable for the dyeing of cellulose materials by the exhaust, padding, cold pad-batch and continuous methods, and for printing.

The dyestuffs according to the invention, in particular those of the general formula (1), are highly suitable in mixtures with other dyestuffs, in particular for trichromatic dyeing.

The reactive dyestuffs of the formula (1) are distinguished by high reactivity and excellent fixation powers. Owing to their bifunctionality, they produce high fixation yields even from a long liquor. They are characterised by a relative independence of the yield from the dyeing temperature and can therefore be used in the exhaust method at low to medium dyeing temperatures. In the pad-steam process, they require only short steaming times. They produce dyeings of high colour strength and good light and wet fastness properties.

The dyestuff formulae given are those of the free acids. In general, the salts are obtained in the preparation, in particular the alkali metal salts, such as sodium salts, potassium salts or lithium salts. The dyestuffs can also be used as concentrated solutions.

EXAMPLE 1

65 g of the sodium salt of the compound of the formula

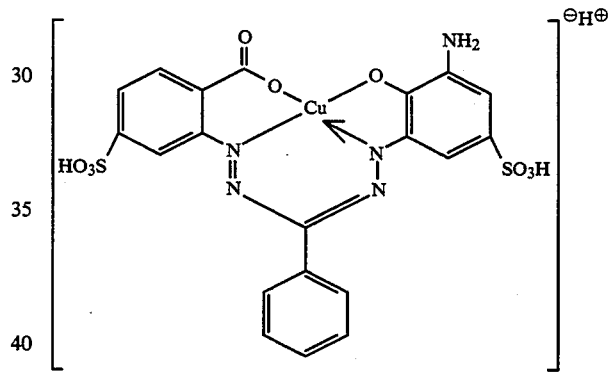

are dissolved in 200 ml of water at a pH of 7.5. The solution is cooled to 0° C. and 9 g of trifluorotriazine are added dropwise over a period of 20 minutes, while maintaining the pH at 6–7 by adding sodium carbonate solution. After conversion is complete, a neutralised solution of 17.5 g of 4-aminobenzyl β-sulphatoethyl sulphone in 100 ml of water is added dropwise and the pH is maintained at 7 with sodium carbonate solution. After condensation is complete, the dyestuff is isolated either by evaporation or spray-drying or by salting out. The dyestuff thus obtained of the formula

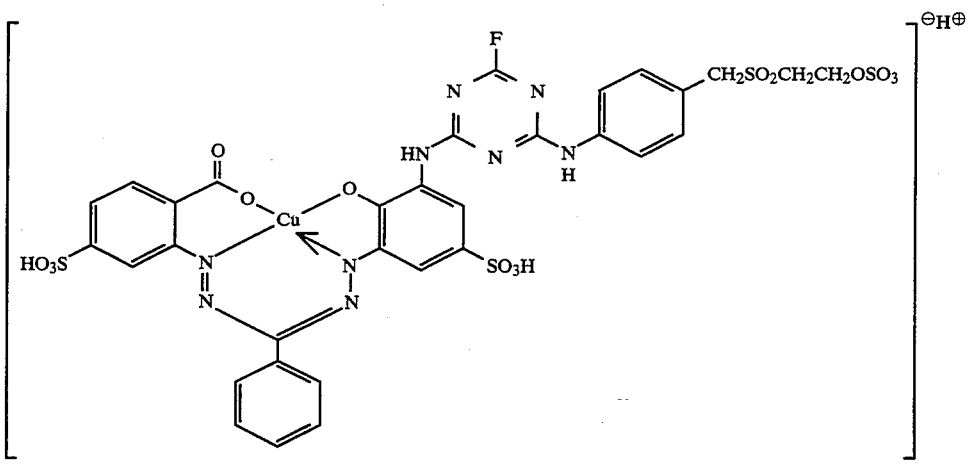

$\lambda_{max} = 611$ nm dyes cotton in blue hues which have good fastness properties.

instead of the dyestuff base used in Example 1. The dyestuff thus obtained of the formula

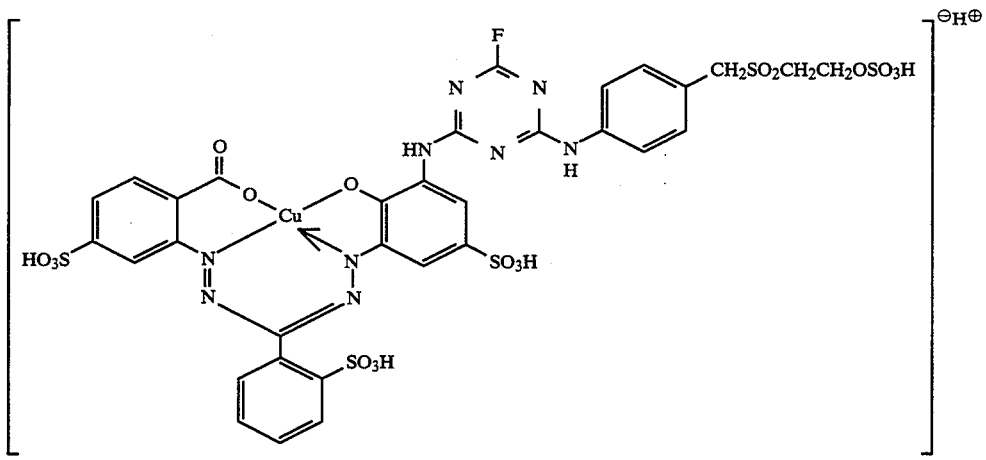

$\lambda_{max} = 589$ nm

EXAMPLE 2

A further valuable dyestuff is obtained by repeating the procedure of Example 1, using the sodium salt of the compound of the formula

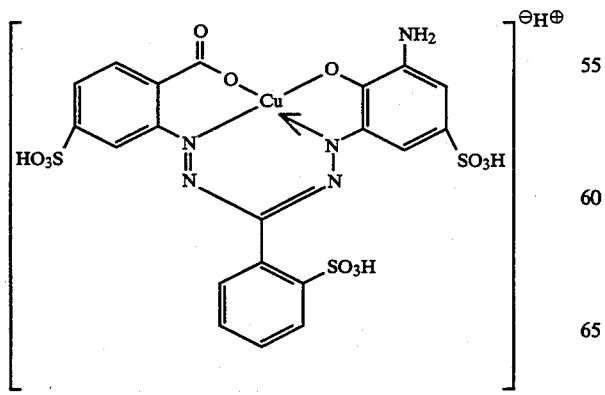

dyes cotton in blue hues which have good fastness properties.

EXAMPLE 3

The procedure of Example 1 is repeated, using 4-[N-ethyl]aminobenzyl (β-sulphatoethyl) sulphone instead of 4-aminobenzyl (β-sulphatoethyl) sulphone, to give the dyestuff of the formula

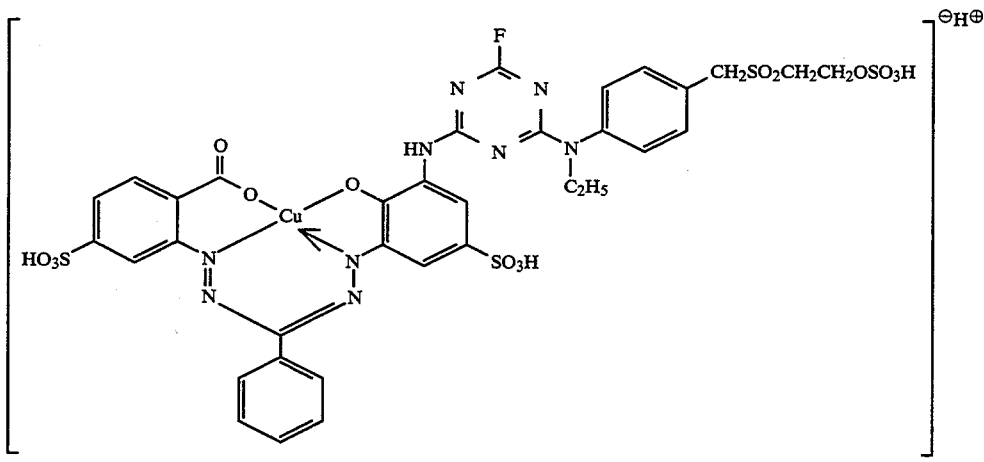

$\lambda_{max} = 612$ nm which dyes cotton, by the application methods customary for reactive dyestuffs, in blue hues.

EXAMPLE 4

The procedure of Example 3 is repeated, using 2,4,6-trichlorotriazine instead of 2,4,6-trifluorotriazine, to give a dyestuff of the formula

EXAMPLES 5 TO 41

Further valuable dyestuffs according to the invention are obtained by the procedure of Example 1 by reacting the components listed in Table 1.

The dyestuffs obtained have very good fibre-reactive dyestuff properties and produce by the customary dye-

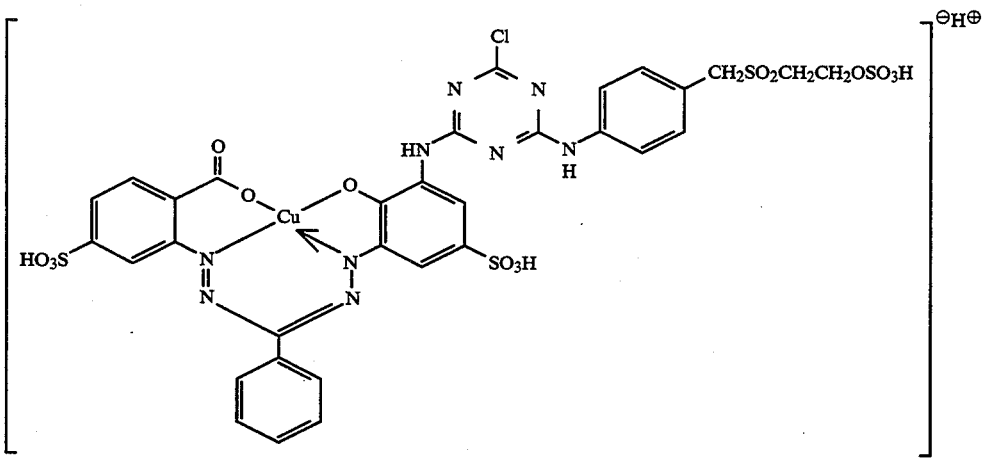

$\lambda_{max} = 613$ nm which dyes cotton, by dyeing methods customary for reactive dyestuffs, in blue hues.

ing and printing processes dyeings and prints of high colour strength and good fastness properties in the hue on cotton listed in the particular table example.

TABLE 1
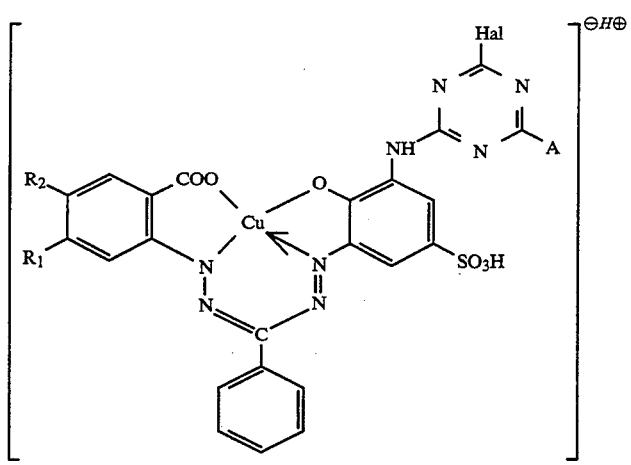
| Ex. | R₁ | R₂ | Hal | A | Hue | λmax |
|---|---|---|---|---|---|---|
| 5 | SO₃H | H | F | 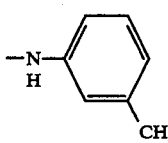 —NH—C₆H₄—CH₂SO₂CH₂CH₂OSO₃H (meta) | blue | 613 nm |
| 6 | SO₃H | H | Cl | —NH—C₆H₄—CH₂SO₂CH₂CH₂OSO₃H (meta) | blue | 613 nm |
| 7 | SO₃H | H | F | —NH—C₆H₃(Cl)—CH₂SO₂CH₂CH₂OSO₃H | blue | 614 nm |
| 8 | SO₃H | H | F | —NH—C₆H₄—CH₂SO₂CH₂CH₂Cl | blue | 612 nm |
| 9 | SO₃H | H | F | —N(C₂H₅)—C₆H₄—CH₂SO₂CH₂CH₂OSO₃H | blue | 610 nm |
| 10 | SO₃H | H | F | —N(C₂H₅)—C₆H₃(Cl)—CH₂SO₂CH₂CH₂OSO₃H | blue | 615 nm |
| 11 | SO₃H | H | Cl | —NH—C₆H₃(SO₃H)—CH₂SO₂CH₂CH₂OSO₃H | blue | |

TABLE 1-continued

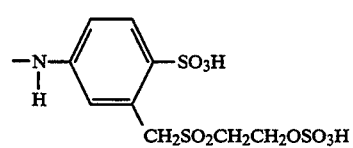

| Ex. | R₁ | R₂ | Hal | A | Hue | λmax |
|-----|-----|-----|-----|---|-----|------|
| 12 | SO₃H | H | F | −NH−C₆H₃(SO₃H)(CH₂SO₂CH₂CH₂OSO₃H) | blue | |
| 13 | SO₃H | H | F | −N(C₂H₅)−C₆H₃(SO₃H)(CH₂SO₂CH₂CH₂OSO₃H) | blue | |
| 14 | SO₃H | H | F | −NH−C₆H₃(SO₃H)(CH₂SO₂CH=CH₂) | blue | |
| 15 | SO₃H | H | F | −N(C₂H₅)−C₆H₃(SO₃H)(CH₂SO₂CH=CH₂) | blue | |
| 16 | SO₃H | H | Cl | −N(C₃H₇)−C₆H₄−CH₂SO₂CH₂CH₂OSO₃H | blue | |
| 17 | SO₃H | H | F | −N(C₃H₇)−C₆H₄−CH₂SO₂CH₂CH₂OSO₃H | blue | |
| 18 | SO₃H | H | F | −N(C₃H₇)−C₆H₄−CH₂SO₂CH₂CH₂OSO₃H | blue | |

TABLE 1-continued
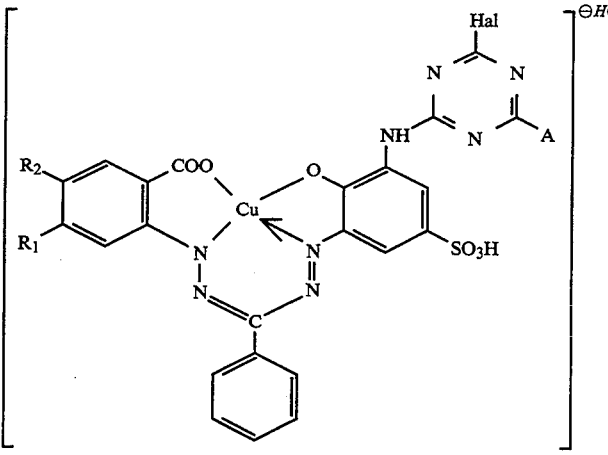
| Ex. | R₁ | R₂ | Hal | A | Hue | λmax |
|---|---|---|---|---|---|---|
| 19 | SO₃H | H | Cl | 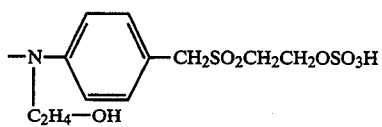 | blue | |
| 20 | SO₃H | H | F | 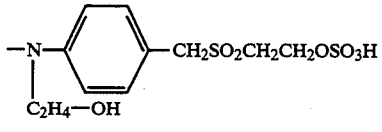 | blue | |
| 21 | SO₃H | H | F | 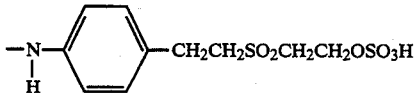 | blue | 614 nm |
| 22 | SO₃H | H | F | 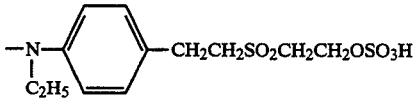 | blue | 613 nm |
| 23 | SO₃H | H | F | 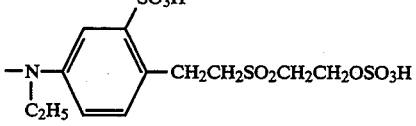 | blue | |
| 24 | SO₃H | H | F | 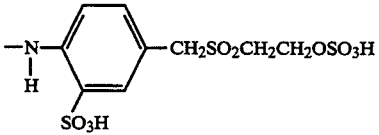 | blue | |
| 25 | SO₃H | H | Cl | 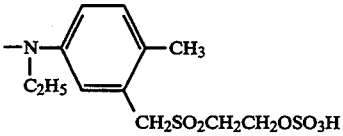 | blue | |
| 26 | SO₃H | H | F | 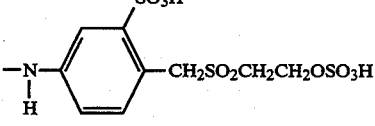 | blue | |

TABLE 1-continued
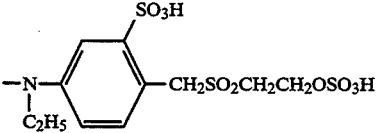
| Ex. | $R_1$ | $R_2$ | Hal | A | Hue | λmax |
|---|---|---|---|---|---|---|
| 27 | $SO_3H$ | H | F | 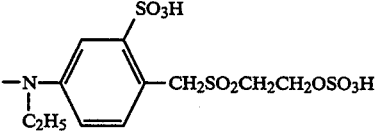 | blue | |
| 28 | $SO_3H$ | H | Cl | 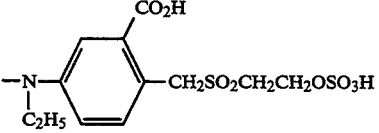 | blau | |
| 29 | $SO_3H$ | H | F | 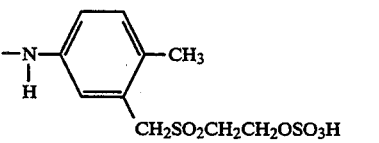 | blue | |
| 30 | $SO_3H$ | H | F | 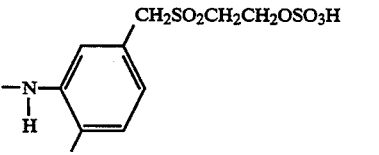 | blue | 612 nm |
| 31 | $SO_3H$ | H | Cl | 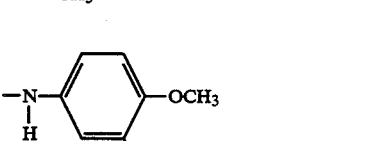 | blue | |
| 31a | $SO_3H$ | H | F | 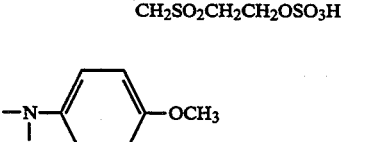 | blue | 614 nm |
| 31b | $SO_3H$ | H | F | | blue | 612 nm |

TABLE 1-continued

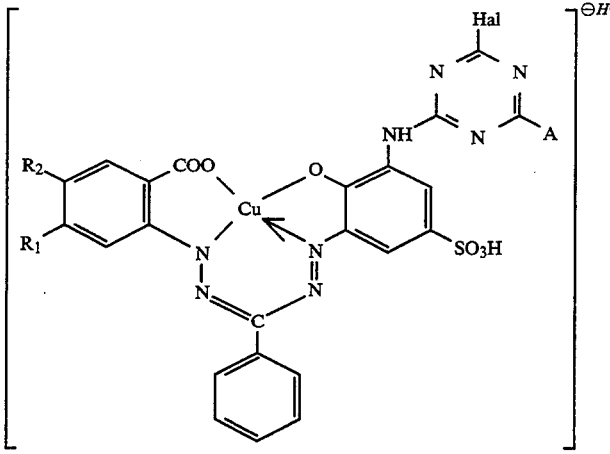

| Ex. | R₁ | R₂ | Hal | A | Hue | λmax |
|---|---|---|---|---|---|---|
| 31c | SO₃H | H | F | -phenyl with CH₃ and CH₂SO₂CH₂CH₂OSO₃H) | blue | 611 nm |
| 32 | H | SO₃H | F | —NH-phenyl-CH₂SO₂CH₂CH₂OSO₃H | blue | 617 nm |
| 33 | H | SO₃H | F | —NH-phenyl-CH₂SO₂CH₂CH₂OSO₃H (meta) | blue | 618 nm |
| 34 | H | SO₃H | F | —N(C₂H₅)-phenyl-CH₂SO₂CH₂CH₂OSO₃H | blue | 616 nm |
| 35 | H | SO₃H | F | —N(C₂H₅)-phenyl-CH₂SO₂CH=CH₂ | blue | 616 nm |
| 36 | H | SO₃H | F | —N(C₂H₅)-phenyl-CH₂SO₂CH₂CH₂OSO₃H (meta) | blue | 616 nm |
| 37 | H | SO₃H | F | —N(C₂H₅)-phenyl with Cl and CH₂SO₂CH₂CH₂OSO₃H | blue | 618 nm |
| 38 | H | SO₃H | F | —N(C₂H₅)-phenyl with CH₃ and CH₂SO₂CH₂CH₂OSO₃H | blue | 617 nm |

TABLE 1-continued

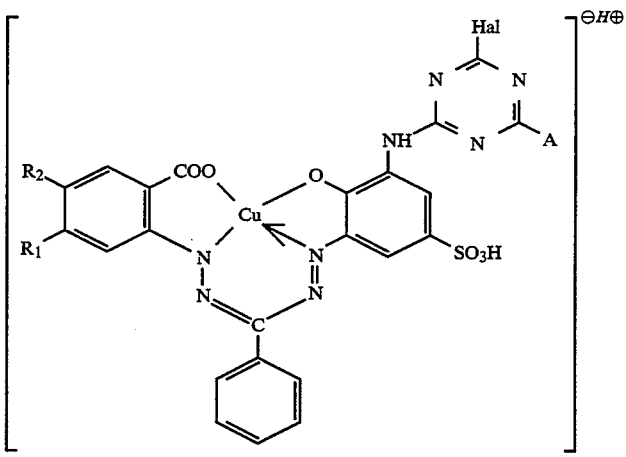

| Ex. | $R_1$ | $R_2$ | Hal | A | Hue | λmax |
|---|---|---|---|---|---|---|
| 38a | H | SO₃H | F | ![A group: -N(C₂H₅)-C₆H₃(OCH₃)(CH₂SO₂CH₂CH₂OSO₃H)] | blue | 618 nm |
| 39 | H | SO₃H | F | ![A group: -N(C₃H₇)-C₆H₄-CH₂SO₂CH₂CH₂OSO₃H] | blue | |
| 40 | H | SO₃H | F | ![A group: -NH-C₆H₃(SO₃H)(CH₂SO₂CH₂CH₂OSO₃H)] | blue | |
| 41 | H | SO₃H | F | ![A group: -N(C₂H₅)-C₆H₃(SO₃H)(CH₂SO₂CH=CH₂)] | blue | |

EXAMPLES 42 TO 50

Further dyestuffs according to the invention of the general formula

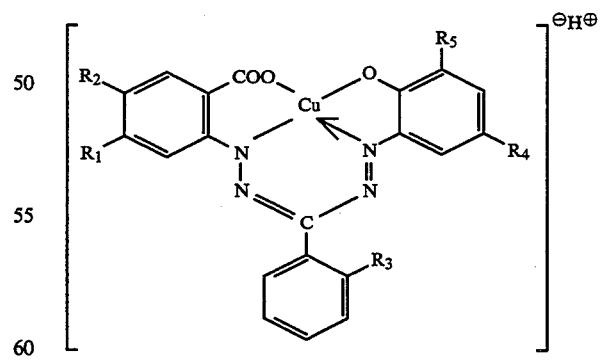

are obtained analogously to the exemplary embodiment by reacting the components listed in Table 2.

The dyestuffs obtained have very good fibre-reactive dyestuff properties and produce by the customary dyeing and printing processes dyeings and prints of high colour strength and good fastness properties in the hue on cotton listed in the particular table example.

TABLE 2
| Ex. | R₁ | R₂ | R₃ | R₄ | R₅ | A | Hue |
|---|---|---|---|---|---|---|---|
| 42 | SO₃H | H | SO₃H |  | SO₃H |  | reddish blue |
| 42a | SO₃H | H | SO₃H |  | SO₃H |  | reddish blue |
| 42b | SO₃H | H | SO₃H |  | SO₃H |  | reddish blue |
| 42c | SO₃H | H | SO₃H |  | SO₃H |  | blue |
| 43 | SO₃H | H | H |  | SO₃H |  | blue |

TABLE 2-continued
| Ex. | $R_1$ | $R_2$ | $R_3$ | $R_4$ | $R_5$ | A | Hue |
|---|---|---|---|---|---|---|---|
| 43a | SO$_3$H | H | H |  | SO$_3$H |  | blue |
| 43b | SO$_3$H | H | H | 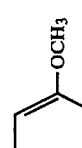 | SO$_3$H |  | blue |
| 43c | SO$_3$H | H | H | 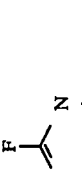 | SO$_3$H | 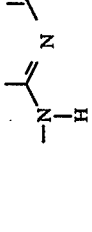 | blue |
| 43d | SO$_3$H | H | H |  | SO$_3$H |  | blue |
| 43e | SO$_3$H | H | H |  | SO$_3$H |  | blue |

TABLE 2-continued
| Ex. | $R_1$ | $R_2$ | $R_3$ | $R_4$ | $R_5$ | A | Hue |
|---|---|---|---|---|---|---|---|
| 44 | H | SO$_3$H | SO$_3$H |  | SO$_3$H |  | reddish blue |
| 45 | H | SO$_3$H | H |  | SO$_3$H |  | blue |
| 46 | H |  | SO$_3$H | SO$_3$H | SO$_3$H |  | blue |
| 47 | H | H | SO$_3$H | SO$_3$H | SO$_3$H |  | reddish blue |
| 48 | H | SO$_3$H | SO$_3$H | SO$_3$H |  |  | reddish blue |

TABLE 2-continued
| Ex. | R₁ | R₂ | R₃ | R₄ | R₅ | A | Hue |
|---|---|---|---|---|---|---|---|
| 49 | H | SO₃H | 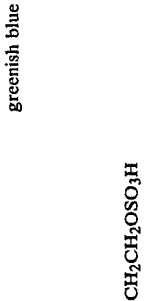 | SO₃H | H | 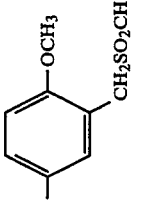 | greenish blue |
| 50 | H | SO₃H | SO₃H | SO₃H | 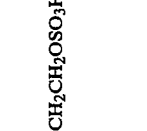 | 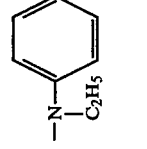 | reddish blue |
| 50a | H | SO₃H | SO₃H | SO₃H | 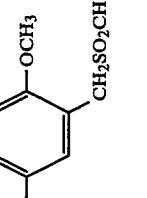 | 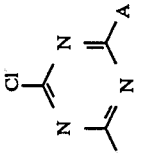 | reddish blue |
| 50b | H | SO₃H | SO₃H | SO₃H | 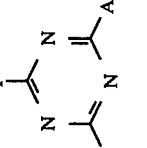 | 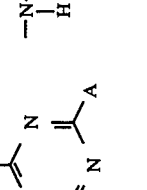 | reddish blue |
| 50c | SO₃H | H | SO₃H | SO₃H | 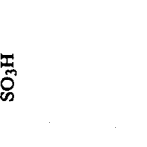 | 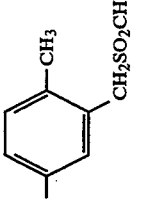 | reddish blue |

TABLE 2-continued
| Ex. | $R_1$ | $R_2$ | $R_3$ | $R_4$ | $R_5$ | A | Hue |
|---|---|---|---|---|---|---|---|
| 50d | SO$_3$H | H | SO$_3$H | SO$_3$H | 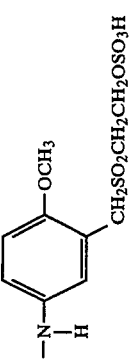 | 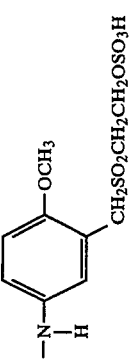 | reddish blue |
| 50e | SO$_3$H | H | SO$_3$H | SO$_3$H | 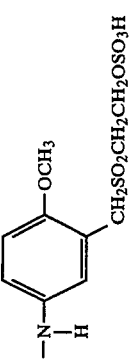 | 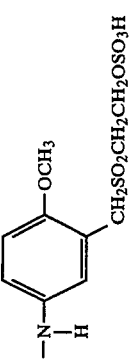 | reddish blue |

EXAMPLE 51

32.9 g of copper phthalocyanine compound of the formula

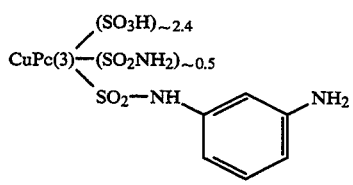

prepared by condensation of copper phthalocyanine tetra-(sulphochloride-sulphonic acid) with 3-aminoacetanilide and ammonia, followed by hydrolysis of the acetylamino group in dilute sodium hydroxide solution at 75° C. are dissolved in 420 ml of water at a pH of 7. The solution is added dropwise over a period of 30 minutes to a suspension prepared from a solution of 5.9 g of cyanuric chloride in 50 ml of acetone and 50 g of ice, and the temperature of the reaction mixture is maintained at 0° to 3° C., and the pH at 4.0 to 4.5 by metering in 2N sodium carbonate solution. 30 minutes after addition is complete, the resulting solution is clarified and 10.7 g of 4-aminobenzyl β-sulphatoethyl sulphone are added. The condensation is carried out at the pH of 6.0 to 6.5 by further addition of sodium carbonate solution and at 15° to 23° C. The dyestuff obtained is isolated either by evaporation or spray-drying or by salting out using 70 g of sodium chloride and filtration of the solution. It has the formula

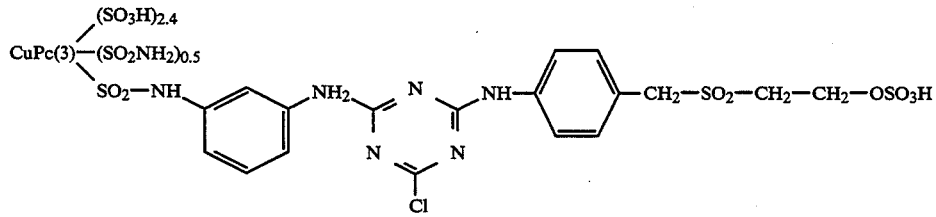

and dyes cotton from a long liquor or by the known padding process in greenish blue hues.

A similar dyestuff is obtained by repeating the procedure, using 33.9 g of copper phthalocyanine compound of the formula

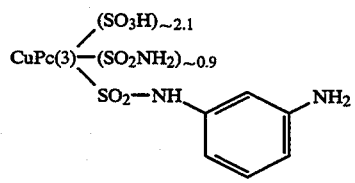

instead of the dyestuff base used at the beginning. The dyestuff thus obtained has an absorption of λmax of 668 nm, 629 nm in H₂O.

EXAMPLE 52

28.3 g of the copper phthalocyanine compound of the formula

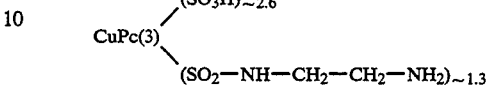

prepared by condensation of copper phthalocyanine tetra-(sulphochloride-sulphonic acid) with monoacetylethylenediamine, followed by hydrolytic cleavage of the acetyl radical with dilute sodium hydroxide solution at 75° C. are dissolved in 380 ml of water at a pH of 8.5. The solution is added dropwise over a period of 30 minutes to a suspension obtained by pouring a solution of 7.2 g of cyanuric chloride in 45 ml of acetone onto 45 g of ice. The pH of the reaction mixture is kept at 7.0 to 7.5 by adding 2N sodium hydroxide solution and the temperature is kept at 0° to 5° C. After stirring is continued for 1 hour, the solution is clarified, and 11.5 g of 4-aminobenzyl β-sulphatoethyl sulphone are added in portions to the filtrate. While the sulphone is sprinkled in and after that, the pH of the reaction mixture is kept at 6.0 to 6.5 and the temperature is increased first to 20° to 25° C. and after 2 hours to 30° C.

After condensation is complete, the dyestuff is salted out from the solution using sodium chloride, filtered off with suction and dried at 50° C. in vacuo. It has the formula

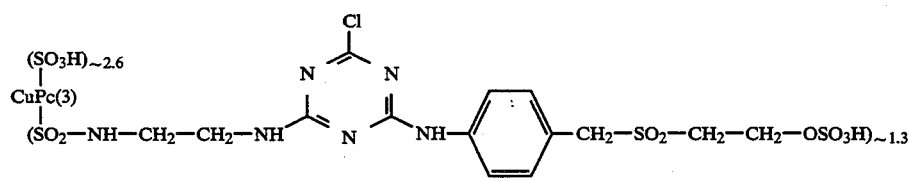

and produces on cotton greenish blue dyeings and prints.

Similar dyestuffs are obtained by using 28.4 g of the copper phthalocyanine compound of the formula

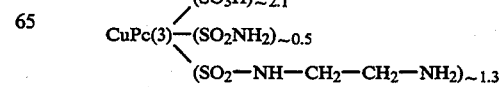

λmax = 668 nm, 629 nm in H₂O.

or 33.7 g of the copper phthalocyanine compound of the formula

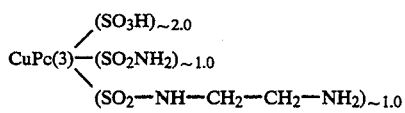

instead of the above copper phthalocyanine compound.

EXAMPLE 53

10.9 g of 4-aminobenzyl β-sulphatoethyl sulphone are dissolved in 150 ml of water at a pH of 5.5. 0.3 g of sodium fluoride is added to the solution, and the mixture is cooled to 0°–3° C. 6.1 g of cyanuric fluoride is run in with thorough stirring, and the pH is maintained at 4.5 using dilute sodium carbonate solution. After stirring is continued for a short period, condensation is complete.

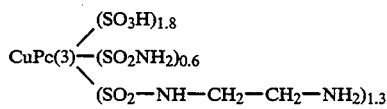

prepared by the details given in European Patent Specification 0,073,267 are dissolved in 300 ml of water at a pH of 7.0–7.5. The solution of the above condensation product is then run into the dyestuff component at 0°–5°, and the pH in the reaction mixture is maintained at 7.0 to 7.5. After 3 hours, the temperature is allowed to increase gradually to 20° C. and the pH is still kept constant. After reaction is complete, the product obtained is salted out from the solution, filtered off with suction, buffered with a small amount of phosphate solution at a pH of 6.0 and dried at 45° C. in vacuo. The dyestuff has the formula

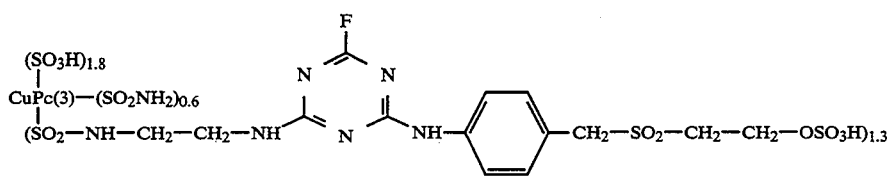

32 g of the copper phthalocyanine component of the formula and dyes cotton from a long liquor and by the known continuous process in greenish blue hues.

Further phthalocyanine reactive dyestuffs are obtained by condensing the metal phthalocyanine components and reactive components mentioned in Table 3 in an analogous manner.

TABLE 3

| Ex. | Phthalocyanine component | Reactive component | Hue |
|---|---|---|---|
| 54 | 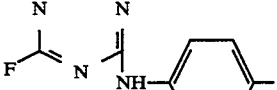 CuPc(3)—(SO$_3$H)$_{-2.6}$ / (SO$_2$—NH—[phenyl]—NH$_2$)$_{-1.2}$ | [triazine with 2 F, NH—phenyl—CH$_2$—SO$_2$—CH$_2$—CH$_2$—OSO$_3$H] | greenish blue |
| 55 | NiPc(3)—(SO$_3$H)$_{-2.8}$ / (SO$_2$—NH—[phenyl]—NH$_2$)$_{-1}$ | 1. [triazine with 3 Cl] <br> 2. NH$_2$—[phenyl]—CH$_2$—SO$_2$—CH$_2$—CH$_2$—OSO$_3$H | bluish green |
| 56 | NiPc(3)—(SO$_3$H)$_{2.5}$ / (SO$_2$—NH—CH$_2$—CH$_2$—NH$_2$)$_{-1.3}$ | [triazine with 2 F, NH—phenyl—CH$_2$—SO$_2$—CH$_2$—CH$_2$—OSO$_3$H] | bluish green |

TABLE 3-continued

| Ex. | Phthalocyanine component | Reactive component | Hue |
|---|---|---|---|
| 57 | NiPc(3)(SO$_3$H)$_{2.5}$(SO$_2$—NH—CH$_2$—CH$_2$—NH$_2$)$_{-1.3}$ | 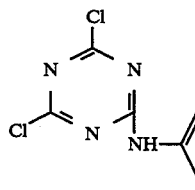 | bluish green |
| 58 | CuPc(3)(SO$_3$H)$_{-2.4}$(SO$_2$—NH—CH$_2$—CH$_2$—NH)$_{-1.5}$ with CH$_2$—CH$_2$OH branch | 1. 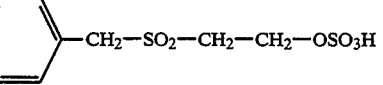<br>2. NH$_2$—C$_6$H$_4$—CH$_2$—SO$_2$—CH$_2$—CH$_2$—OSO$_3$H | greenish blue |
| 59 | CuPc(3)(SO$_3$H)$_{-2.5}$(SO$_2$—NH—C$_6$H$_3$(SO$_3$H)—NH$_2$)$_{-1.4}$ | 1. 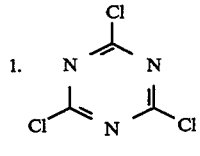<br>2. NH$_2$—C$_6$H$_4$—CH$_2$—SO$_2$—CH$_2$—CH$_2$—OSO$_3$H | greenish blue |
| 60 | CuPc(3)(SO$_3$H)$_{-2.5}$(SO$_2$—NH—C$_6$H$_3$(SO$_3$H)—NH$_2$)$_{-1.4}$ | 1. 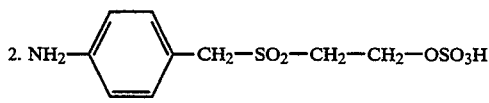<br>2. NH$_2$—C$_6$H$_4$—CH$_2$—SO$_2$—CH$_2$—CH$_2$—OSO$_3$H | greenish blue |

EXAMPLE 61

40 g of 1-amino-4-(2'-aminomethyl-4'-methyl-6'-sulphophenylamino)-anthraquinone-2-sulphonic acid are dissolved in 800 ml of water and 100 ml of acetone at a pH of 7 by neutralisation with about 45 ml of 2N sodium hydroxide solution. The mixture is cooled to 10° C., and a solution of 17.5 g of cyanuric chloride in 100 ml of acetone is added dropwise over a period of 15 to 20 minutes. During the dropwise addition, the pH in the reaction mixture is maintained at 6.0 to 7.0 with 2N sodium carbonate solution. When, about 1 hour after the addition of cyanuric chloride, sodium carbonate consumption has come to a standstill, a neutralised solution of 26.6 g of 4-aminobenzyl β-sulphatoethyl sulphone in 270 ml of water is run in at 20° C., the pH is maintained at 6.5 with sodium carbonate solution and the temperature is increased to 25°–30°. After condensation is complete, the dyestuff is precipitated by salting out, isolated and dried at 50° C. in vacuo. It has the formula

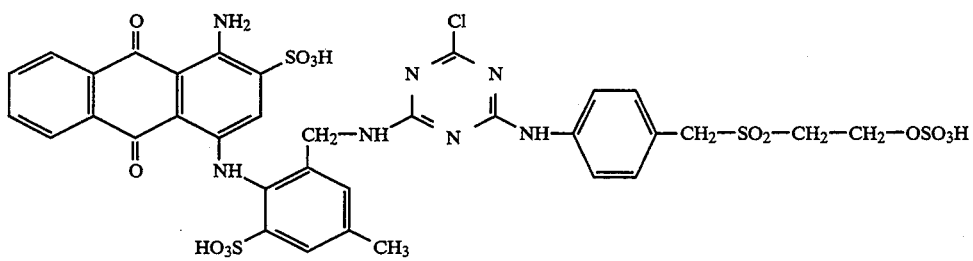

$\lambda_{max}$ = 626 nm, 588 in H$_2$O and produces on cellulose fibres by the known padding and printing processes brilliant reddish blue dyeings and prints.

EXAMPLE 62

53.1 g of 1-amino-4-(3'-amino-5'-sulpho-2',4',6'-trimethylphenylamino)-anthraquinone-2-sulphonic acid are dissolved in 530 parts of water at a pH of 6. 19.4 g of cyanuric chloride are dissolved in 100 ml of methyl ethyl ketone and the solution is poured onto 100 g of ice. The dyestuff solution is then added dropwise to the cyanuric chloride suspension at 0°-10° C. and the pH in the reaction mixture is maintained at 4.5 with 10% strength sodium carbonate solution. After reaction is complete, a neutralised solution of 31.0 g of 4-aminobenzyl β-sulphatoethyl sulphone in 310 ml of water are metered in and the pH is maintained at 5.8 to 6.0 with dilute sodium carbonate solution at a temperature of 20°-25° C. until condensation is complete. The dyestuff obtained of the formula

EXAMPLE 63

14.7 g of 1-amino-4-(3'-aminophenylamino)anthraquinone-2,4'-disulphonic acid are dissolved in 250 ml of water at a pH of 5 and 0°-5° C. 2.8 ml of cyanuric fluoride are added dropwise to the solution of the dyestuff component over a period of 5 to 10 minutes, and the pH is maintained at 4.2 to 4.7 with 2N sodium carbonate solution. After stirring is continued for a short period, condensation to give the difluorotriazinyl dyestuff is complete.

9.8 g of 4-aminobenzyl β-sulphatoethyl sulphone are slowly added to the solution of the reactive dyestuff component, while maintaining the pH at 5.0 to 5.6. The pH is then maintained at 6.0 to 6.5 and the temperature is increased gradually to 20° C. over a period of 15 hours, after which condensation is complete. The dyestuff is then salted out using 8% of potassium chloride over a period of 2 hours. The precipitated dyestuff of the formula

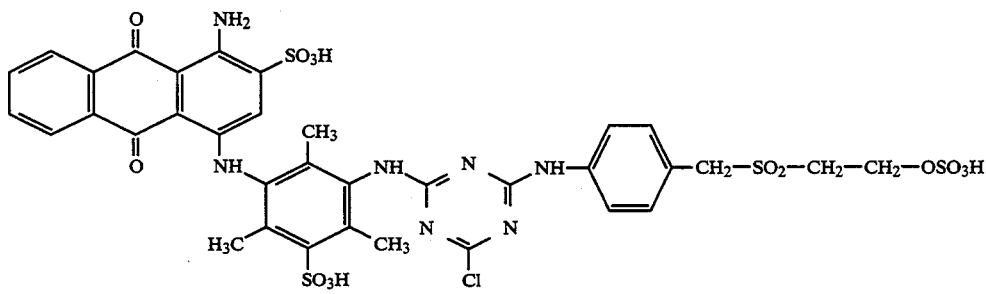

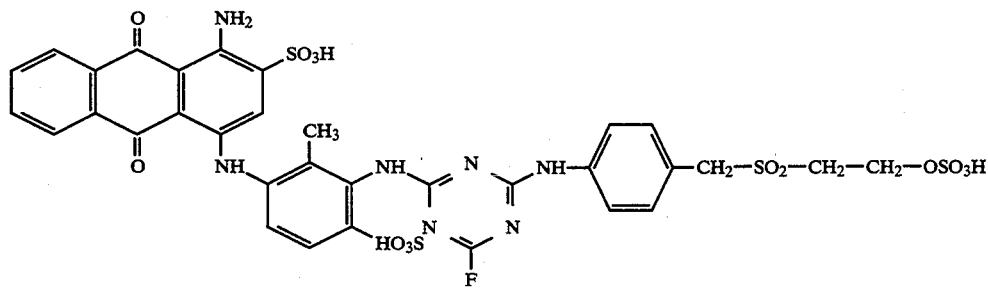

$\lambda_{max}$ = 602 nm in H$_2$O is isolated by salting out and filtration and dried at 50° C. in vacuo.

It produces on cotton brilliant reddish blue dyeings and prints.

A similar dyestuff is obtained by using the same amount of 3-aminobenzyl β-sulphatoethyl sulphone instead of the 4-aminobenzyl β-sulphatoethyl sulphone.

is filtered off with suction and washed with 10% strength potassium chloride solution until the runoff remains clear. Drying at 45° C. in vacuo gives a product with which cellulose fabric can be dyed and printed in blue hues.

EXAMPLE 64

13.2 g of 4-aminobenzyl β-sulphatoethyl sulphone are dissolved in 250 ml of water. After cooling the solution to 0°–5° C., the pH is brought to 4.5. 4.2 ml of cyanuric fluoride are added dropwise to the solution over a period of 15 minutes, and the pH is maintained at 4.0 to 4.5 using 2N sodium carbonate solution. A neutralised solution of 19.0 g of 1-amino-4-(3'-amino-2'-methyl-phenylamino)-anthraquinone-2,5'-disulphonic acid in 350 ml of water is added dropwise to the suspension of the reactive component obtained over a period of 30 minutes. During this addition, the temperature in the reaction solution is further maintained at 0° to 5° C. and the pH at 6.0 to 6.5 with sodium carbonate solution. After 2 hours, the temperature is allowed to increase gradually to 10° C. over a period of 15 hours. After condensation is complete, the dyestuff of the formula

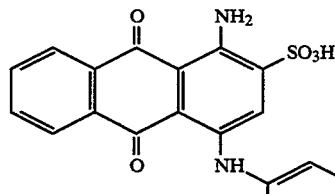

$\lambda_{max} = 597$ nm, ca. 625 nm in $H_2O$ is salted out from the solution using 10% sodium chloride, filtered off with suction, washed with 10% strength sodium chloride solution and dried at 45° C. in vacuo.

The dyestuff can be used to dye and print cellulose fibres in clear blue hues.

EXAMPLE 65

If in Example 64 a neutralised solution of 20.4 g of 1-amino-4-(4'-methyl-aminomethyl-phenylamino)-anthraquinone-2,2'-disulphonic acid is reacted, instead of the anthraquinone component listed there, with the condensation product of 13.6 g of 4-aminophenyl β-sulphatoethyl sulphone with 4.4 ml of cyanuric fluoride at 0° to 5° C. and a pH of 6.5 to 7.0, and the product is worked up as described there, a dyestuff of the formula

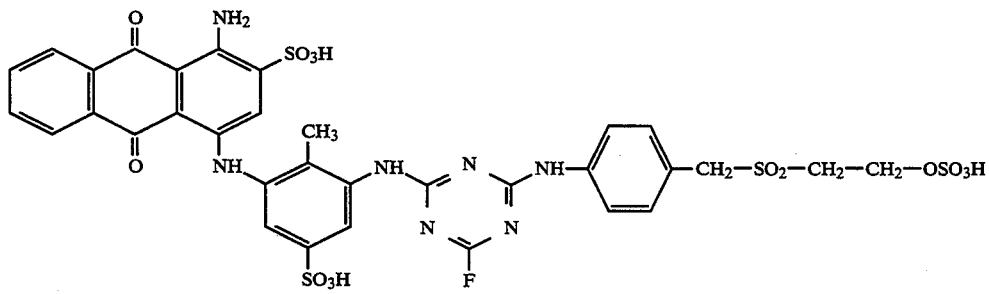

is obtained, which likewise produces on cotton by the customary techniques clear blue dyeings and prints.

EXAMPLE 66

9.6 g of cyanuric chloride are dissolved in 50 ml of acetone. The solution is poured onto 50 g of ice, and a neutralised solution of 14.8 g of 4-aminobenzyl β-sulphatoethyl sulphone in 200 ml of water is then added dropwise. Condensation is carried out by dropwise addition of 10% strength sodium carbonate solution at a pH of 4.5 to 4.7, while maintaining the temperature at 0°–5° C. and, after condensation is complete, at 15°–20° C.

17.6 g of the triphendioxazine compound of the formula

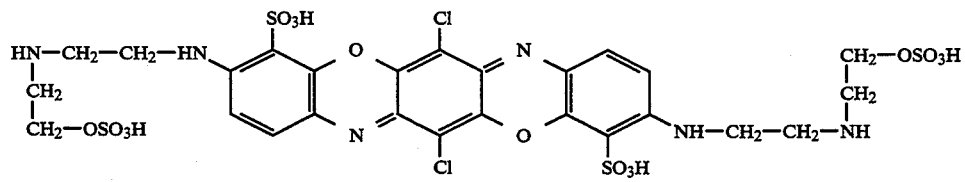

are dissolved in 600 ml of water by bringing the pH to 9 using 2N sodium hydroxide solution. The above reactive component is then added in portions to the solution, and the pH in the reaction mixture is maintained at 8.5 to 8.7 with 2N sodium hydroxide solution and the temperature at 15° to 20° C. After reaction is complete, the dyestuff of the formula

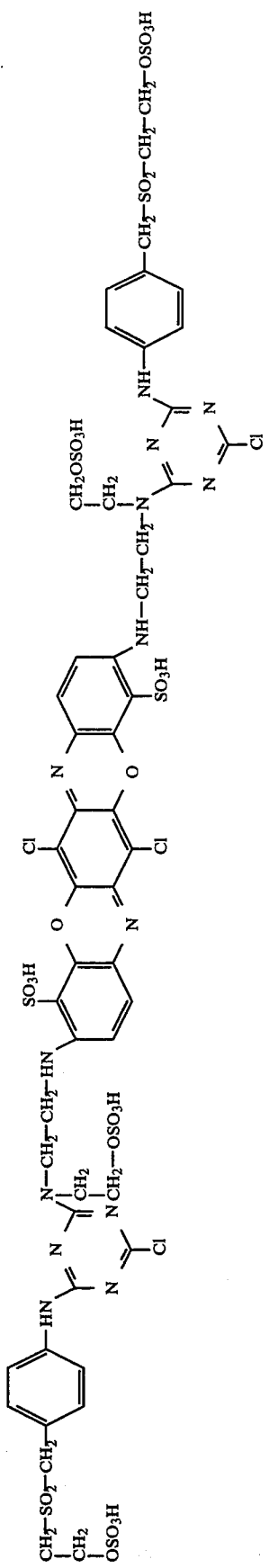

is salted out, filtered off with suction and dried at 50° C. in vacuo. It produces strong blue dyeings on cotton by the known dyeing techniques.

Further triphendioxazine reactive dyestuffs are obtained by reacting the following components:

| Ex. | Triphendioxazine | Reactive component | Hue |
|---|---|---|---|
| 67 | ![triphendioxazine structure with HN-CH2-CH2-HN-CH(CH2OSO3H)- substituent and NH-CH2-CH2-CH(CH2OSO3H)- substituent, SO3H groups, Cl groups] | ![structure: difluorotriazine-NH-phenyl-CH2-SO2-CH2-CH2-OSO3H] | blue |
| 68 | ![triphendioxazine structure with H2N-(CH2)2-HN- and -NH-(CH2)2-NH2 substituents, SO3H groups, Cl groups] | ![structure: dichlorotriazine-NH-phenyl-CH2-SO2-CH2-CH2-OSO3H] | blue |

EXAMPLE 69

27.3 g of 3,9-diamino-6,13-dichloro-triphendioxazine-4,11-disulphonic acid are dissolved in 900 ml of water by neutralisation with 10% strength lithium hydroxide solution. After cooling the solution to 0°–5° C., 10.8 g of cyanuric fluoride are added dropwise, and the pH is maintained at 5.5 to 6.0 with 10% strength lithium hydroxide solution. After reaction is complete, 23.6 g of 4-aminobenzyl β-sulphatoethyl sulphone are added in portions to the solution and the pH is further kept at 6.0 to 6.5. After 5 hours, the temperature is allowed to increase overnight to 20°–25° C. with further pH control. The solution is clarified with the addition of 1 g of kieselguhr, the dyestuff is salted out from the filtrate by adding 15% sodium chloride, filtered off with suction, washed with 15% strength sodium chloride solution and dried at 50° C. in vacuo.

The dyestuff of the formula

EXAMPLE 70 a 3.0 g of pyridine-3-carboxylic acid are added to a dyestuff solution synthesised according to Example 1. The solution is heated to 75°–80° and the pH is brought to 7.0 using 2N sodium carbonate solution until exchange of the fluorine atom for the nicotinic acid radical is complete. After cooling, the dyestuff can be salted out or the solution, after desalting and concentration, can be used as liquid dyestuff.

The dyestuff has the formula

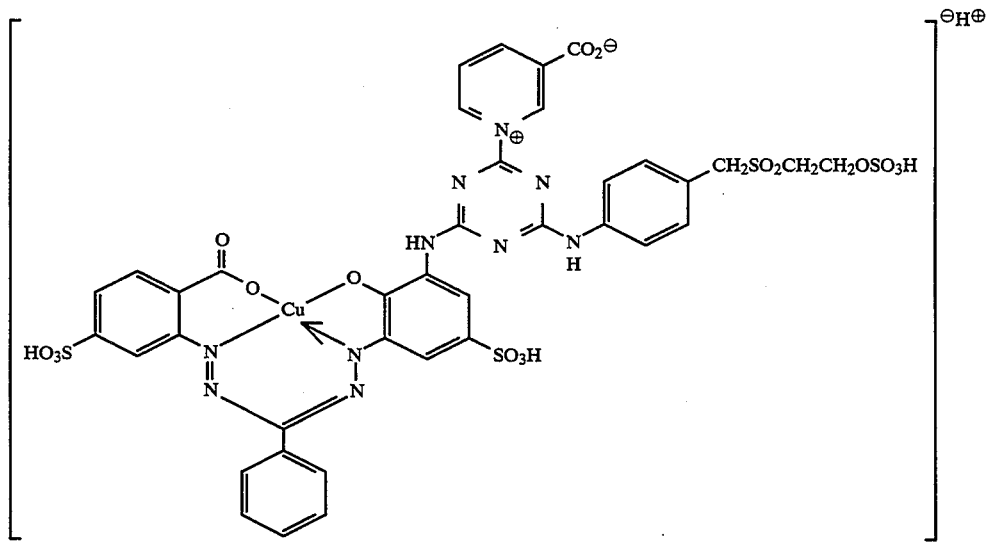

and dyes cotton from a long liquor similarly to the dyestuff from Example 1.

Similarly, the other fluoro- or chlorotriazine dyestuffs described in the previous examples can also be converted into the 3-carboxypyridinium triazine dyestuffs.

EXAMPLE 71

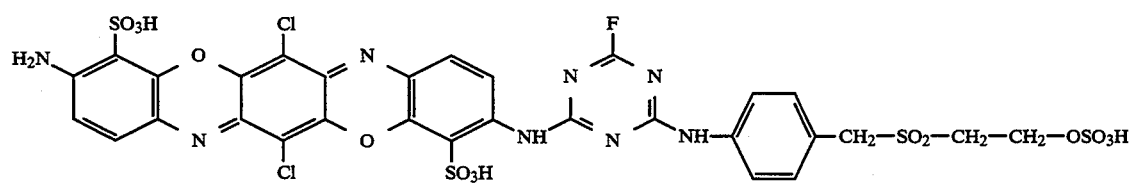

dyes cotton in strongly reddish blue hues.

EXAMPLE 70

Analogously to Example 69, the following triphendioxazine dyestuff

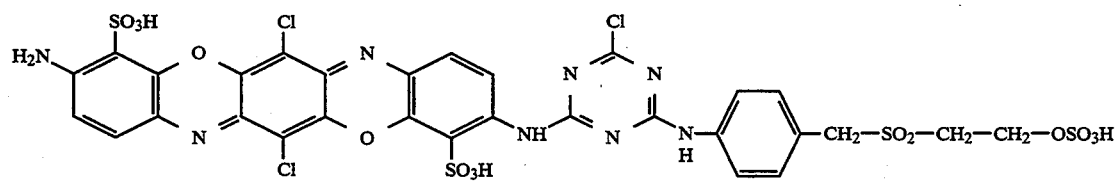

is obtained.

It dyes cotton in strongly reddish blue hues.

10 g of 4-aminobenzyl β-hydroxyethyl sulphone (prepared according to GB 877,250 [C.A. 56; 11758i]), after addition of 3.5 g of acetaldehyde and 4 g of Raney nickel, are put under a hydrogen pressure of 60 to 80 bar in an autoclave in 100 ml of methanol. The autoclave is heated to 40° C. and the hydrogen pressure is maintained until the reaction is complete. 100 ml of methanol are added to the contents of the autoclave, and the suspension is clarified while boiling hot by filtering off the nickel. Upon concentrating the filtrate, the amine of the formula

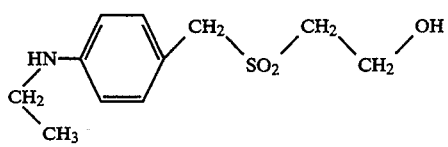

crystallises, is filtered off with suction from the cooled mixture and can be washed with a small amount of cold methanol.

$^1$H - NMR in D$_6$-DMSO (TMS as internal standard): δ=1.17 (t, 3H), 3.03 (m, 4H), 3.79 (q, 2H), 4.21 (s, 2H), 5.16 (t, NH), 5.61 (t, OH), 6.57 (d, 2H), 7.09 (d, 2H) ppm.

EXAMPLE 72

Example 71 is repeated, using 5-amino-2-chlorobenzyl β-hydroxyethyl sulphone (prepared according to EP 307,817 A1) instead of 4-aminobenzyl β-hydroxyethyl sulphone to give the amine of the formula

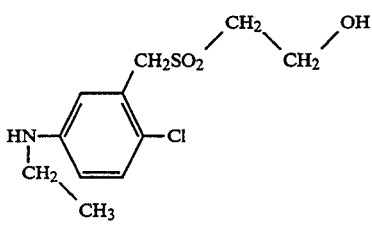

$^1$H - NMR in D$_6$-DMSO (TMS internal standard): δ=1.18 (t, 3H), 3.01 (q, 2H), 3.24 (t, 2H), 3.83 (t, 2H), 4.56 (s, 2H), 6.59 (dd, 1H), 6.77 (d, 1H), 7.19 (d, 1H) ppm.

EXAMPLE 73

3-Aminobenzyl β-hydroxyethyl sulphone can be converted, instead of 4-aminobenzyl β-hydroxyethyl sulphone used in Example 71, by the same process to the amine of the formula

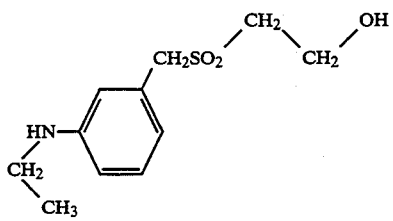

$^1$H - NMR in D$_6$-DMSO (TMS as internal standard): δ=1.18 (t, 3H), 3.05 (m, 2H), 3.14 (t, 2H), 3.81 (t, 2H), 4.31 (s, 2H), 5.22 (br., NH), 5.62 (t, OH), 6.55 (m, 3H) 7.08 (t, 1H) ppm.

The following compounds are obtained analogously:

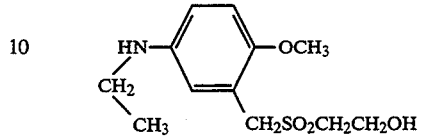

$^1$H - NMR in D$_6$-DMSO (TMS as internal standard): δ=1.13 (t, 3H), 2.95 (q, 2H), 3.11 (t, 2H), 3.65 (s, 3H), 3.75 (q, 2H), 4.26 (s, 2H), 5.00 (t, OH), 5.15 (br., NH), 6.46 (dd, 1H), 6.51 (d, 1H), 6.76 (d, 1H) ppm.

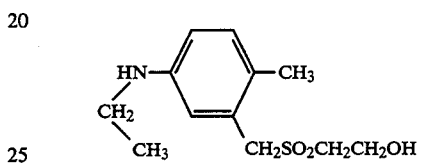

$^1$H - NMR in D$_6$-DMSO (TMS as internal standard): δ=1.18 (t, 3H), 2.20 (s, 3H), 3.00 (m, 2H), 3.26 (t, 2H), 3.84 (q, 2H), 4.40 (s, 2H), 5.20 (t, NH), 5.40 (t, OH), 6.46 (dd, 1H), 6.54 (d, 1H), 6.92 (d, 1H) ppm.

EXAMPLE 74

Alkylation can also be carried out using propionaldehyde instead of acetaldehyde used in Example 72. In this case an amine of the formula

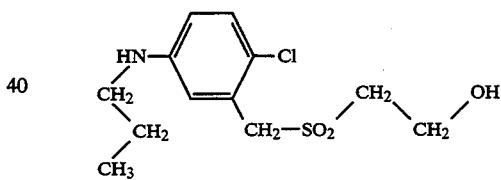

is obtained.

$^1$H - NMR in D$_6$-DMSO (TMS as internal standard): δ=0.95 (t, 3H), 1.55 (q, 2H), 2.92 (q, 2H), 3.24 (t, 2H), 3.81 (q, 2H), 4.50 (s, 2H), 5.19 (t, NH), 5.87 (t, OH), 6.58 (dd, 1H), 6.71 (d, 1H), 7.14 (d, 1H) ppm.

The following compounds are obtained analogously:

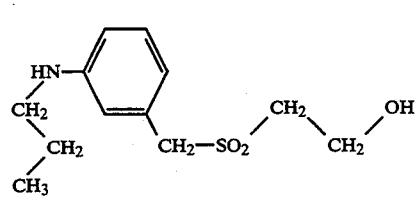

3-[N-Propyl]-aminobenzyl β-hydroxyethyl sulphone

-continued

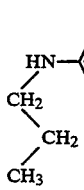
4-[N-Propyl]-aminobenzyl β-hydroxyethyl sulphone

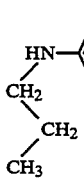
6-Methyl-3-[N-propyl]-aminobenzyl β-hydroxy-ethyl sulphone

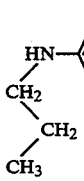
2-Methoxy-5-[N-propyl]-aminobenzyl β-hydroxy-ethyl sulphone

EXAMPLE 75

30 g of 4-[N-ethyl]aminobenzyl β-hydroxyethyl sulphone from Example 71 are introduced into 90 ml of 100% pure sulphuric acid at 0° to 10° C. The mixture is stirred for 2 hours and the solution obtained is introduced into 350 g of ice. The crystalline precipitate is filtered off with suction, washed with 25% strength sodium chloride solution until the filtrate is free of sulphate and dried at 50° C. in vacuo. The product obtained has the formula

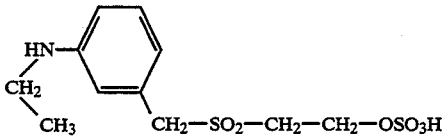

$^1$H - NMR in D$_6$-DMSO (TMS as internal standard):
δ=1.22 (t, 3H), 3.35 (m, 4H), 4.18 (t, 2H), 4.56 (s, 2H), 7.58 (m, 4H), 9.48 (br, NH) ppm.

The following amines are obtained analogously:

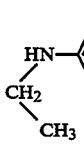

$^1$H - NMR in D$_6$-DMSO (TMS as internal standard):
δ=1.20 (t, 3H), 3.27 (q, 2H), 3.58 (t, 2H), 4.19 (t, 2H), 4.68 (s, 2H), 7.32 (dd, 1H), 7.46 (d, 1H), 7.60 (d, 1H), 9.10 (br, NH) ppm.

$^1$H - NMR in D$_6$-DMSO (TMS as internal standard):
δ=1.13 (t, 3H), 2.97 (m, 2H), 3.30 (t, 2H), 4.09 (t, 2H), 4.27 (S, 2H), 6.08 (m, 1H), 6.45 (m, 2H), 6.98 (m, 1H) ppm.

$^1$H - NMR in D$_6$-DMSO (TMS as internal standard):
δ=1.20, (t, 3H), 2.41 (s, 3H), 3.38 (m, 2H), 3.58 (t, 2H), 4.20 (t, 2H), 4.65 (s, 2H), 7.40 (m, 3H) ppm.

$^1$H - NMR in D$_6$-DMSO (TMS as internal standard):
δ=1.21 (t, 3H), 3.35 (q, 2H), 3.45 (t, 2H), 3.89 (s, 3H), 4.15 (t, 3H), 4.56 (s, 3H), 7.23 (d, 1H), 7.52 (m, 2H) ppm.

The following compounds are obtained analogously,

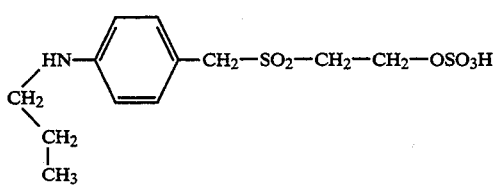

4-[N-propyl]-aminobenzyl β-sulphato-ethyl sulphone

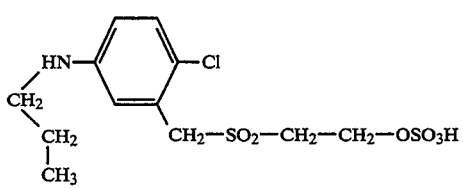

2-Chloro-5-[N-propyl]-aminobenzyl β-sulphato-ethyl sulphone

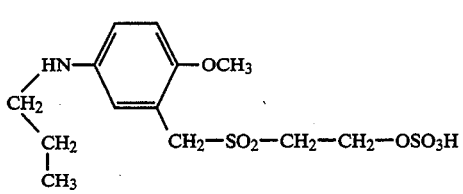

2-Methoxy-5-[N-propyl]-aminobenzyl β-sulphato-ethyl sulphone

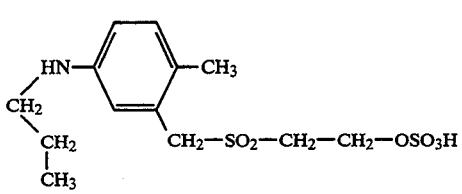

5-Methyl-3-[N-propyl]-aminobenzyl β-sulphato-ethyl sulphone

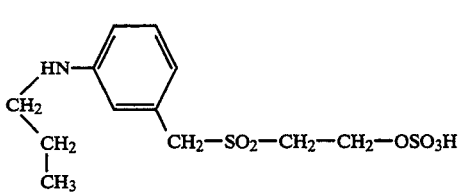

3-[N-propyl]-aminobenzyl β-sulphato-ethyl sulphone

EXAMPLE 76

78.4 g of 1-amino-8-hydroxynaphthalene-3,6-disulphonic acid (as the monosodium salt) are dissolved in 800 ml of water at a pH of 6.5. After cooling to 0° C., 21.5 ml of cyanuric fluoride is swiftly run in, and the pH is maintained at 4.0 to 4.5 using 20% strength sodium carbonate solution and the temperature is further maintained around 0° C.

72 g of the component of the formula

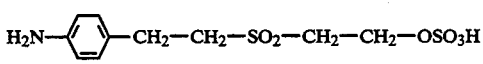

are dissolved in 500 ml of water by addition of 55 ml of 10% strength lithium hydroxide solution up to a pH of 6.9 at 0° to 3° C. The two solutions are combined, and the pH in the reaction mixture is maintained at 5.0 to 5.2 using 2N sodium carbonate solution.

51.3 g of 2-aminonaphthalene-1-sulphonic acid are dissolved in 575 ml of water by neutralisation using sodium hydroxide solution at a pH of 6.5 and 0° C. 57.5 ml of concentrated hydrochloric acid are added in one portion, and the mixture is then diazotised using 57.5 ml of 4N sodium nitrile solution. Stirring is continued for one hour, and any excess nitrite is then destroyed using sulphamic acid solution.

The diazo suspension obtained is then poured into the solution prepared above at 0° to 5° C., during which the pH in the mixture is maintained at 7.0 using 2N sodium carbonate solution. After 3 hours, the temperature is allowed to rise to 20° C., and stirring of the mixture is continued until the coupling is complete. The dyestuff obtained of the formula

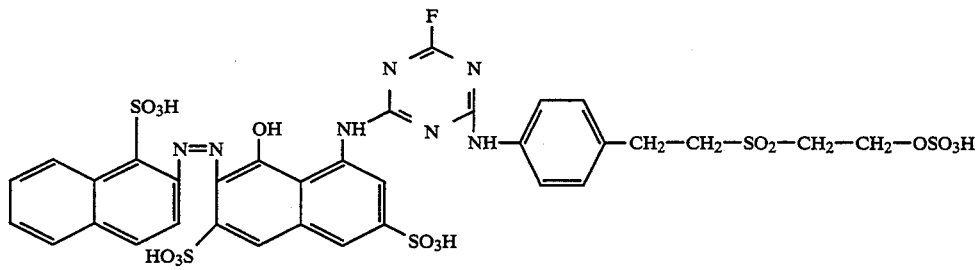

is salted out with sodium chloride, isolated and, after addition of a small amount of phosphate buffer, dried in vacuo at 50° C.

This dyestuff dyes cotton from a long liquor at an optimum dyeing temperature of 50° C. in bluish red hues giving high fixation yields.

$\lambda_{max}$=546 nm in water.

EXAMPLE 77

78.4 g of 1-amino-8-hydroxynaphthalene-3,6-disulphonic acid are reacted as in Example 76 with 21.5 ml of cyanuric fluoride. A solution of 89.5 g of the component of the formula

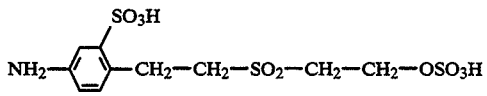

obtained by the procedure of Example 80, neutralised up to a pH of 6 and cooled to 0° to 3° C. is then added over a period of a few minutes, and the pH is maintained at 5.2 using 2N sodium carbonate solution.

When condensation is complete, a diazo suspension prepared from 51.3 g of 2-aminonaphthalene-1-sulphonic acid according to Example 76 is added. During this addition, the pH in the coupling mixture is maintained at 7.0 to 7.5 using sodium carbonate solution. The temperature is allowed to rise gradually to 10° C. over a period of 2½ hours and then to 20° C. overnight, during which the pH is further maintained at 7.0. The dyestuff is salted out with potassium chloride, filtered off with suction and washed with 25% strength potassium chloride solution. After addition of phosphate buffer, it is dried in vacuo at 50° C.

It has the formula $\lambda$max=546 nm in water.

EXAMPLE 78

78.4 g of 1-amino-8-hydroxynaphthalene-3,6-disulphonic acid are condensed by the procedure of Example 1 with 21.5 ml of cyanuric fluoride.

A solution of 72 g of

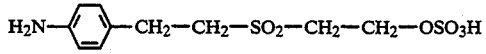

in 250 ml of water, cooled to 0° to 3° C. and brought to a pH of 5, is run in over a period of 10 minutes, during which the pH is maintained at 5.2 using 2N sodium carbonate solution.

The solution is prepared by sulphation of 2-(x-aminophenylethyl) 2-hydroxyethyl sulphone by the procedure of Example 81.

69.7 g of 2-aminonaphthalene-1,5-disulphonic acid are dissolved in 500 ml of water by addition of sodium hydroxide solution up to a pH of 7. The solution is cooled to 0° C., 67.5 ml of 4N sodium nitrite solution and 300 g of ice are added, and 60 ml of concentrated hydrochloric acid are poured in in one portion. After additional stirring for 1 hour, diazotisation is complete.

Sulphamic acid is added until no more nitrite can be detected.

The diazonium suspension is added at 0° C. to the initially introduced solution of the coupling component prepared above, and the pH in the coupling mixture is simultaneously maintained at 7.0 using dilute sodium carbonate solution. After 3 hours, the temperature is allowed to rise to 20° C., and, after coupling is complete, the dyestuff is salted out. It is filtered off with suction, washed and, after addition of a small amount of

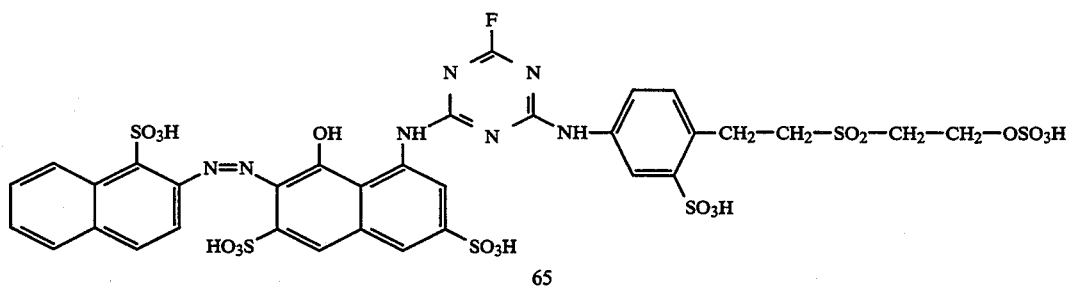

and dyes cotton in bluish red hues at an optimum dyeing temperature of 50° C. and a high fixation yield.

phosphate buffer, dried. The dyestuff of the formula

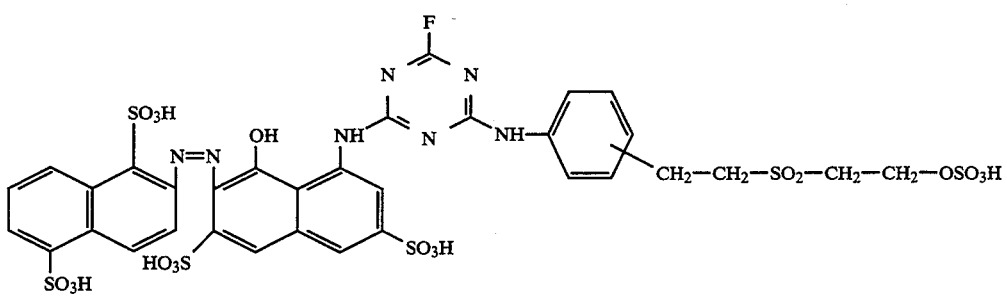

dyes cotton from a long liquor at an optimum dyeing temperature of 50° C. in bluish red hues giving good fixation hues.

$\lambda_{max}=541$ nm in water.

EXAMPLE 79

A. 500 g of styrene, 468 g of 2-mercaptoethanol, 5.0 g of azoisobutyronitrile are stirred, during which the temperature rises to 30° to 33° C. over a period of about one hour. Stirring overnight is continued, and the mixture is then heated at 50° C. for 5 to 6 hours.

The reaction is complete as soon as the $^1$H nuclear magnetic resonance spectrum no longer shows the characteristic styrene signals in the range of $\delta=4.80$, 5.30 and 6.26 ppm.

The colourless liquid obtained has the formula

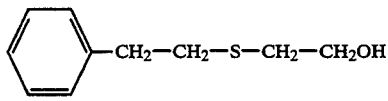

and still contains small amounts of 2-mercaptoethanol. After dilution with 4.4 l of water, the mixture is oxidised directly to the sulphone (see Section C).

B. The product obtained in A can also be obtained in the following manner:

176 g of 2-chloroethylbenzene, 107 g of 2-mercaptoethanol, 198 g of potassium carbonate and 840 ml of acetonitrile are refluxed at 86° C. for 4 hours with stirring and in a nitrogen atmosphere. The mixture is poured into 8 l of water, extracted with methylene chloride, and the methylene chloride phase is extracted with 2N sodiumcarbonate solution, washed with water and dried over sodium sulphate. After the methylene chloride has been distilled off in a rotary evaporator, at the end in vacuo at 50° C., a yellowish oil remains which is identical to the thio ether of Section A and shows the same signals in the $^1$H-NMR spectrum.

$^1$H-NMR (D$_6$-DMSO)
$\delta=2.60$ ppm (t, 2H)
$\delta=2.73-2.83$ ppm (m, 4H)
$\delta=3.53-3.60$ ppm (m, 2H)
$\delta=4.78$ ppm (t, 1H)
$\delta=7.20-7.30$ ppm (m, 5H)

C. 54 g of sodium acetate and 7 ml of glacial acetic acid are added to the emulsion of the 2-hydroxyethyl 2-phenylethyl sulphide in 4.4 l of water obtained in Section 79A such that a pH of 5.2 is reached.

This is followed by addition of a solution of 7.9 g of tungstic acid in 120 ml of water and 5 ml of 50% strength sodium hydroxide solution which before addition was likewise brought to a pH of 5.2 with 7 ml of glacial acetic acid. 932 g of 35% strength hydrogen peroxide are then run in at 55° to 60° C. over a period of one hour, during which a clear solution is formed in between which towards the end of the addition becomes cloudy again. A chromatographic sample shows that no more sulphide is present and substantially a mixture of the corresponding sulphoxide and sulphone is present. Oxidation to the sulphone is completed using another 480 g of 35% strength hydrogen peroxide and continuing to stir at 55° to 60° C. The mixture is then cooled to 0° C. The sulphone which has crystallised is filtered off with suction and washed with several portions of ice-water. Drying gives 920 g of the product which melts at 56° to 59° C.

$^1$H-NMR (D$_6$-DMSO)
$\delta=2.97-3.06$ ppm (m, 2H)
$\delta=3.26$ ppm (t, 2H)
$\delta=3.36-3.47$ ppm (m, 2H)
$\delta=3.79-3.88$ ppm (m, 2H)
$\delta=5.15$ ppm (t, 1H)
$\delta=7.20-7.36$ ppm (m, 5H)

D. 135 g of the above sulphone 79C are introduced at 0° C. into 445 ml of 96% strength sulphuric acid. As soon as a solution has been formed, 120 g of a mixed acid consisting of 40 g of nitric acid and 80 g of sulphuric acid are added dropwise at $-20°$ C. over a period of 2 hours. The temperature is allowed to rise to room temperature overnight. The mixture obtained is poured into 1.5 kg of ice and 2.5 l of water, and the resulting solution is refluxed at 106° C. for 4 hours in order to hydrolyse the sulphato group. The mixture is then cooled to 0° C. Upon stirring overnight or after seeding, the compound of the formula

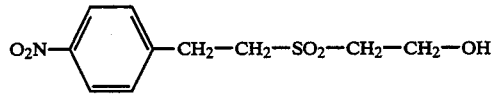

crystallises from the emulsion.

Melting point: 92°-93° C.

$^1$H-NMR (D$_6$-DMSO)
$\delta=3.12-3.22$ ppm (m, 2H)
$\delta=3.28$ ppm (t, 2H)
$\delta=3.47-3.53$ ppm (m, 2H)
$\delta=3.90$ ppm (t, 2H)
$\delta=4.74$ ppm (broad 1H)
$\delta=7.58$ ppm (d, 2H)
$\delta=8.17$ ppm (d, 2H)

E. 200 g of 2-(4-nitrophenyl)ethyl 2-hydroxyethyl sulphone from Example 79D are catalytically reduced in 800 ml of methanol after addition of 10 g of Raney nickel at 60° C. and a hydrogen pressure of 50 bar. The mixture is diluted with 1 l of methanol, the nickel is removed at the boil, and the filtrate is evaporated to dryness in a rotary evaporator, giving 172 g of an oil which upon cooling solidifies to a crystalline material:

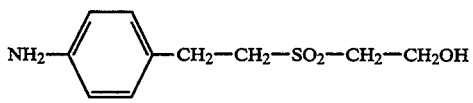

Melting point: 58°–62° C.
$^1$H-NMR (D$_6$-DMSO)
$\delta = 2.88$–$2.96$ ppm (m, 2H)
$\delta = 3.19$–$3.34$ ppm (t,m, 4H)
$\delta = 3.74$–$3.81$ ppm (m, 2H)
$\delta = 5.03$ ppm (s, 2H)
$\delta = 5.13$ ppm (t, 1H)
$\delta = 6.52$ ppm (d, 2H)
$\delta = 6.92$ ppm (d, 2H)

F. 172 g of 2-(4-aminophenyl)ethyl 2-hydroxyethyl sulphone from Example 79E are introduced at 0° C. into 260 ml of 96% strength sulphuric acid. 85 ml of 20% strength oleum are then added dropwise at 0° C. over a period of 30 minutes with cooling, and stirring is continued for another 2½ hours with further cooling. The solution is poured onto 1.4 kg of ice-water, the resulting precipitate is filtered off with suction and washed free of sulphuric acid with 1.5 l of isopropanol. Drying gives a product which has the formula

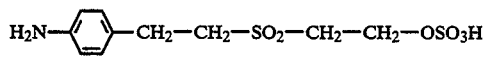

and has a content of 97.6%, relative to this formula.
$^1$H-NMR (D$_6$-DMSO)
$\delta = 3.00$–$3.08$ ppm (m, 2H)
$\delta = 3.34$–$3.48$ ppm (m, 4H)
$\delta = 4.17$ ppm (t, 2H)
$\delta = 7.28$ ppm (d, 2H)
$\delta = 7.48$ ppm (d, 2H)
$\delta = $ approx. 9.7 ppm (broad)

EXAMPLE 80

100 g of 2-(aminophenyl)ethyl 2-hydroxyethyl sulphone are introduced into a mixture of 147 ml of 20% strength oleum and 80 ml of 65% oleum at 10° to 15° C. When everything is dissolved, another 80 ml of 65% strength oleum are added at 15° to 20° C. with cooling, and the mixture is then stirred at 25° C. for 17 hours. A chromatographic sample after sulphation also indicates complete sulphonation of the aromatic ring. The mixture is then poured onto 1.5 kg of ice at such a rate that the temperature is maintained at 0° to 5° C. 460 g of calcium carbonate are added at 0° to 5° C. to the solution obtained until a pH of 4.3 is reached. The calcium sulphate is filtered off with suction, washed with water, and the combined filtrates are concentrated in vacuo at 35° C. in a rotary evaporator to about 500 g of solution. The solution of the product of the formula

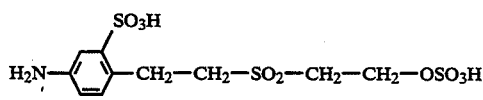

is obtained, whose content is found to be 0.324 mol=99% of theory by titration with sodium nitrite solution in acid medium and which can be used directly for preparing the dyestuffs described.

A sample of this solution completely evaporated in vacuo and dried shows the following signals in the nuclear magnetic resonance spectrum:
$^1$H-NMR (D$_6$DMSO)
$\delta = 3.28$–$3.48$ ppm (m, 6H)
$\delta = 4.13$ ppm (t, 2H)
$\delta = 6.75$ ppm (d, 1H)
$\delta = 7.20$ ppm (d, 1H)
$\delta = 7.32$ ppm (s, 1H)

EXAMPLE 81

A. 135 g of the 2-hydroxyethyl 2-phenylethyl sulphone from Example 79C are introduced into 780 g of 90% strength sulphuric acid at 0° C. The mixture is then stirred at 25° C. for 30 minutes until a clear solution is formed. 120 g of mixed acid consisting of 40 g of nitric acid and 80 g of sulphuric acid are added dropwise at −13° to −7° C. over a period of 4 to 5 hours, and the temperature is allowed to rise to about 0° C. overnight. The mixture is poured onto 2.7 kg of ice and 2 l of water and refluxed at 106° to 107° C. for 4 hours. It is cooled to 0° C., the somewhat soft crystalline material, after stirring overnight, is filtered off with suction and washed acid-free with 1,500 ml of ice water. After drying in vacuo at room temperature, 133 g of a mixture of isomers having a melting range of 69° to 83° C. and corresponding to the formulae

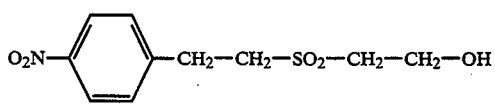

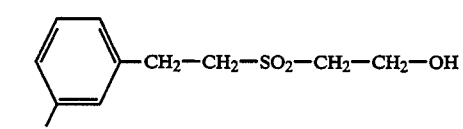

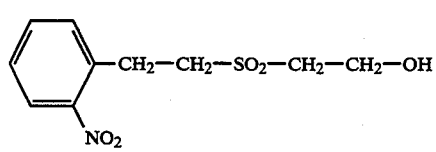

is obtained, in which the p isomer is predominant.

B. 133 g of the mixture of nitro isomers obtained above are reduced in 500 ml of methanol in an autoclave at 60° to 70° C. under a hydrogen pressure of 60 bar in the presence of Raney nickel. After clearing the solution diluted with 400 ml of methanol at 64° C., the solution obtained is evaporated. The remaining brownish oil crystallises upon standing, giving 115 g of crystals having the formula

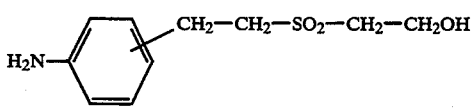

and a melting range of 45° to 51° C.

C. For sulphation, 100 g of the above aminosulphone compound are melted at 55° C., and the melt is slowly added dropwise to 150 ml of 96% strength sulphuric acid maintained at 25° C.

When everything is dissolved, the mixture is cooled to 0° C., 50 ml of 20% strength oleum are added, and the mixture is stirred at 0° to 5° C. for 15 hours. The solution is poured onto 800 g of ice and 800 ml of water, neutralised up to a pH of 5.2 using about 338 g of calcium carbonate, freed from calcium sulphate by filtration, the calcium sulphate is washed with water, and the combined filtrates are concentrated to about 600 ml, giving a solution of the sulphato compound of the formula

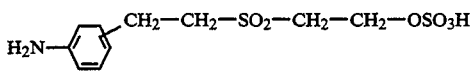

EXAMPLE 82

117 g of β-(4-nitrophenyl)ethyl chloride are heated to 50° to 60° C. in 500 ml of ethanol together with 67 g of 2-mercaptoethanol and 124 g of potassium carbonate. After the reaction is complete, the ethanol is distilled off in vacuo, the remaining oil is washed with water and, after emulsification in 400 ml of water, oxidised to the sulphone by the procedure of Example 79C using hydrogen peroxide

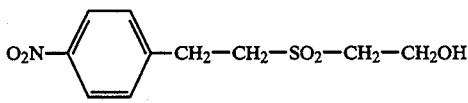

EXAMPLE 83

Analogously to Example 82, exchange of the chlorine atom in 2-nitrophenylethanol (after reaction with SOCl₂) for the 2-mercaptoethanol radical and oxidation of the thio ether obtained with H₂O₂ gives the compound of the formula

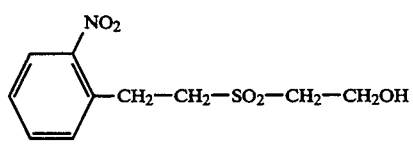

from which, after catalytic reduction of the nitro group, followed by esterification using sulphuric acid, the following compound can be prepared

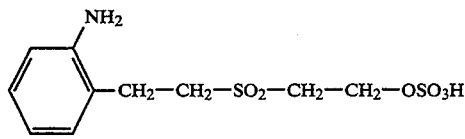

EXAMPLE 84

Analogously to Example 79A, 49.7 g of 3-nitrostyrene, 31.5 g of 2-mercaptoethanol and 0.4 g of azoisobutyronitrile are combined, the mixture is stirred overnight and then heated to 50° C. The compound obtained of the formula

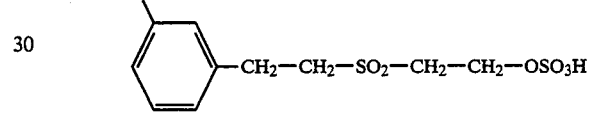

is oxidised analogously to Example 79C to the sulphone using H₂O₂, the nitro group is catalytically reduced, and the amino compound obtained is converted to the sulphato compound of the formula

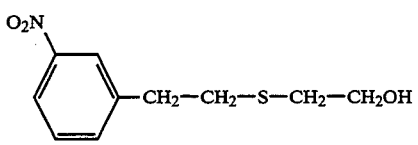

using sulphuric acid.

EXAMPLE 85

Using the procedure of Example 76, a solution of the coupling component

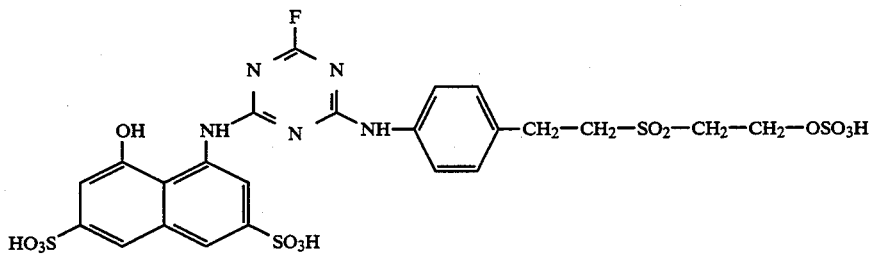

is prepared from 78.4 g of 1-amino-8-hydroxynaphthalene-3,6-disulphonic acid, 21.5 ml of cyanuric fluoride and 72 g of 2-(4-aminophenyl)ethyl 2-sulphatoethyl sulphone.

39.8 g of 2-aminobenzenesulphonic acid are dissolved in 300 ml of water and 112 ml of 2N sodium hydroxide solution at a pH of 6. 57.5 ml of 4N sodium nitrite solution are added. The solution obtained is run into a previously prepared mixture of 200 ml of water, 60 ml of concentrated hydrochloric acid and 2.5 ml of 4N sodium nitrite solution at 0° to 2° C. over a period of 30 minutes.

Stirring is then continued for 1 hour, any excess nitrous acid is removed using sulphamic acid, and the diazo suspension obtained is introduced at 0° to 3° C. into the above solution of the coupling component, during which the pH in the resulting mixture is maintained at 6.5 by simultaneous addition of 2N sodium carbonate solution. After stirring for 2 hours with cooling, the temperature is allowed to rise to 20° C.

After coupling is complete, the dyestuff is salted out with sodium chloride, filtered off with suction, washed with 25% strength sodium chloride solution and, after buffering, dried at 50° C. in vacuo.

It has the formula and dyes cotton from a long liquor at an optimum dyeing temperature of 50° C. in red hues and in good fixation yields.

$\lambda_{max}$=532 nm in water.

Further dyestuffs are synthesised analogously from the components shown in the list below.

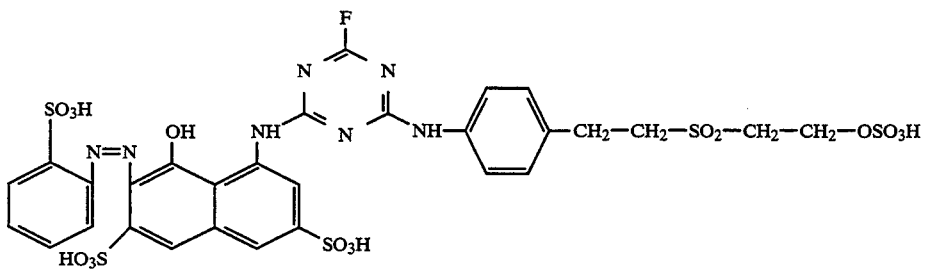

| No. | Diazo component | 1-Amino-8-hydroxy-naphthalene-disulph. | Triahalogeno-triazine | | Hue | $\lambda_{max}(H_2O)$ |
|---|---|---|---|---|---|---|
| 86 | 2-amino-1,5-naphthalenedisulfonic acid structure | 1-amino-8-hydroxynaphthalene-3,6-disulfonic acid | trifluorotriazine | aniline with NH-R₂, (SO₃H)₀₋₁, W-SO₂-CH₂-CH₂-OSO₃H | bluish red | 541 nm |
| 87 | 2-amino-1-naphthalenesulfonic acid | 1-amino-8-hydroxynaphthalene-3,6-disulfonic acid | trifluorotriazine | 4-aminophenyl-CH₂-CH₂-SO₂-CH₂-CH₂-OSO₃H | bluish red | 546 nm |
| 88 | 2-amino-1-naphthalenesulfonic acid | 1-amino-8-hydroxynaphthalene-3,6-disulfonic acid | trifluorotriazine | 4-aminophenyl-CH₂-CH₂-SO₂-CH₂-CH₂-OSO₃H | bluish red | 546 nm |
| 89 | 2-aminobenzenesulfonic acid | 1-amino-8-hydroxynaphthalene-3,6-disulfonic acid | trifluorotriazine | 3-aminophenyl-CH₂-CH₂-SO₂-CH₂-CH₂-OSO₃H | red | 532 nm |
| 90 | 2-aminobenzenesulfonic acid | 1-amino-8-hydroxynaphthalene-3,6-disulfonic acid | trifluorotriazine | 2-aminophenyl-CH₂-CH₂-SO₂-CH₂-CH₂-OSO₃H | red | 533 nm |

| No. | Diazo component | 1-Amino-8-hydroxy-naphthalene-disulph. | Triahalogeno-triazine | | Hue | $\lambda_{max}(H_2O)$ |
|---|---|---|---|---|---|---|
| 91 | 2-amino-1-naphthalenesulfonic acid structure | 1-amino-8-hydroxy-3,6-naphthalenedisulfonic acid | trifluorotriazine | aniline with NH-C2H5 and CH2-SO2-CH2-CH2-OSO3H | bluish red | |
| 92 | 2-amino-1,5-naphthalenedisulfonic acid | 1-amino-8-hydroxy-3,6-naphthalenedisulfonic acid | trifluorotriazine | aniline with NH2 and CH2-CH2-SO2-CH2-CH2-OSO3H | bluish red | |
| 93 | 2-amino-1,5-naphthalenedisulfonic acid | 1-amino-8-hydroxy-3,6-naphthalenedisulfonic acid | trifluorotriazine | aniline with NH2, SO3H and CH2-CH2-SO2-CH2-CH2-OSO3H | bluish red | |
| 94 | 2-amino-1-naphthalenesulfonic acid | 1-amino-8-hydroxy-3,6-naphthalenedisulfonic acid | trifluorotriazine | aniline with NH2, SO3H and CH2-CH2-SO2-CH2-CH2-OSO3H | bluish red | |

| No. | Diazo component | 1-Amino-8-hydroxy-naphthalene-disulph. | Triahalogeno-triazine | | Hue | $\lambda_{max}(H_2O)$ |
|---|---|---|---|---|---|---|
| 95 | (structure: naphthalene with SO₃H, NH₂, SO₃H) | (H-acid structure) | (trifluorotriazine) | (aniline with NH–R₂, (SO₃H)₀₋₁, W–SO₂–CH₂–CH₂–OSO₃H) | bluish red | 541 nm |
| 96 | (structure: naphthalene with SO₃H, NH₂, SO₃H) | (H-acid structure) | (trifluorotriazine) | (m-aminophenyl-CH₂–CH₂–SO₂–CH₂–CH₂–OSO₃H) | bluish red | 541 nm |
| 97 | (structure: naphthalene with SO₃H, SO₃H) | (H-acid structure) | (trifluorotriazine) | (aniline with SO₃H and CH₂–CH₂–SO₂–CH₂–CH₂–OSO₃H) | bluish red | |
| 98 | (structure: naphthalene with SO₃H, NH₂) | (H-acid structure) | (trifluorotriazine) | (aniline with CH₂–CH₂–SO₂–CH₂–CH₂–OSO₃H) | bluish red | |
|  |  |  |  | (aniline with (CH₂)₂–SO₂–CH₂–CH₂–OSO₃H, SO₃H) |  |  |

-continued

| No. | Diazo component | 1-Amino-8-hydroxy-naphthalene-disulph. | Triahalogeno-triazine | | Hue | λ$_{max}$(H$_2$O) |
|---|---|---|---|---|---|---|
| 99 | H$_3$C–C$_6$H$_3$(SO$_3$H)(NH$_2$) | 1-amino-8-hydroxy-3,6-naphthalenedisulfonic acid | trifluorotriazine | aniline with NH–R$_2$, (SO$_3$H)$_{0-1}$, W–SO$_2$–CH$_2$–CH$_2$–OSO$_3$H | bluish red | |
| 100 | aniline | 1-amino-8-hydroxy-3,6-naphthalenedisulfonic acid | trifluorotriazine | 4-aminophenyl–(CH$_2$)$_3$–SO$_2$–CH$_2$–CH$_2$–OSO$_3$H | red | |
| 101 | 4-aminobenzenesulfonic acid | 1-amino-8-hydroxy-3,6-naphthalenedisulfonic acid | trifluorotriazine | 2-(N-ethylamino)-5-sulfophenyl–(CH$_2$)$_2$–SO$_2$–CH$_2$–CH$_2$–OSO$_3$H | red | |
| 102 | 2-amino-1,5-naphthalenedisulfonic acid | 1-amino-8-hydroxy-3,6-naphthalenedisulfonic acid | trifluorotriazine | 4-aminophenyl–CH$_2$–CH$_2$–SO$_2$–CH$_2$–CH$_2$–OSO$_3$H; 3-aminophenyl–CH$_2$–CH$_2$–SO$_2$–CH$_2$–CH$_2$–OSO$_3$H | bluish red | 545 nm |

EXAMPLE 103

41.7 g of the azo compound of the formula

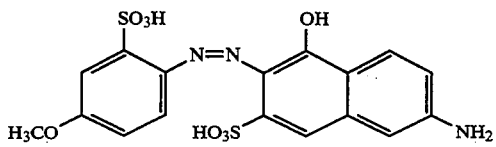

are dissolved in 800 ml of water by bringing the pH to 4.5 using 2N sodium hydroxide solution. After cooling of the solution to 0° C., 8.2 ml of cyanuric fluoride are added dropwise over a period of 10 minutes, and the pH is maintained at 4.5 to 4.7 using 2N sodium carbonate solution. Stirring is continued for 10 minutes, and a neutral solution of 39.4 g of the component of the formula

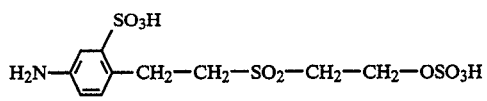

in 150 ml of water, which is obtained by the procedure of Example 80, is then added. While this solution is metered in, the temperature is further maintained at 0° to 2° C. and the pH at 5.5 to 5.7 with sodium carbonate solution. After 2 hours, the temperature is allowed to rise to 20° C. When condensation is complete, the dyestuff is salted out with potassium chloride, filtered off with suction, washed with 15% strength potassium chloride solution and, after addition of a small amount of phosphate buffer solution, dried at 50° C. in vacuo.

The dyestuff of the formula

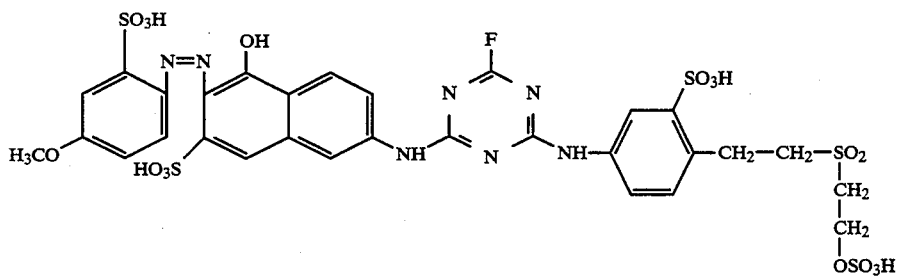

dyes cotton from a long liquor at an optimum dyeing temperature of 50° C. and a high fixation yield in scarlet hues.

$\lambda_{max}$=500 nm in water.

EXAMPLE 104

24.5 g of the azo compound of the formula

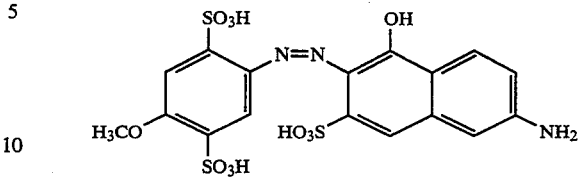

are dissolved in 340 ml of water at a pH of 7. After cooling to 0° to 2° C., the pH is brought to 4.5 using dilute hydrochloric acid, and 4.3 ml of cyanuric fluoride are immediately added dropwise over a period of 4 minutes. The pH is further maintained at 4.5 with 2N sodium carbonate solution. 15 minutes later, the reaction is complete. A solution of 18.6 g of the component of the formula

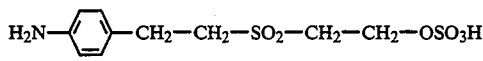

in 100 ml of water, which was brought to a pH of 6 with 10% strength lithium hydroxide solution, is added, and the pH in the reaction mixture is maintained at 5.0 to 5.5. After 2 hours, the temperature is allowed to rise to 20° C. 1 g of primary sodium phosphate is added, the pH is brought to 5.5 with sodium hydroxide solution, and the solution is then evaporated at 35° to 40° C. in vacuo in a rotary evaporator, giving an orange powder which dyes cotton from a long liquor at an optimum dyeing temperature of 40° to 60° C. and excellent fixation yield in reddish orange hues.

The dyestuff obtained has the formula

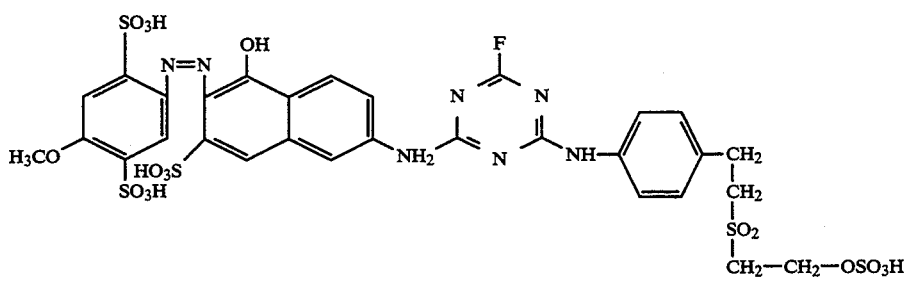

$\lambda_{max}$ = 497 nm in water.

Further orange-dyeing dyestuffs are obtained by condensing the following azo components analogously with cyanuric fluoride and aminophenylalkyl β-sulphatoethyl sulphones.

| No. | Azo component | | Hue | $\lambda_{max}(H_2O)$ |
|---|---|---|---|---|
| 105 | (naphthalene with OH, N=N, SO3H, HO3S, SO3H, NH2 substituents) | (phenyl with NH-R2, (SO3H)0-1, W-SO2-CH2-CH2-OSO3H) | orange | 486 nm |
| 106 | (naphthalene with OH, N=N, SO3H, HO3S, SO3H, NH2 substituents) | (phenyl with NH2, (CH2)2-SO2-CH2-CH2-OSO3H) | orange | 485 nm |
| 107 | (naphthalene with OH, N=N, SO3H, HO3S, SO3H, NH-C2H5 substituents) | (phenyl with NH2, SO3H, (CH2)2-SO2-CH2-CH2-OSO3H) | orange | |
| 108 | (naphthalene with OH, N=N, HO3S, SO3H, SO3H, SO3H, NH2 substituents) | (phenyl with NH2, (CH2)2-SO2-CH2-CH2-OSO3H) | orange | 483 nm |

-continued
| No. | Azo component | | Hue | $\lambda_{max}(H_2O)$ |
|---|---|---|---|---|
| 109 | 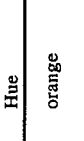 |  | orange | 482 nm |
| 110 |  | 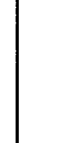 | orange | |
| 111 |  |  | orange | |
| 112 | 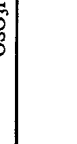 | 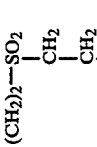 | scarlet | |

| No. | Azo component | (structure column) | Hue | $\lambda_{max}(H_2O)$ |
|---|---|---|---|---|
| 113 | naphthalene with OH, NH-CH$_3$, N=N-phenyl(SO$_3$H, H$_3$CO), HO$_3$S | phenyl-NH-R$_2$ with (SO$_3$H)$_{0-1}$ and W-SO$_2$-CH$_2$-CH$_2$-OSO$_3$H | scarlet | 502 nm |
| 114 | naphthalene with OH, NH$_2$, N=N-naphthalene(SO$_3$H, HO$_3$S, SO$_3$H) | phenyl-NH$_2$ with (CH$_2$)$_2$-SO$_2$-CH$_2$-CH$_2$-OSO$_3$H | orange |  |
| 115 | naphthalene with OH, NH$_2$, N=N-naphthalene(SO$_3$H, HO$_3$S, SO$_3$H) | phenyl-NH$_2$ with CH$_2$-CH$_2$-SO$_2$-CH$_2$-CH$_2$-OSO$_3$H | orange | 486 nm |
| 116 | naphthalene with OH, NH$_2$, N=N-phenyl(SO$_3$H, HO$_3$S)-N=N-phenyl-SO$_3$H | phenyl-NH$_2$ with CH$_2$-CH$_2$-CH$_2$-SO$_2$-CH$_2$-CH$_2$-OSO$_3$H | yellowish red |  |

-continued

| No. | Azo component | | Hue | $\lambda_{max}(H_2O)$ |
|---|---|---|---|---|
| 117 | HO₃S—[benzene(SO₃H)]—N=N—[benzene(SO₃H)]—N=N—[naphthalene(OH)(HO₃S)(NH₂)] | [benzene(SO₃H)₀₋₁, W—SO₂—CH₂—CH₂—OSO₃H, NH—R₂] | yellowish red | |
| 118 | H₃CO—[benzene(SO₃H)]—N=N—[naphthalene(OH)(HO₃S)(NH₂)] | [benzene—(CH₂)₂—SO₂—CH₂—CH₂—OSO₃H, NH₂] | yellowish red | 501 nm |
| 119 | H₃CO—[benzene(SO₃H)]—N=N—[naphthalene(OH)(HO₃S)(NH₂)] | [benzene(SO₃H)—CH₂—CH₂—SO₂—CH₂—CH₂—OSO₃H, NH₂] | scarlet | 501 nm |
| 120 | H₃CO—[benzene(SO₃H)]—N=N—[naphthalene(OH)(HO₃S)(NH₂)] | [benzene—(CH₂)₂—SO₂—CH₂—CH₂—OSO₃H, NH(C₂H₅)] | | 501 nm |

EXAMPLE 12

35.0 g of the coupling product of 2-aminonaphthalene-6,8-disulphonic acid with 3-aminoacetanilide are dissolved in 600 ml of water at a pH of 5.5 with heating to 50° C. The mixture is cooled to 0° C., and 7.7 ml of cyanuric fluoride are added dropwise over a period of 5 to 10 minutes. During this addition, the pH is maintained at 5.2 to 5.5 using dilute sodium carbonate solution. When the reaction is complete after about 10 to 15 minutes, a solution of 35.0 g of the compound

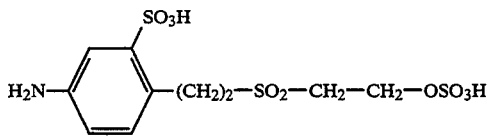

in 120 ml of water, brought to a pH of 5.5, is added dropwise, and the pH is maintained at 5.5 to 5.7 with dilute sodium carbonate solution and the temperature at 0° to 5° C., later increasing to 15° to 20° C. After addition of 1.5 g of phosphate buffer of pH 6, the solution obtained is evaporated at 35° to 40° C. in vacuo or spray-dried. The dyestuff obtained of the formula

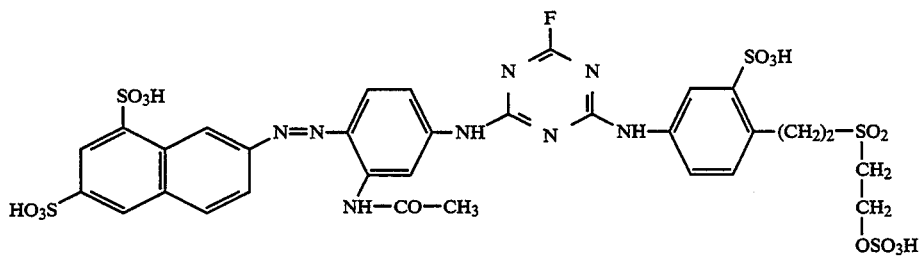

dyes cotton from a long liquor at an optimum dyeing temperature of 50° C. in golden yellow hues.

$\lambda_{max}$=389 nm in water.

Further reddish yellow-dyeing dyestuffs are obtained by condensation of the following p-aminoazo compounds with cyanuric fluoride and aminophenylalkyl β-sulphatoethyl sulphones.

| No. | Azo component | Trihalogenotriazine | | Hue | $\lambda_{max}(H_2O)$ |
|---|---|---|---|---|---|
| 122 | (naphthalene with SO₃H, HO₃S, SO₃H substituents)—N=N—(benzene with NH.CO.NH₂, NH₂) | F-triazine-F, F | (benzene with (SO₃H)₀₋₁, NH-R₂, W-SO₂-CH₂-CH₂-OSO₃H) | reddish yellow | 416 nm |
| 123 | (naphthalene with SO₃H, HO₃S, SO₃H)—N=N—(benzene with NH.COCH₃, NH₂) | F-triazine-F, F | (benzene with NH₂, (CH₂)₂-SO₂-CH₂-CH₂-OSO₃H) | reddish yellow | 393 nm |
| 124 | (naphthalene with SO₃H, SO₃H)—N=N—(benzene with NH.COCH₃, NH₂) | F-triazine-F, F | (benzene with SO₃H, NH₂, CH₂-CH₂-SO₂-CH₂-CH₂-OSO₃H) | reddish yellow | 389 nm |
| 125 | (naphthalene with SO₃H, SO₃H)—N=N—(benzene with NH.CO.NH₂, NH₂) | F-triazine-F, F | (benzene with NH₂, CH₂-CH₂-SO₂-CH₂-CH₂-OSO₃H, SO₃H); also (CH₂)₂-SO₂-CH₂-CH₂-OSO₃H, SO₃H | reddish yellow | |

-continued

| No. | Azo component | Trihalogenotriazine | (structure with NH-R2, W-SO2-CH2-CH2-OSO3H, (SO3H)0-1) | Hue | λ_max(H2O) |
|---|---|---|---|---|---|
| 126 | naphthalene with SO3H, HO3S, SO3H, N=N, NH2, NH.COCH3 | F-triazine-F,F | phenyl with CH2-CH2-SO2-CH2-CH2-OSO3H, NH2 | reddish yellow | |
| 127 | naphthalene with SO3H, HO3S, N=N, CH3, NH2 | F-triazine-F,F | phenyl with (CH2)4-SO2-CH2-CH2-OSO3H, SO3H, NH2 | reddish yellow | |
| 128 | phenyl with SO3H, HO3S, N=N, NH.CO.NH2, NH2 | F-triazine-F,F | phenyl with CH2-CH2-SO2-CH2-CH2-OSO3H, NH2 | reddish yellow | 386 nm |
| 129 | phenyl with SO3H, HO3S, N=N, NH.CO.NH2, NH2 | F-triazine-F,F | phenyl with CH2-CH2-SO2-CH2-CH2-OSO3H, NH-C2H5 | reddish yellow | |

-continued

| No. | Azo component | Trihalogenotriazine | | Hue | $\lambda_{max}(H_2O)$ |
|---|---|---|---|---|---|
| 130 | | | (structure with NH-R₂, W-SO₂-CH₂-CH₂-OSO₃H, (SO₃H)₀₋₁) | reddish yellow | 386 nm |
| 131 | | | | reddish yellow | |
| 132 | | | | orange | |

EXAMPLE 133

24.2 g of the aminoazopyrazolone of the formula

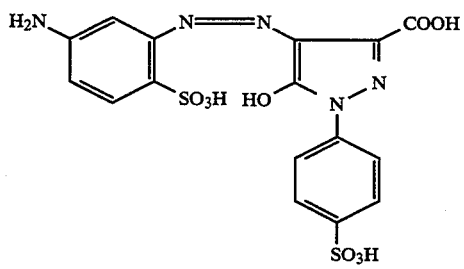

(prepared by coupling diazotised 2-amino-4-formylaminobenzenesulphonic acid onto 1-(4'-sulphophenyl)-3-carboxy-5-pyrazolone and hydrolysis using dilute sodium hydroxide solution) are dissolved in the form of the sodium salt in 600 ml of water. The solution is cooled to 0° to 2° C., the pH is brought to 5.0 with dilute hydrochloric acid, and 4.0 ml of cyanuric fluoride are added dropwise immediately over a period of about 5 minutes. During this addition, the pH is continuously maintained between 4.3 and 4.6 using 2N sodium carbonate solution. When the reaction is complete after 15 minutes, a solution of 17.0 g of the compound of the formula

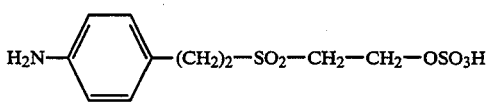

in 120 ml of water, brought to a pH of 5.7 with lithium hydroxide solution, is added at 0° to 5° C. During this addition, the pH is maintained at 5.5 to 6 with 2N sodium carbonate solution, and the temperature is allowed to rise to 20° C. after 2 hours.

The dyestuff obtained of the formula

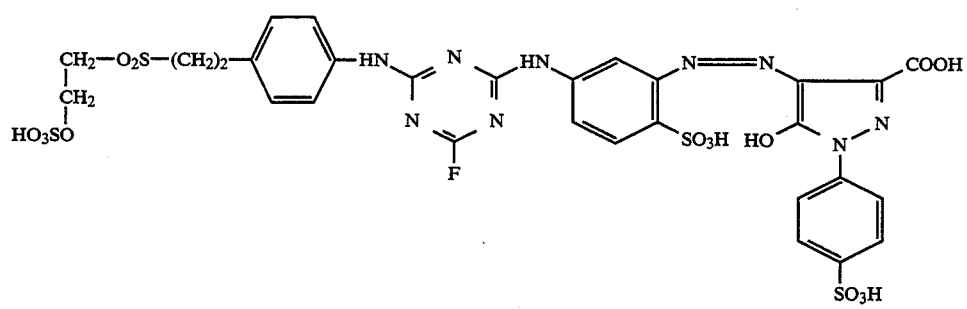

dyes cotton from a long liquor in greenish yellow hues in a high fixation yield.

EXAMPLE 134

If the 5-amino-2-sulphophenylazopyrazolone component in Example 133 is replaced by an equivalent amount of the corresponding 4-amino-2-sulphophenylazopyrazolone, a dyestuff of the formula

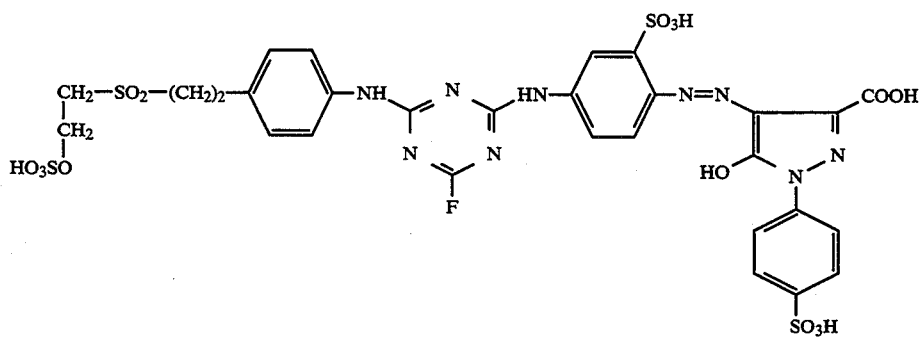

is obtained which dyes cotton in reddish yellow hues like the one from Example 133.

Further yellow dyestuffs having similar properties are obtained by condensing the following aminophenylazopyrazolones with cyanuric fluoride and the aminophenylalkyl β-sulphatoethyl sulphones listed.

| No. | Aminophenylazopyrazolone | $\underset{R_2}{NH}$-C$_6$H$_3$(SO$_3$H)$_{0-1}$-W-SO$_2$-CH$_2$CH$_2$-OSO$_3$H |
|---|---|---|
| 135 | 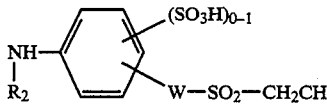 | 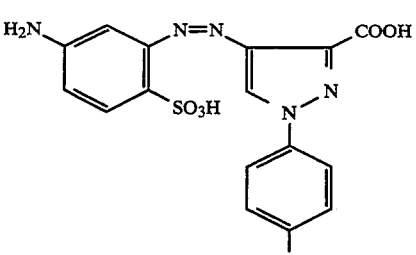 |
| 136 | 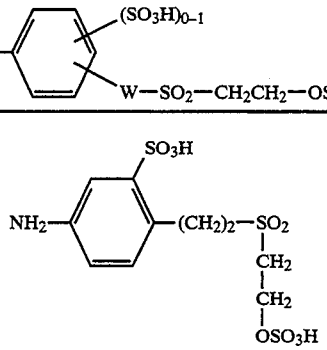 | 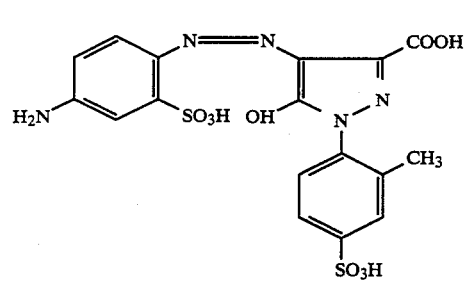 |
| 137 | 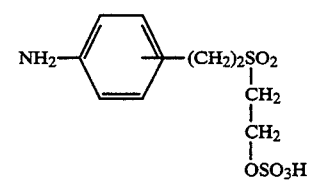 | 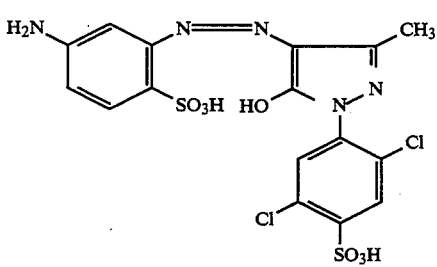 |
| 138 | 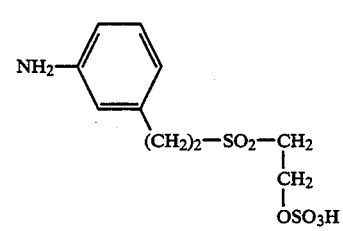 | 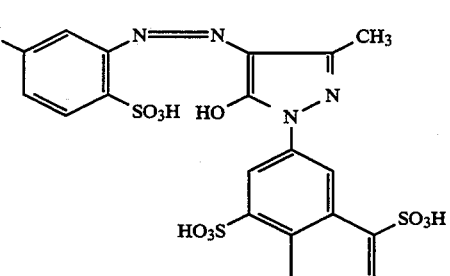 |
| 139 | 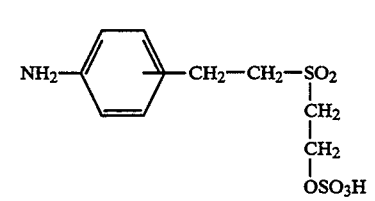 | 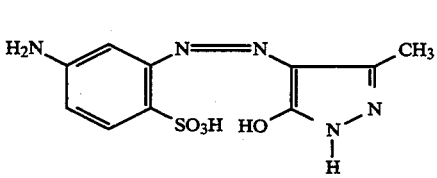 |

| No. | Aminophenylazopyrazolone | $\underset{R_2}{NH}-\!\!\!\left\langle\!\!\!\begin{array}{c}(SO_3H)_{0-1}\\ \\W-SO_2-CH_2CH_2-OSO_3H\end{array}\!\!\!\right\rangle$ |
|---|---|---|
| 140 | H₂N—C₆H₃(SO₃H)—N=N—C(pyrazolone: CH₃, HO, N-N-phenyl(Cl, SO₃H)) | 4-OCH₃, 3-CH₂CH₂CH₂SO₂CH₂CH₂OSO₃H aniline (H₂N-) |
| 141 | H₂N—C₆H₃(SO₃H)—N=N—C(pyrazolone: CH₃, OH, N-N-phenyl(SO₃H, HO₃S)) | M₂N—C₆H₄—CH₂—CH(CH₃)—SO₂—CH₂—CH₂—OSO₃H |

EXAMPLE 142

19.9 g of the azo compound of the formula

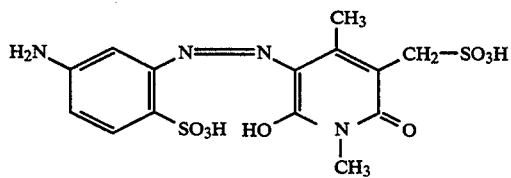

prepared by coupling diazotised 4-acetylamino-2-aminobenzenesulphonic acid onto 1,4-dimethyl-6-hydroxy-5-aminocarbonyl-3-sulphomethyl-2-pyridone and hydrolysis of the acetylamino group in dilute sodium hydroxide solution are dissolved in 400 ml of water at a pH of 5.0. After cooling to 0° C., 4.1 ml of cyanuric fluoride are run in, and the pH is maintained at 4.5 with 2N sodium carbonate solution. Stirring under the same conditions is continued for another 15 minutes, and a solution of 15.7 g of the component of the formula

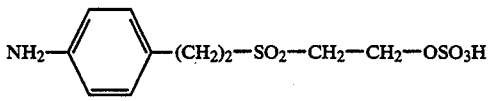

in 110 ml of water, neutralised with lithium hydroxide, is then added. The pH is maintained at 5.5 to 5.7 with sodium carbonate solution, the temperature continuously? at 0° to 3° C., and the condensation is brought to completion by stirring overnight. The dyestuff is salted out with potassium chloride, filtered off with suction and washed with 15% strength potassium chloride solution.

It has the formula

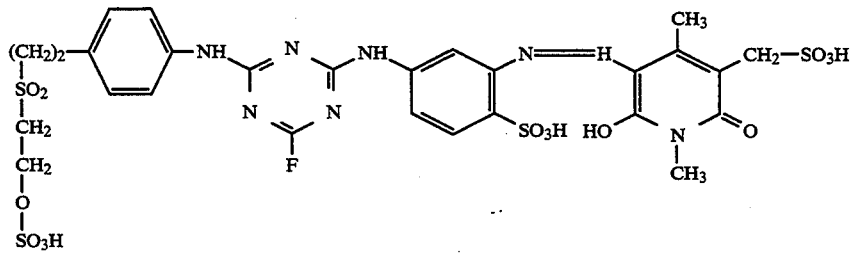

$\lambda_{max} = 422$ nm in water and dyes cotton from a long liquor at an optimum dyeing temperature of 40° to 50° C. in brilliant greenish yellow shades.

Similar dyestuffs are obtained by reacting the components of Examples 143 to 154 with one another by the procedure of Example 142.

| No. | Azo component | Trihalogenotriazine | | Hue | $\lambda_{max}(H_2O)$ |
|---|---|---|---|---|---|
| 143 | | | | greenish yellow | 423 nm |
| 144 | | | | greenish yellow | |
| 145 | | | | yellow | |
| 146 | | | | yellow | |

| No. | Azo component | Trihalogenotriazine | | Hue | $\lambda_{max}(H_2O)$ |
|---|---|---|---|---|---|
| 147 | | | (structure with NH-R₂, (SO₃H)₀₋₁, W-SO₂-CH₂-CH₂-OSO₃H) | greenish yellow | |
| 148 | | | | greenish yellow | 422 nm |
| 149 | | | | greenish yellow | 421 nm |
| 150 | | | | greenish yellow | 421 nm |

-continued

| No. | Azo component | Trihalogenotriazine | | Hue | $\lambda_{max}(H_2O)$ |
|---|---|---|---|---|---|
| 151 | | | | greenish yellow | |
| 152 | | | | greenish yellow | |
| 153 | | | | greenish yellow | 421 nm |
| 154 | | | | yellow | |

EXAMPLE 155

2 g of sodium fluoride are added to a solution of 22.6 g of the component of the formula

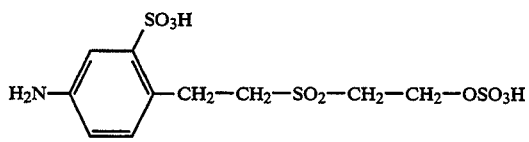

in 60 ml of water, obtained by the procedure of Example 80, and the mixture is brought to a pH of 3.5. 5.2 ml of cyanuric fluoride are added dropwise at 0° C. over a period of 5 minutes, and the pH is maintained at 3.5 to 3.7 using about 54 ml of 2N sodium carbonate solution.

25 g of 1-amino-4-(2'-aminomethyl-4'-methyl-6'-sulphophenylamino)anthraquinone-2-sulphonic acid are dissolved in 400 ml of water and 50 ml of acetone by neutralisation with about 28 ml of 2N sodium hydroxide solution at a pH of 7. After cooling of the solution to 0° to 5° C., the solution of the above reactive component is run in, and the pH is maintained at 6.5 with 2N sodium carbonate solution. After condensation is complete, the dyestuff is either salted out or isolated by evaporation in vacuo at 35° to 40° C. It has the formula

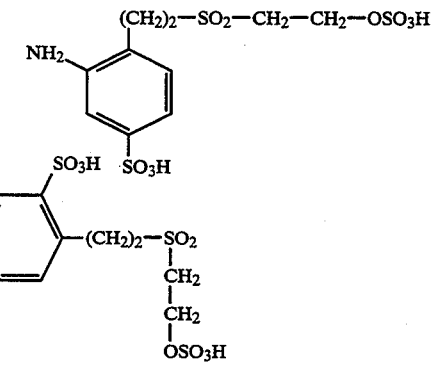

can be used for the printing or dyeing of cellulose fabric by continuous processes and produces clear reddish blue shades. At the same time, very high fixation yields are obtained ($\lambda_{max}$=624 and 587 nm in $H_2O$).

EXAMPLE 156

14.7 g of 1-amino-4-(3'-aminophenylamino)anthraquinone-2,4'-disulphonic acid are dissolved in 250 ml of water at a pH of 5 and 0° to 5° C. 2.8 ml of cyanuric fluoride are added dropwise to the solution of the dyestuff component over a period of 5 to 10 minutes, and the pH is maintained at 4.2 to 4.7 with 2N sodium carbonate solution. After a short period of additional stirring, the condensation to give the difluorotriazinyl dyestuff is complete.

A neutralised solution of 12.3 g of the compound of the formula

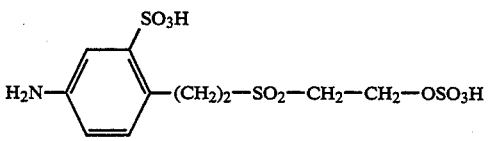

in 40 ml of water is then slowly added to the solution of the reactive dyestuff component, and the pH is maintained at 5.0 to 5.6. After the addition, the pH is maintained at 6.0 to 6.5, and the temperature is allowed to rise gradually to 20° C. over a period of 15 hours, after which condensation is complete. The dyestuff solution is then salted out over a period of 2 hours. The precipitated dyestuff of the formula

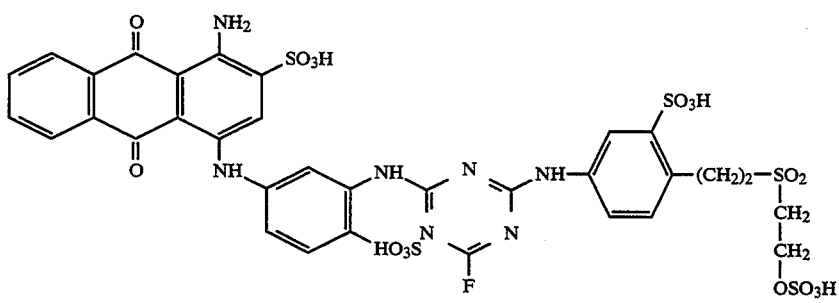

is filtered off with suction and washed with salt solution until the runoff is clear. Drying in vacuo at 45° C. gives a product which can be used to dye and print cellulose fabric in blue hues and high fixation yields.

EXAMPLE 157

16.7 g of the component of the formula are dissolved in 80 ml of water, and the solution is brought to a pH of 4.0. 1.9 g of sodium fluoride are added to the solution, which is cooled to 0° to 2° C. 4.2 ml of cyanuric fluoride are then run in with further cooling, and the pH is maintained between 4.0 and 4.2 with sodium carbonate solution. About 15 minutes after the addition of cyanuric fluoride, the reaction has gone entirely to completion. The solution is then brought to a pH of 4.5 to 5.0. A neutralised solution of 19.0 g of 1-amino-4-(3'-amino-2'-methylphenylamino)-anthraquinone-2,5'-disulphonic acid in 350 ml of water is added dropwise over a period of 30 mintues to the reactive component obtained. During this addition, the temperature in the reaction solution is further maintained at 0° to 5° C. and the pH at 6.0 to 6.5 using sodium carbonate solution. After 2 hours, the temperature is allowed to increase gradually to 10° C. over a period of 15 hours. After condensation is complete, the dyestuff of the formula

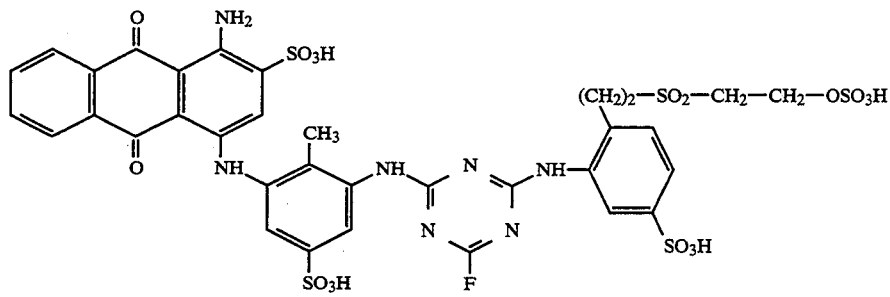

is salted out from the solution using sodium chloride, filtered off with suction, washed with 20% strength sodium chloride solution and dried in vacuo at 45° C.

The dyestuff produces on cotton blue dyeings and prints in a high fixation yield.

Further blue anthraquinone dyestuffs having similar properties are obtained by condensing the anthraquinone components listed below of the general formula

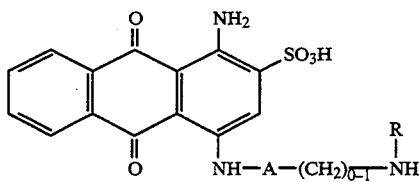

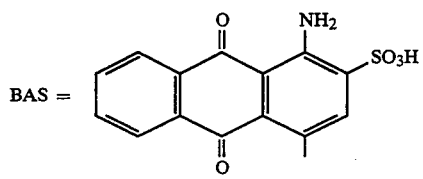

with the trihalogenotriazines and the sulphatoethylsulphonylalkylanilines by one of the methods described above.

| No. | BAS—NH—A—(CH$_2$)$_{0-1}$—NH—R | Trihalogenotriazine | aniline component | Hue | $\lambda_{max}$(H$_2$O) |
|---|---|---|---|---|---|
| 158 | —NH—C$_6$H$_3$(SO$_3$H)—CH$_2$—N(CH$_3$)H | cyanuric fluoride | NH$_2$—C$_6$H$_3$(SO$_3$H)—(CH$_2$)$_2$—SO$_2$—CH$_2$CH$_2$—OSO$_3$H | blue | 598 nm |
| 159 | —NH—C$_6$H$_3$(NH$_2$)—SO$_3$H | cyanuric fluoride | —NH(C$_2$H$_5$)—C$_6$H$_4$—(CH$_2$)$_2$—SO$_2$—CH$_2$CH$_2$—OSO$_3$H | blue | 597 nm |
| 160 | —NH—C$_6$(CH$_3$)$_3$(CH$_2$NH$_2$)(SO$_3$H) | cyanuric fluoride | NH$_2$—C$_6$H$_3$(SO$_3$H)—(CH$_2$)$_2$—SO$_2$—CH$_2$CH$_2$—OSO$_3$H | reddish blue | |

| No. | BAS—NH—A—(CH$_2$)$_{0-1}$—NH—R | Trihalogenotriazine | [aniline-W-SO$_2$-CH$_2$CH$_2$-OSO$_3$H with (SO$_3$H)$_{0-1}$ and NHR$_2$] | Hue | $\lambda_{max}$(H$_2$O) |
|---|---|---|---|---|---|
| 161 | 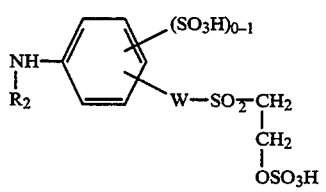 | 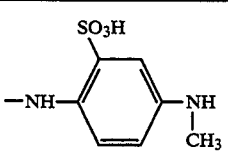 | 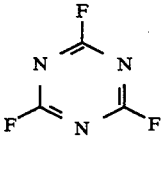 | blue | |
| 162 | 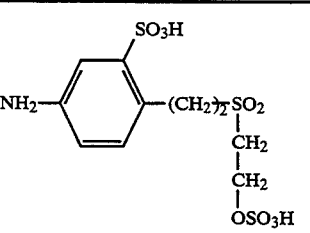 | 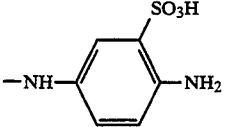 | 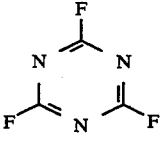 | greenish blue | |
| 163 | 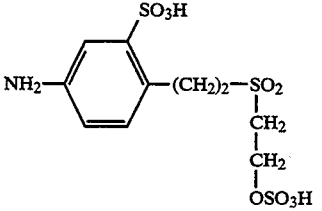 | 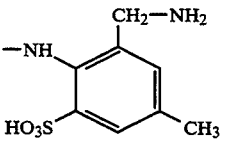 | 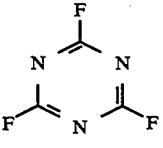 | reddish blue | 624 nm |
| 164 | 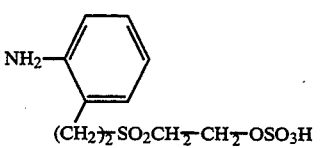 | 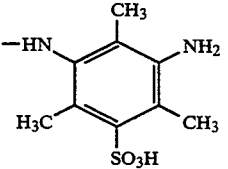 | 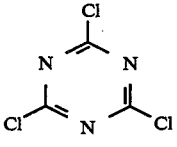 | reddish blue | |
| 165 | 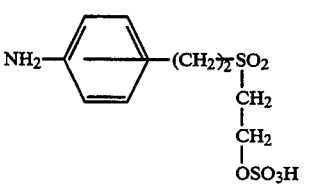 |  | 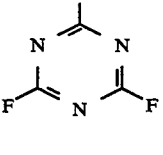 | clear blue | 635 nm |
| 166 | 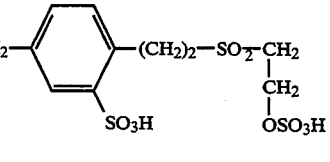 | 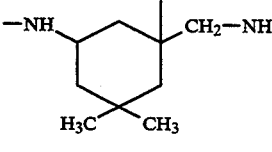 | 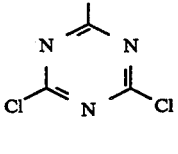 | clear blue | |
EXAMPLE 167
65 g of the sodium salt of the compound of the formula

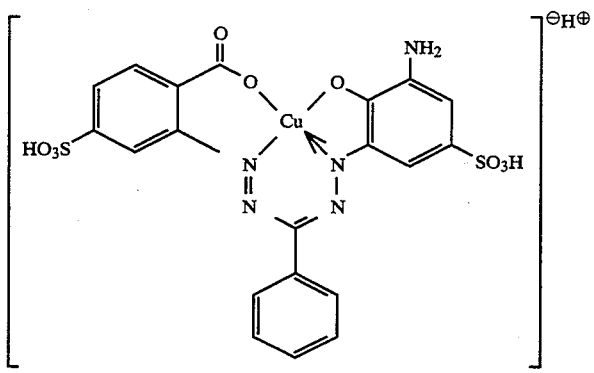

are dissolved in 200 ml of water at a pH of 7.5. The solution is cooled to 0° C., and 9 g of trifluorotriazine are added dropwise over a period of 20 minutes, during which the pH is maintained at 6 to 7 by addition of sodium carbonate solution. After the reaction is complete, a neutralised solution of 18.3 g of the compound of the formula

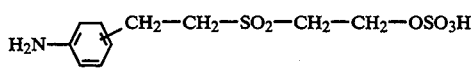

in 80 ml of water, prepared by the procedure of Example 6, is added dropwise, and the pH is maintained at 7 with sodium carbonate solution. After condensation is complete, the dyestuff is isolated either by evaporation or spray-drying or by salting-out. The dyestuff thus obtained of the formula

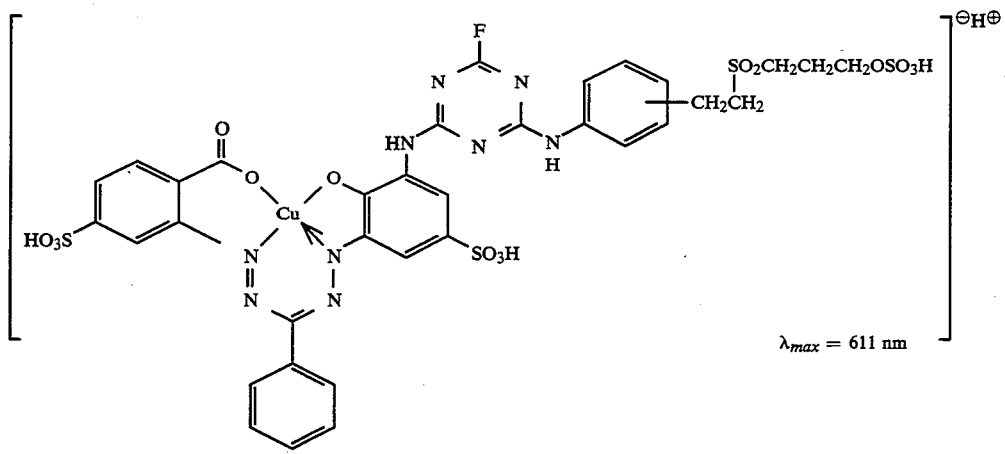

dyes cotton in blue hues having good fastness properties.

EXAMPLE 168

A further valuable dyestuff is obtained by repeating the procedure of Example 167, using the sodium salt of the compound of the formula

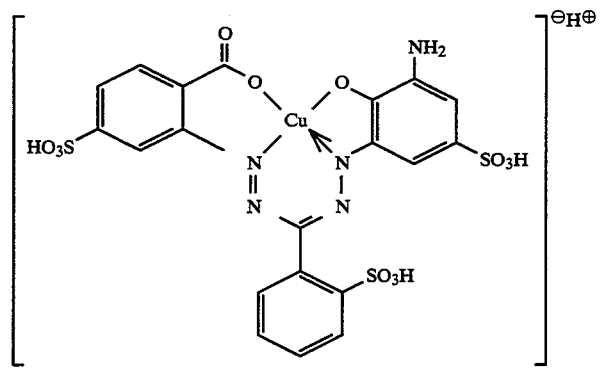

instead of the dyestuff base used there. The dyestuff thus obtained of the formula

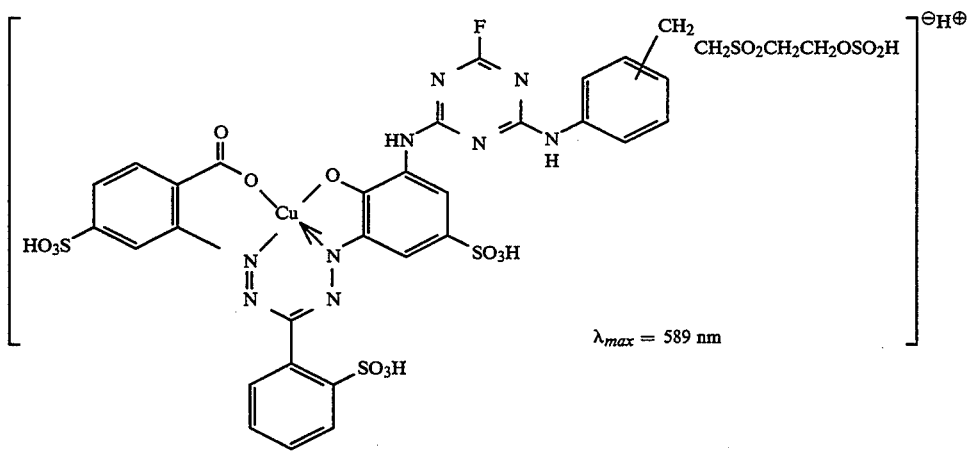

dyes cotton in blue hues having good fastness properties.

EXAMPLE 169

If in Example 91 equivalent amounts of 2-(2-aminophenyl) 2-sulphatoethyl sulphone are used instead of the mixture of isomers 2-(x-aminophenyl)ethyl 2-sulphatoethyl sulphone used there, the dyestuff of the formula

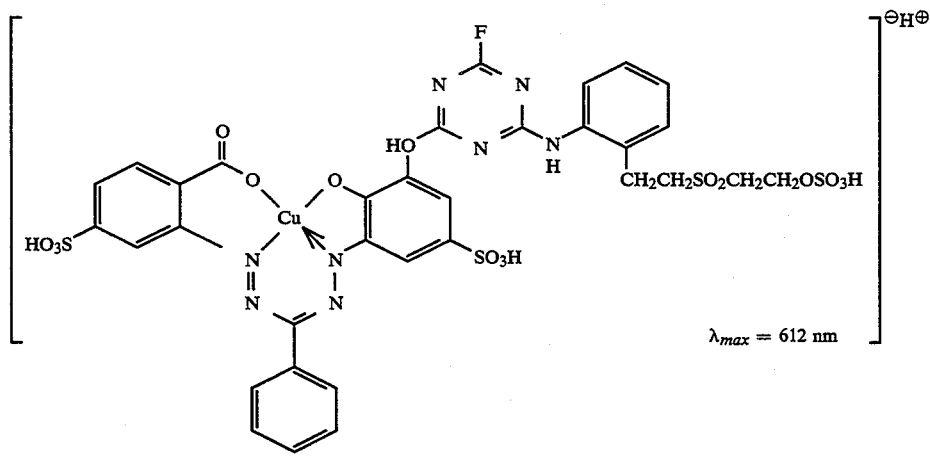

is obtained, which dyes cotton in blue hues by the application methods customary for reactive dyestuffs.

Further formazan dyestuffs in the table below are obtained by combining the corresponding components.

TABLE 1

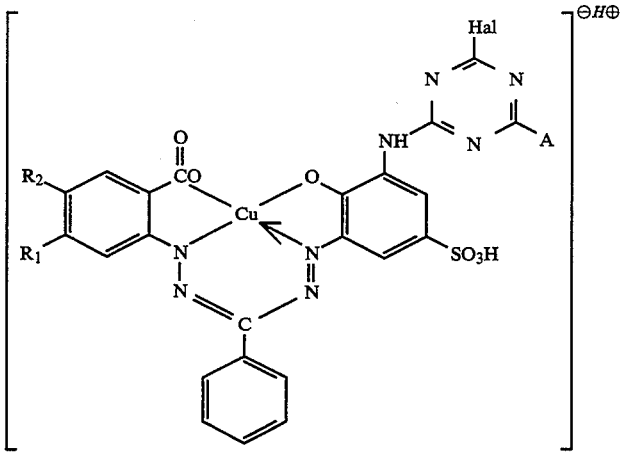

| Ex. | R₁ | R₂ | Hal | A | Hue |
|---|---|---|---|---|---|
| 170 | SO₃H | H | F | (meta) | blue |
| 171 | SO₃H | H | F | —NH—C₆H₃(SO₃H)—CH₂CH₂SO₂CH₂CH₂OSO₃H | blue |
| 172 | SO₃H | H | F | —N(C₂H₅)—C₆H₄—CH₂—CH₂SO₂CH₂CH₂OSO₃H | blue |
| 173 | H | SO₃H | F | —N(C₂H₅)—C₆H₄—CH₂—CH₂SO₂CH₂CH₂OSO₃H | blue |
| 174 | H | SO₃H | F | —NH—C₆H₃(SO₃H)—CH₂—CH₂SO₂CH₂CH₂OSO₃H | blue |
| 175 | H | SO₃H | Cl | —N(C₂H₅)—C₆H₄—CH₂—CH₂SO₂—CH=CH₂ | blue |

EXAMPLES 176 TO 183

Further dyestuffs according to the invention of the general formula

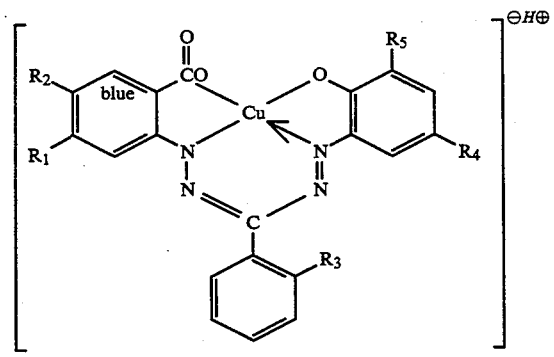

can be prepared analogously to the exemplary embodiment by reacting the components listed in Table 2.

The dyestuffs obtained have very good fibre-reactive dyestuff properties and produce, by the customary dyeing and printing processes, dyeings and prints of high colour strength and good fastness properties in the hue on cotton listed in the particular table examples.

| Ex. | $R_1$ | $R_2$ | $R_3$ | $R_4$ | $R_5$ | A | Hue |
|---|---|---|---|---|---|---|---|
| 176 | $SO_3H$ | H | $SO_3H$ | ![triazine with F, NH–, A] | $SO_3H$ | ![phenyl-NH– with CH$_2$–CH$_2$SO$_2$CH$_2$–CH$_2$OSO$_3$H] | reddish blue |
| 177 | $SO_3H$ | H | H | ![triazine with F, NH–, A] | $SO_3H$ | ![p-N(C$_2$H$_5$)-phenyl with CH$_2$–CH$_2$SO$_2$CH$_2$–CH$_2$OSO$_3$H] | blue |
| 178 | H | $SO_3H$ | $SO_3H$ | ![triazine with F, NH–, A] | $SO_3H$ | ![phenyl-NH– with CH$_2$–CH$_2$SO$_2$CH$_2$–CH$_2$OSO$_3$H] | reddish blue |
| 179 | H | $SO_3H$ | H | ![triazine with F, NH–, A] | $SO_3H$ | ![phenyl-NH– with SO$_3$H and CH$_2$–CH$_2$SO$_2$CH$_2$–CH$_2$OSO$_3$H] | blue |
| 180 | H | ![triazine with F, NH–, A] | $SO_3H$ | $SO_3H$ | $SO_3H$ | ![p-N(C$_2$H$_5$)-phenyl with CH$_2$–CH$_2$SO$_2$CH$_2$–CH$_2$OSO$_3$H] | blue |

-continued

| Ex. | R₁ | R₂ | R₃ | R₄ | R₅ | A | Hue |
|---|---|---|---|---|---|---|---|
| 181 | | H | SO₃H | SO₃H | SO₃H | -HN-C₆H₄-CH₂-CH₂SO₂CH₂-CH₂OSO₃H | reddish |
| 182 | H | SO₃H | SO₃H | SO₃H | | -NH-C₆H₄-(CH₂)₂SO₂CH₂-CH₂OSO₃H | reddish blue |
| 182 | H | SO₃H | SO₃H | SO₃H | H | -N(C₂H₅)-C₆H₄-CH₂-CH₂SO₂CH₂-CH₂OSO₃H | greenish blue |

EXAMPLE 184

A neutralised solution of 14.4 g of the component of the formula

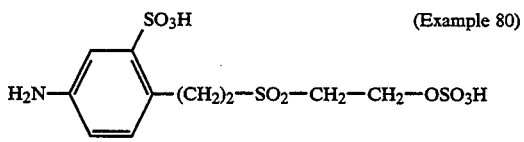
(Example 80)

and 1.6 g of sodium fluoride in 60 ml of water is cooled to 0° to 2° C. 5.5 g of cyanuric fluoride are run in, and

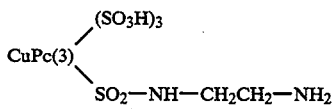

(prepared by condensation of copper phthalocyanine tetra(sulpho chloride/sulphonic acid) with monoacetylethylenediamine, followed by hydrolysis according to the procedure given in German Offenlegungsschrift 1,644,681, Example 2) instead of the 32 g of the copper phthalocyanine component used there, giving a dyestuff of the formula

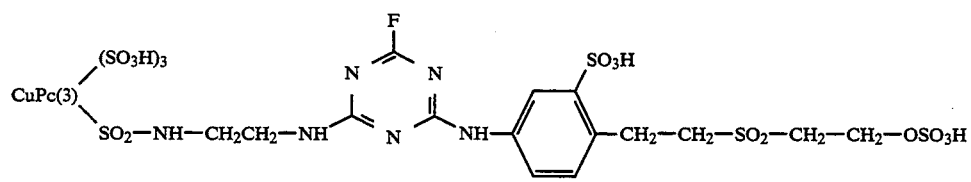

the pH is maintained between 3.5 and 4.0 using 2N sodium carbonate solution. After condensation is complete, the pH is brought to 5.0.

32 g of the copper phthalocyanine component of the formula

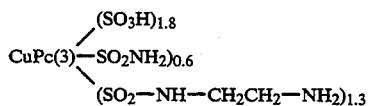

prepared by the procedure given in European Patent 0,073,267 are dissolved in 300 ml of water at a pH of 7.0 to 7.5. The solution of the above condensation product is then run into the dye component at 0° to 5° C., and the pH in the reaction mixture is maintained at 7.0 to 7.5. After 3 hours, the temperature is allowed to rise gradually to 20° C., and the pH is further kept constant. After the reaction is complete, the product obtained is salted out from the solution, filtered off with suction, buffered with a small amount of phosphate solution of pH 6.0 and dried in vacuo at 45° C. The dyestuff has the formula which produces light greenish blue dyeings and prints on cellulose fabric in high yield.

$\lambda_{max}$=668 nm, 628 nm in $H_2O$.

EXAMPLE 186

31.2 g of the copper phthalocyanine compound of the formula

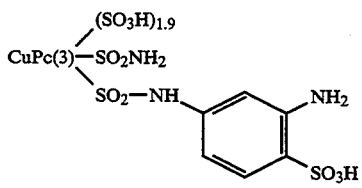

prepared by condensation of copper phthalocyanine tetra-(sulpho chloride/sulphonic acid) with 3-aminoacetanilide and ammonia, followed by hydrolysis of the acetylamino group in dilute sodium hyroxide solution at 75° C. are dissolved in 420 ml of water at a pH of 7. 3.1 ml of cyanuric fluoride are added dropwise to the solution at 0°-3° C., and the pH is maintained at

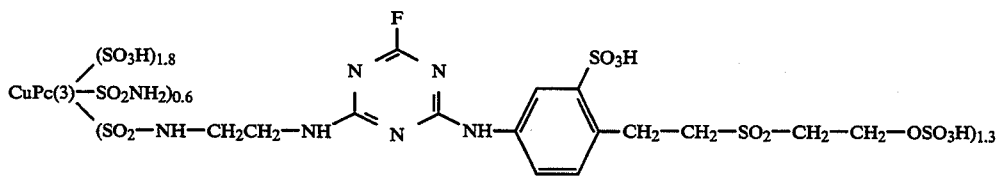

$\lambda_{max}$ = 668 nm, 627 nm in $H_2O$.

The dyestuff produces light greenish blue dyeings and prints on cellulose fibres.

EXAMPLE 185

Example 184 is repeated, using 32.4 g of the copper phthalocyanine compound of the formula 4.5 to 5.0 with 2N sodium carbonate solution. After condensation is complete, a solution of 11.5 g of the reactive component of Example 6C in 50 ml of water is added, and condensation with the difluorotriazinyl dyestuff is completed at a pH of 5.5 to 6 first at 0° to 5° C. and later increasing towards room temperature. The dyestuff obtained of the formula

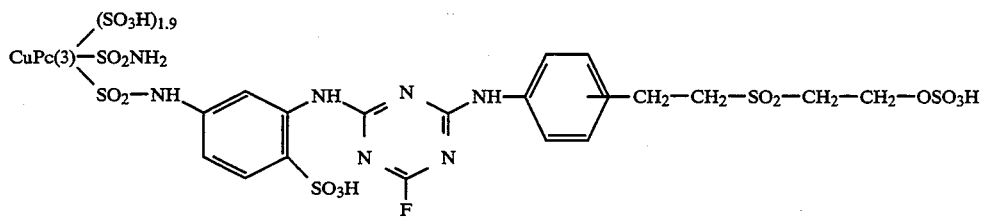

$\lambda_{max}$ = 667 nm, 627 nm in water is isolated by evaporation in vacuo or spray-drying or by salting-out, the mixture being buffered to a pH of 6 before the drying process with a small amount of phosphate. The dyestuff dyes and prints cotton by the processes known for reactive dyestuffs in light greenish blue hues of good fastness properties and in high yield.

Further phthalocyanine reactive dyestuffs are obtained by condensing the phthalocyanine components shown in the list below, trifluorotriazine and β-sulphatoethylsulphonylalkylaniline with one another by one of the methods described above.

| No. | Phthalocyanine component | β-Sulphatoethylsulphonyl-alkylaniline | Hue | $\lambda_{max}$ (H$_2$O) |
|---|---|---|---|---|
| 187 | CuPc(3)—(SO$_3$H)$_{2.2}$/(SO$_2$NH$_2$)$_{0.5}$/(SO$_2$—NH—C$_6$H$_3$(NH$_2$))$_{1.2}$ (m-) | NH$_2$—C$_6$H$_3$(SO$_3$H)—(CH$_2$)$_2$—SO$_2$—CH$_2$—CH$_2$—OSO$_3$H | greenish blue | 668, 628 nm |
| 188 | CuPc(3)—(SO$_3$H)$_{2.9}$/SO$_2$—NH—C$_6$H$_3$(COOH)(NH$_2$) | NH$_2$—C$_6$H$_4$—CH$_2$—CH$_2$—SO$_2$—CH$_2$—CH$_2$—OSO$_3$H | greenish blue | |
| 189 | NiPc(3)—(SO$_3$H)$_{2.9}$/SO$_2$—NH—C$_6$H$_4$—NH$_2$ (m-) | NH$_2$—C$_6$H$_3$(SO$_3$H)—CH$_2$—CH$_2$—SO$_2$—CH$_2$—CH$_2$—OSO$_3$H | bluish green | |
| 190 | NiPc(3)—(SO$_3$H)$_{2.9}$/SO$_2$—NH—C$_6$H$_4$—NH$_2$ (m-) | NH$_2$—C$_6$H$_4$—CH$_2$—CH$_2$—SO$_2$—CH$_2$—CH$_2$—OSO$_3$H | bluish green | |
| 191 | NiPc(3)—(SO$_3$H)$_{2.5}$/(SO$_2$—NH—CH$_2$—CH$_2$—NH$_2$)$_{1.3}$ | NH$_2$—C$_6$H$_3$(SO$_3$H)—CH$_2$—CH$_2$—SO$_2$—CH$_2$—CH$_2$—OSO$_3$H | bluish green grün | |

-continued

| No. | Phthalocyanine component | β-Sulphatoethylsulphonyl-alkylaniline | Hue | $\lambda_{max}$ (H$_2$O) |
|---|---|---|---|---|
| 192 | CuPc(3)−(SO$_3$H)$_{2.9}$ / −SO$_2$−NH−C$_6$H$_4$−NH$_2$ (1,4) | 2-amino-5-sulpho-benzyl with −CH$_2$−CH$_2$−SO$_2$−CH$_2$−CH$_2$−OSO$_3$H | greenish blue | |
| 193 | CuPc(3)−(SO$_3$H)$_{2.9}$ / −SO$_2$−NH−C$_6$H$_3$(NH$_2$)(SO$_3$H) | 4-(N-C$_2$H$_5$)amino-benzyl with −CH$_2$−CH$_2$−SO$_2$−CH$_2$−CH$_2$−OSO$_3$H | greenish blue | |
| 194 | CuPc(3)−(SO$_3$H)$_{1.9}$−SO$_2$NH$_2$ / −SO$_2$−NH−C$_6$H$_3$(NH$_2$)(SO$_3$H) | 2-amino-benzyl with −CH$_2$−CH$_2$−SO$_2$−CH$_2$−CH$_2$−OSO$_3$H | greenish blue | |
| 195 | CuPc(3)−(SO$_3$H)$_{2.5}$ / [−SO$_2$−NH−C$_6$H$_3$(NH$_2$)(SO$_3$H)]$_{1.4}$ | NH$_2$−C$_6$H$_4$−(CH$_2$)$_3$−SO$_2$−CH$_2$−CH$_2$−OSO$_3$H | greenish blue | |
| 196 | CuPc(3)−(SO$_3$H)$_{2.6}$ / (−SO$_2$−NH−CH$_2$−CH$_2$−NH−CH$_2$−CH$_2$OH)$_{1.3}$ | 5-amino-2-(β-sulphatoethylsulphonylmethyl)-benzenesulphonic acid | greenish blue | |
| 197 | CuPc(3)−(SO$_3$H)$_2$−SO$_2$−NHCH$_3$ / −SO$_2$−NH−C$_6$H$_4$−NH$_2$ (1,3) | NH$_2$−C$_6$H$_3$(SO$_3$H)−CH$_2$−CH$_2$−SO$_2$−CH$_2$−CH$_2$−OSO$_3$H | greenish blue | |
| 198 | CuPc(3)−(SO$_3$H)$_{2.0}$−SO$_2$NH$_2$ / −SO$_2$−NH−CH$_2$−CH$_2$−NH$_2$ | NH$_2$−C$_6$H$_3$(SO$_3$H)−CH$_2$−CH$_2$−SO$_2$−CH$_2$−CH$_2$−OSO$_3$H | greenish blue | 668, 627 nm |

| No. | Phthalocyanine component | β-Sulphatoethylsulphonyl-alkylaniline | Hue | $\lambda_{max}$ (H$_2$O) |
|---|---|---|---|---|
| 199 | 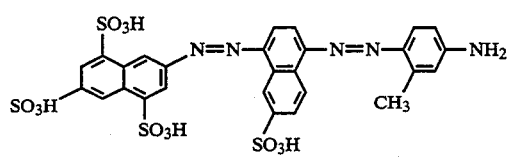 | 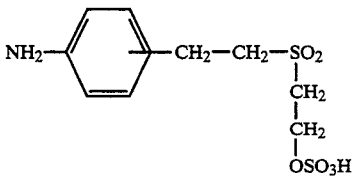 | greenish blue | 668, 627 nm |

EXAMPLE 200

36.7 g of the aminodisazo compound of the formula

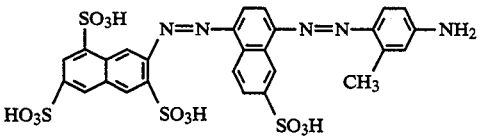

prepared in the known manner are dissolved in 400 ml of water at a pH of 6.0. After cooling of the solution to 0° C., 5.0 ml of cyanuric fluoride are swiftly added dropwise, and the pH is maintained at 4.5 to 5.0 with 2N sodium carbonate solution.

After this first condensation step is complete, 17.4 g of the mixture of isomers from Example 81C are introduced, and the pH is maintained at 5.5 to 6.0 with sodium carbonate solution. Stirring at 0° to 5° C. is continued for 2 hours, and the temperature is then allowed to rise to 20° C. with further pH control. The dyestuff obtained of the formula

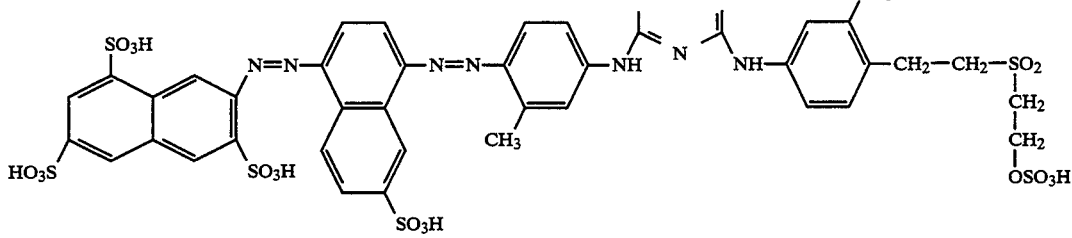

is salted out with sodium chloride, filtered off with suction and, after buffering at a pH of 6, dried in vacuo at 45° C. It dyes cotton by the processes known for reactive dyestuffs in brown hues and high yield.

EXAMPLE 201

If the compound of the formula

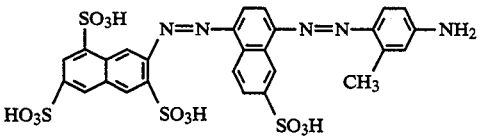

is used instead of the aminodisazo compound of Example 200 and condensed with cyanuric fluoride and then with a compound of the formula

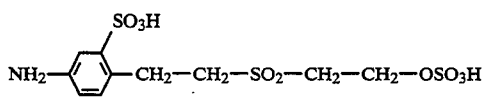

a dyestuff of the formula

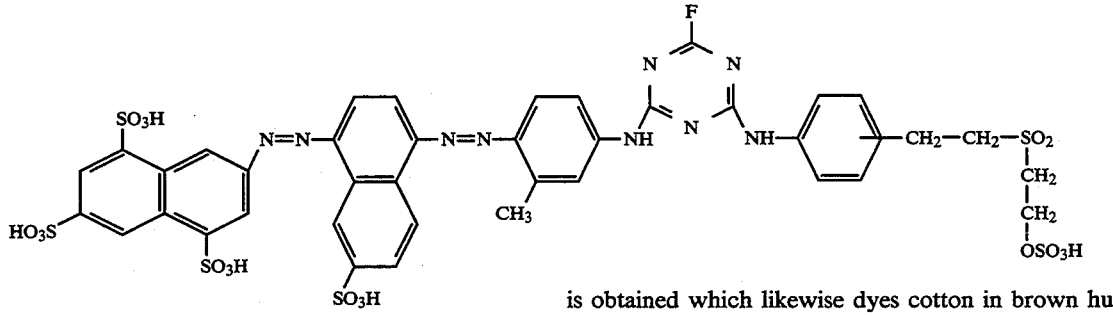

is obtained which likewise dyes cotton in brown hues and high yield.

Further brown reactive dyestuffs are obtained by condensation of the following components.

| No. | Aminodisazo compound | Trihalogeno-triazine | β-Sulphatoethylsulphonyl-alkylaniline | Hue |
|---|---|---|---|---|
| 202 | | | | brown |
| 203 | | | | brown |
| 204 | | | | brown |
| 205 | | | | orange-brown |

EXAMPLE 206

50.3 g of the aminoazo compound of the formula

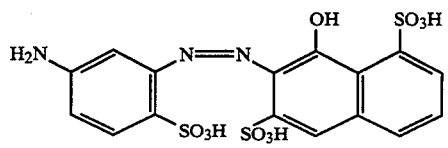

are dissolved in 400 ml of water at a pH of 6. The solution is cooled to 0° to 2° C., and 9.3 ml of cyanuric fluoride are added dropwise over a period of a few minutes. During this operation, the pH is maintained at 4.5 with 2N sodium carbonate solution and stirring of the mixture is then continued under the same conditions for a short period. When the consumption of sodium carbonate has come to a standstill, a solution of 32.3 g of 4-[(2-sulphatoethylsulphonyl)ethyl]aniline in 180 ml of water, brought to a pH of 6 with 10% strength lithium hydroxide solution, is run in, and the pH in the reaction mixture is maintained at 5.5 to 6.0. After 3 hours, the temperature is allowed to rise gradually to 20° C., and the dyestuff obtained of the formula

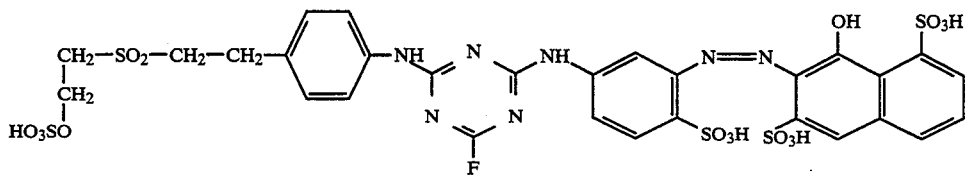

is isolated by salting out and filtering off with suction. Gentle drying gives a powder which dyes cotton by the customary methods in scarlet hues and high yield.

EXAMPLE 207

If the aminoazo compound in Example 206 is replaced by an equivalent amount of the isomeric compound

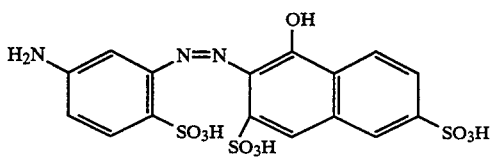

and this compound is condensed with cyanuric fluoride and in a second step with a compound of the formula

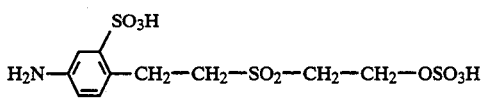

the dyestuff of the formula

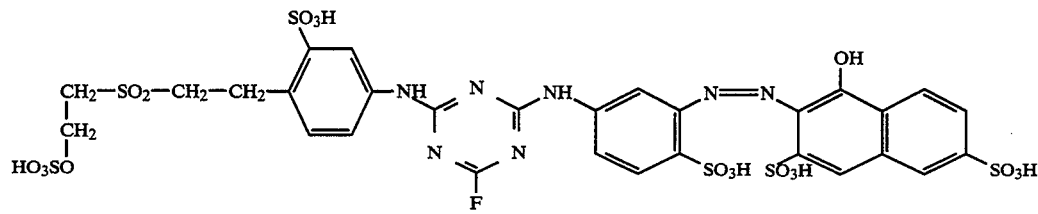

is obtained which dyes cotton in reddish orange hues and high fixation yields.

Further reactive dyestuffs based on aminoazonaphthol compounds are obtained by condensation of the components below.

| No. | Aminoazonaphthol component | Trihalogeno-triazine | β-Sulphatoethylsulphonyl-alkylaniline | Hue |
|---|---|---|---|---|
| 208 | naphthol-OH with N=N-phenyl(SO₃H), H₂N on phenyl, SO₃H on naphthol | trifluorotriazine | 2-(β-sulphatoethylsulphonylmethyl)-4-aminophenyl with SO₃H | orange |
| 209 | hydroxynaphthalene-SO₃H with N=N-phenyl(SO₃H)-NH₂ | trifluorotriazine | (β-sulphatoethylsulphonylmethyl)aminophenyl | orange |
| 210 | dihydroxy/SO₃H naphthalene with N=N-phenyl(SO₃H)-NH₂ | trifluorotriazine | (β-sulphatoethylsulphonylmethyl)aminophenyl | yellowish red |
| 211 | OH-naphthalene-SO₃H with N=N-(CH₃,SO₃H,HO₃S)phenyl-NH₂ | trifluorotriazine | bis(β-sulphatoethylsulphonylmethyl)-aminophenyl | orange |
| 212 | OH-naphthalene with NH-phenyl-SO₃H, N=N-phenyl(SO₃H)-NH₂, SO₃H | trifluorotriazine | 4-(β-sulphatoethylsulphonylmethyl)aminophenyl | brown |

| No. | Aminoazonaphthol component | Trihalogeno-triazine | β-Sulphatoethylsulphonyl-alkylaniline | Hue |
|---|---|---|---|---|
| 213 | ![structure: 4-amino-2-sulfophenyl-azo linked to 1-hydroxy-3-sulfo-7-phenylamino-naphthalene] | ![trifluorotriazine] | ![4-amino-2-sulfo-phenyl with (CH2)3-SO2-CH2-CH2-OSO3H] | brown |

EXAMPLE 214

According to Example 184, 19.5 g of the component of the formula

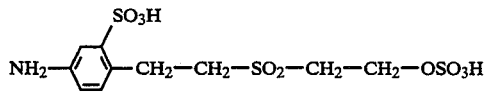

are condensed with 7.4 g of cyanuric fluoride in 80 ml of water in the presence of 2.1 g of sodium fluoride. The solution obtained of the condensation product is run into a solution of 31 g of the azo compound of the formula

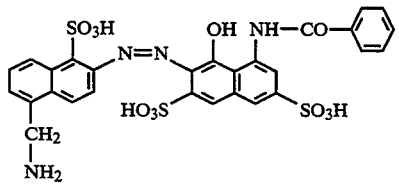

in 300 ml of water, brought to a pH of 7 and cooled to 0° to 5° C., and the pH in the mixture is maintained at 6.5 with dilute sodium carbonate solution. After 3 hours, the temperature is gradually increased to 20° C. After condensation is complete, the dyestuff is isolated by salting it out and filtering it off with suction and, after buffering to a pH of 6.5, drying it in vacuo at 45° C. It has the formula

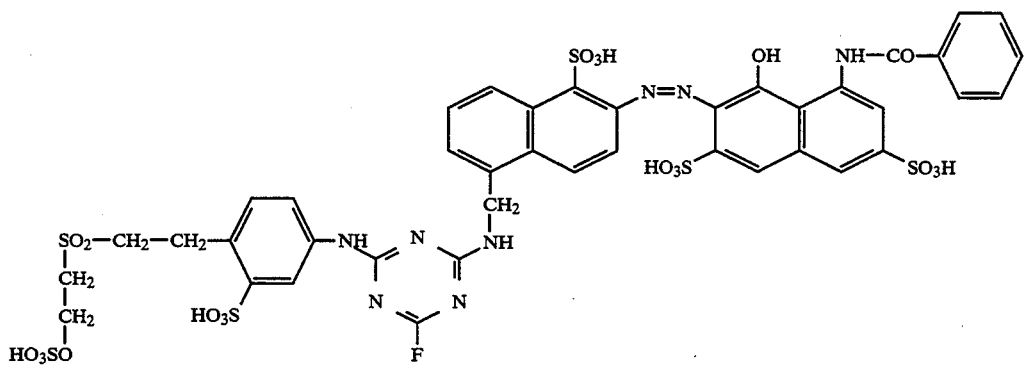

and dyes cotton from a long liquor in bluish red hues and high fixation yields.

Similar red dyestuffs are obtained by reaction of the following components.

| No. | Azo component | Trihalogeno-triazine | 2-Sulphatoethylsulphonylalkylaniline |
|---|---|---|---|
| 215 | ![structure] | ![structure] | ![structure] |
| 216 | ![structure] | ![structure] | ![structure] |
| 217 | ![structure] | ![structure] | ![structure] |

| No. | Azo component | Trihalogeno-triazine | 2-Sulphatoethylsulphonylalkylaniline |
|---|---|---|---|
| 218 | | | |

EXAMPLE 219

According to Example 184, 19.5 g of the component from Example 80 in 80 ml of water and 2.1 g of sodium fluoride are condensed with 7.5 g of cyanuric fluoride.

22.1 g of the triphendioxazine compound of the formula

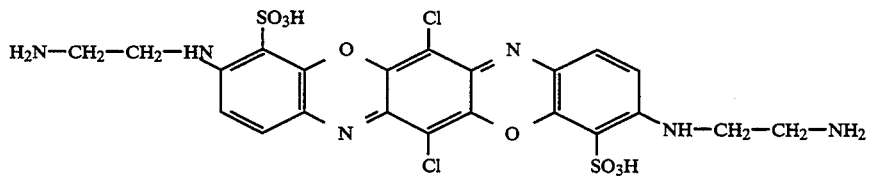

are dissolved in 300 ml of water at a pH of 11.5–12 by addition of sodium hydroxide solution.

This solution and the reactive components prepared above are added dropwise simultaneously to 80 ml of initially introduced ice water, and the pH in the reaction mixture is maintained at 8–8.5 using 2N sodium hydroxide solution and the temperature is further maintained at 0°–2° C. After several hours, the reaction is complete. The temperature is allowed to rise to 20° C. overnight.

The dyestuff is salted out, filtered off with suction and, after buffering to a pH of 6.7, dried at 45° C. in vacuo. It has the formula

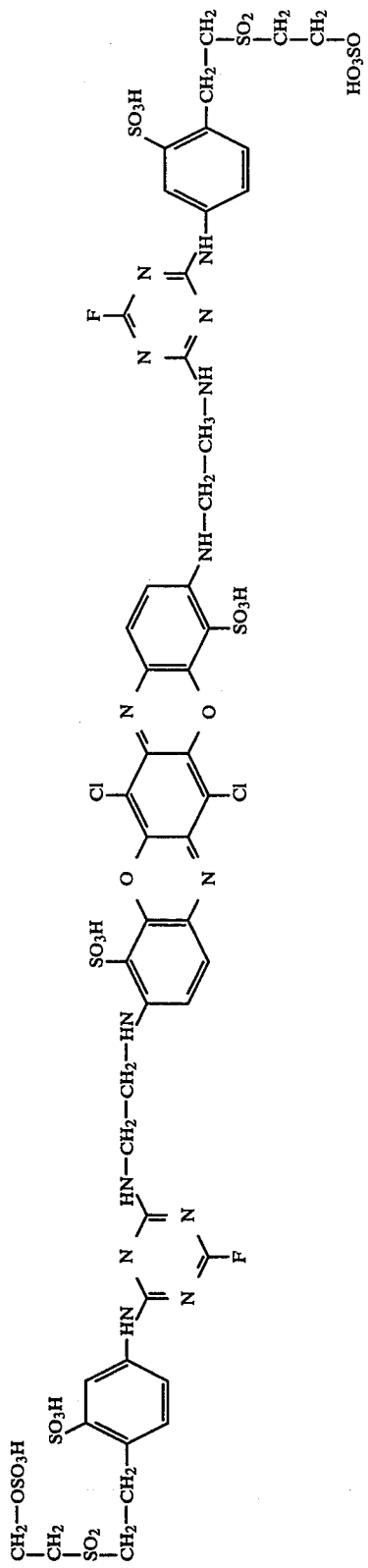

EXAMPLE 220

27 g of the triphendioxazine compound of the formula

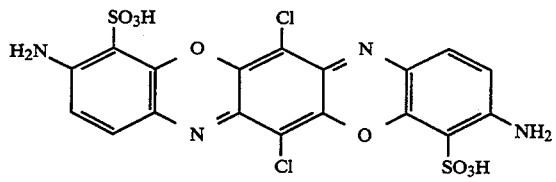

are dissolved in 1,000 ml of water by bringing the pH to 7.0 with 10% strength lithium hydroxide. The solution is cooled to 0° to 5° C., and 5.3 ml of cyanuric fluoride are added dropwise. The pH in the reaction mixture is maintained at 6.0 to 6.5 by dropwise addition of 10% lithium hydroxide solution. To complete the reaction, the temperature is raised to 20° C. over a period of 2 hours, and the pH is further maintained within the above limits until the consumption of neutralising agent has come to a standstill. A neutralised solution of 18.5 g of the component from Example 81C in 80 ml of water is then added to the primary condensation product, and the pH is further maintained at 6.0 to 6.5 with lithium hydroxide.

The dyestuff obtained of the formula

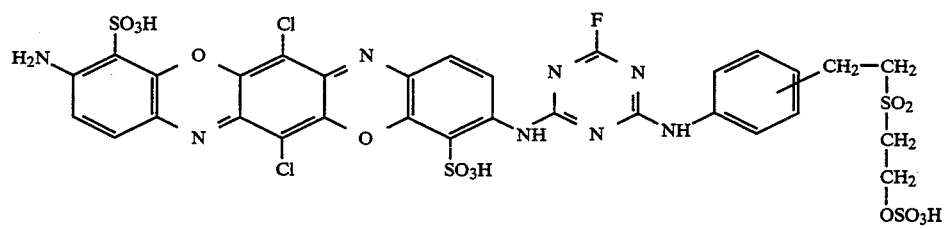

dyes cotton from a long liquor at an optimum dyeing temperature of 70° to 80° C. in strong reddish blue shades.

Further triphendioxazine reactive dyestuffs are prepared by a procedure analogous to that from Examples 219 and 220 by condensation of the following components:

| No. | Triphendioxazine | Trihalogenotriazine | β-Sulphatoethylsulphonylalkylaniline | Hue |
|---|---|---|---|---|
| 221 | | | | blue |
| 222 | | | | blue |
| 223 | | | | blue |
| 224 | | | | bluish red |
| 225 | | | | reddish blue |

EXAMPLE 226

35.2 g of the known compound

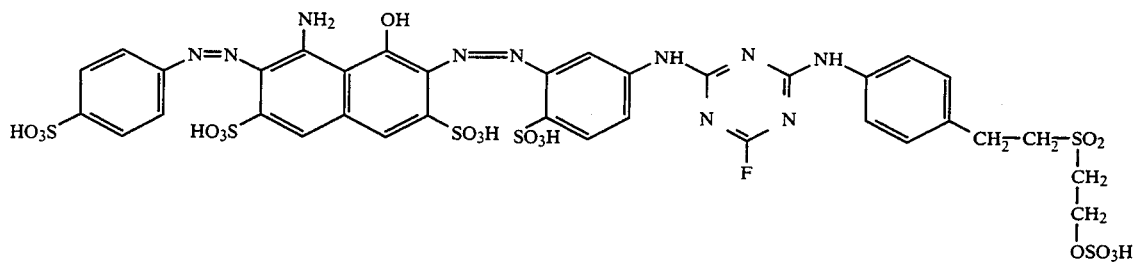

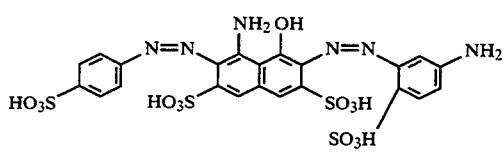

are dissolved in 350 ml of water, and the pH of the solution is brought to 5.0. The solution is cooled to 0° C., 7.4 g of cyanuric fluoride are added dropwise, and the pH is maintained at 4.5 with 2N sodium carbonate solution. After the reaction is complete, a neutralised solution of 17.0 g of the component from Example 79F in 70 ml of water is added, and the pH is maintained at 6.0 with 2N sodium carbonate solution, the temperature first being maintained at 0° to 5° C. for 4 hours and then being gradually increased to 20° C. After conclusion of the condensation, the dyestuff, after buffering to a pH of 6, is isolated either directly by spray-drying or by salting-out, filtering off with suction and vacuum-drying at 40° C. The dyestuff has the formula and dyes cotton by the dyeing techniques customary for reactive dyestuffs in navy hues and very high yields.

Further similar reactive dyestuffs dying cellulose fibres in navy to black are obtained by condensing the aminodisazo components, shown in the list below, of the general formula

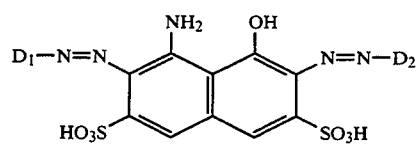

with the trihalogenotriazines and the β-sulphatoethylsulphonylalkylanilines.

| No. | Aminodiazo component | | Trihalogeno-triazine | β-sulphatoethylsulphonyl-alkylaniline | Hue |
|---|---|---|---|---|---|
| | $D_1$ | $D_2$ | | | |
| 227 | HO₃S—⟨⟩— | ⟨SO₃H⟩—NH₂ | cyanuric fluoride | NH₂—⟨SO₃H⟩—CH₂—CH₂—SO₂—CH₂—CH₂—OSO₃H | navy |
| 228 | H₂N—HO₃S—⟨⟩— | ⟨SO₃H⟩—NH₂ | cyanuric fluoride | NH₂—⟨SO₃H⟩—CH₂—CH₂—SO₂—CH₂—CH₂—OSO₃H | navy |
| 229 | ⟨SO₃H/HO₃S⟩— | ⟨SO₃H⟩—NH₂ | cyanuric fluoride | NH₂—⟨⟩—CH₂—CH₂—SO₂—CH₂—CH₂—OSO₃H | navy |

-continued

| No. | Aminodiazo component D$_1$ | D$_2$ | Trihalogeno-triazine | β-sulphatoethylsulphonyl-alkylaniline | Hue |
|---|---|---|---|---|---|
| 230 | 2-methyl-4-amino-benzenesulfonic acid (SO$_3$H ortho to CH$_3$, H$_2$N para) | 4-methyl-benzenesulfonic acid (SO$_3$H meta to CH$_3$) | cyanuric fluoride (2,4,6-trifluoro-1,3,5-triazine) | 4-amino-2-(3-sulphatopropylsulphonyl... )benzene with SO$_3$H; -CH$_2$-CH$_2$-CH$_2$-SO$_2$-CH$_2$-CH$_2$-OSO$_3$H | navy |
| 231 | 4-amino-toluene (H$_2$N-, CH$_3$-) | 2-methyl-benzene-1,4-disulfonic acid | cyanuric fluoride | 4-amino-phenyl-CH$_2$-CH$_2$-SO$_2$-CH$_2$-CH$_2$-OSO$_3$H | greenish black |
| 232 | 2-methyl-5-amino-benzenesulfonic acid | 2-methyl-benzene-1,4-disulfonic acid | cyanuric fluoride | 3-amino-phenyl-CH$_2$-CH$_2$-CH$_2$-SO$_2$-CH$_2$-CH$_2$-OSO$_3$H | navy |
| 233 | 2-methyl-benzene-1,4-disulfonic acid | 2-methyl-5-amino-benzenesulfonic acid | cyanuric fluoride | 4-amino-2-(SO$_3$H)-phenyl-CH$_2$-CH$_2$-SO$_2$-CH$_2$-CH$_2$-OSO$_3$H | navy |
| 234 | 3-methyl-benzenesulfonic acid | 2-methyl-5-amino-benzenesulfonic acid | cyanuric fluoride | 4-amino-phenyl-CH$_2$-CH$_2$-SO$_2$-CH$_2$-CH$_2$-OSO$_3$H | navy |
| 235 | 4-methyl-benzenesulfonic acid | 2-amino-4-methyl-benzene-1,5-disulfonic acid | cyanuric fluoride | 4-amino-2-(SO$_3$H)-phenyl-CH$_2$-CH$_2$-SO$_2$-CH=CH$_2$ | black |
| 236 | 4-methyl-benzene-1,3-disulfonic acid | 2-methyl-5-amino-benzenesulfonic acid | cyanuric fluoride | 4-(N-methylamino)-phenyl-CH$_2$-CH$_2$-SO$_2$-CH$_2$-CH$_2$-OSO$_3$H | navy |
| 237 | 2-methyl-naphthalene-1,5-disulfonic acid | 2-methyl-5-amino-benzenesulfonic acid | cyanuric fluoride | 4-amino-2-(SO$_3$H)-phenyl-CH$_2$-CH$_2$-SO$_2$-CH$_2$-CH$_2$-OSO$_3$H | black |

EXAMPLE 238

50 mmol of the known copper complex compound of the formula

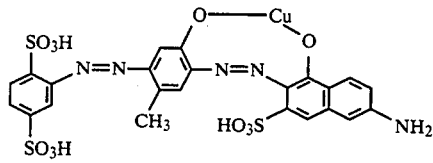

are dissolved in 600 ml of water at a pH of 6.5. The solution is cooled to 0°-3°, and 7.4 g of cyanuric fluoride are added dropwise over a few minutes. During the dropwise addition, the pH is maintained at 4.5-5.0 with 2N sodium carbonate solution. Stirring is continued for about a quarter of an hour, and a neutralised solution of 17.0 g of the compound of the formula

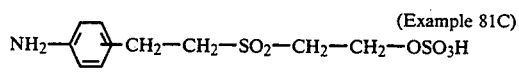
(Example 81C)

in 80 ml of water is added to the primary condensation product, and the pH of the reaction mixture is maintained at 5.0-6.0 with sodium carbonate solution. When consumption of sodium carbonate has gradually come to a standstill, the temperature is allowed to rise to 20°. After the reaction is complete, the dyestuff of the formula

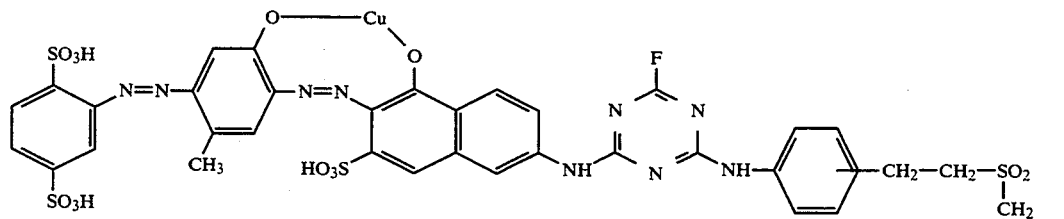

is salted out, isolated and, after buffering to a pH of 6, dried in vaco at 45°.

The product dyes cellulose fibres by the dyeing techniques customary for reactive dyestuffs in navy hues and very high fixation yields.

EXAMPLE 239

A neutralised solution of 24.7 g of the component of the formula

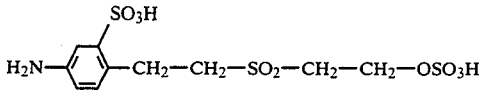

and 2.4 g of sodium fluoride in 100 ml of water is condensed analogously to Example 99 with 8.6 g of cyanuric fluoride.

The solution obtained is run in at 0°-2° C. to a neutral solution of 50 mmol of the known copper complex compound of the formula

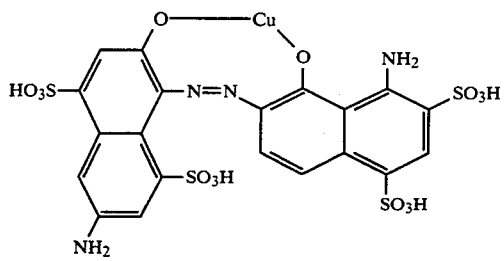

and the pH of the reaction mixture is maintained at 5-6 with 2N sodium carbonate solution. When absorption of sodium carbonate subsides after a few hours, the temperature is slowly raised to 20°.

After condensation is complete, the dyestuff of the formula

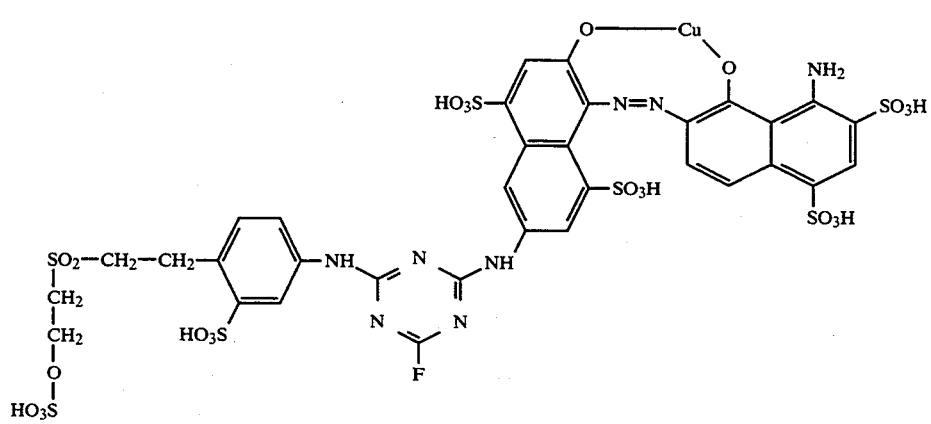

is salted out, isolated and dried at 45° C. in vacuo. It dyes cellulose fibres by the dyeing techniques customary for reactive dyestuffs in blue hues.

Further reactive dyestuffs which dye cotton by the customary dyeing techniques in very high yield are obtained by condensing the known copper complex compounds shown in the list below by the procedures described in Examples 238 or 239 with the trihalogenotriazines and the β-sulphatoethylsulphonylalkylanilines.

| No. | Copper complex compound | Trihalogeno-triazine | β-sulphatoethylsulphonyl-alkylaniline | Hue |
|---|---|---|---|---|
| 240 | | | | navy |
| 241 | | | | navy |
| 242 | | | | reddish navy |
| 243 | | | | navy |

-continued

| No. | Copper complex compound | Trihalogeno-triazine | β-sulphatoethylsulphonyl-alkylaniline | Hue |
|---|---|---|---|---|
| 244 | [structure] | [trifluorotriazine] | [structure] | navy |
| 245 | [structure] | [trifluorotriazine] | [structure] | dark blue |
| 246 | [structure] | [trifluorotriazine] | [structure] | green |

| No. | Copper complex compound | Trihalogeno-triazine | β-sulphatoethylsulphonyl-alkylaniline | Hue |
|---|---|---|---|---|
| 247 | (structure) | (trifluorotriazine) | (2-SO₃H, 4-NH₂ phenyl with –CH₂–CH₂–SO₂–CH₂–CH₂–OSO₃H) | red-violet |
| 248 | (structure) | (trifluorotriazine) | (3-NH₂ phenyl with –CH₂–CH₂–CH₂–SO₂–CH₂–CH₂–OSO₃H) | navy |
| 249 | (structure) | (trifluorotriazine) | (2-SO₃H, 4-NH₂ phenyl with –CH₂–CH₂–SO₂–CH₂–CH₂–OSO₃H) | blue-violet |

EXAMPLE 250

50 mmol of the 1:2 chromium complex of the formula

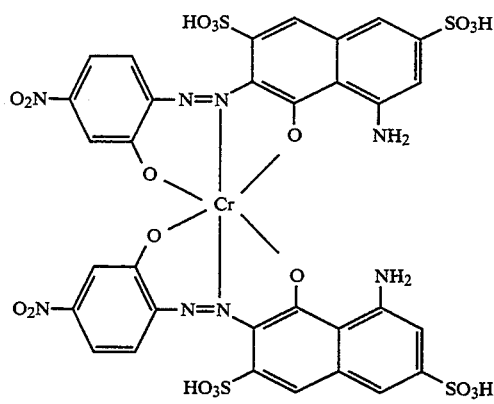

which can be obtained by coupling of diazotised 5-nitro-2-aminophenol with 1-amino-8-hydroxynaphthalene-3,6-disulphonic acid, followed by conversion into the 1:2 chromium complex, are dissolved in 750 parts of water at a pH of 7. To this solution is added a solution prepared by the procedure of Example 108 from 44.7 g of the component from Example 80 and 15.5 g of cyanuric fluoride and containing the compound

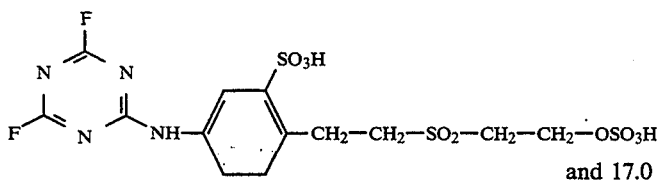

The pH is maintained at 6–6.5 and the temperature at 20°–25°. After condensation is complete, the reactive dyestuff formed is salted out, filtered off with suction and, after buffering to a pH of 6.5, gently dried in vacuo.

The dark powder obtained is used to dye cotton in greenish grey hues.

If a 1:1 mixture of the chromium complex and the corresponding cobalt complex is used instead of the abovementioned pure chromium complex, a dyestuff mixture is isolated which dyes cotton in neutral grey or black hues having good lightfastness properties.

EXAMPLE 251

50 mmol of the cobalt complex of the formula

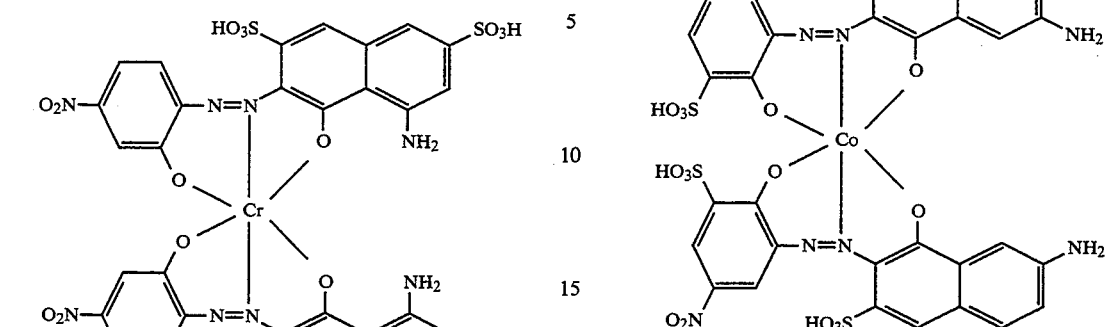

are dissolved in 800 parts by volume of water at a pH of 6, and the solution is cooled to 0°–5°. 14.9 g of cyanuric fluoride are added dropwise with vigorous stirring, and the pH is maintained at 4.5–5.0 with 2N sodium carbonate solution. After primary condensation is complete, a neutral solution is added which contains 21.4 g of the component (Example 80)

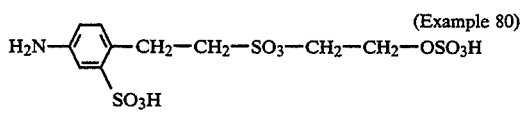

and 17.0 g of the component of the formula (Example 81C)

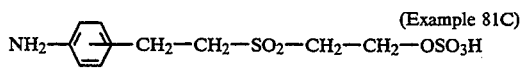

in 150 mol of water. The pH is maintained at 5.5–6.0, and the temperature is allowed to rise to 20° after 2 hours. When condensation is complete, the reactive dyestuff obtained is salted out, filtered off with suction and dried in vacuo at 45°. The powder obtained dyes cotton by the techniques customary for reactive dyestuffs in brown hues having good lightfastness properties and in high yield.

EXAMPLE 252

50 mmol of the triphendioxazine compound of the formula

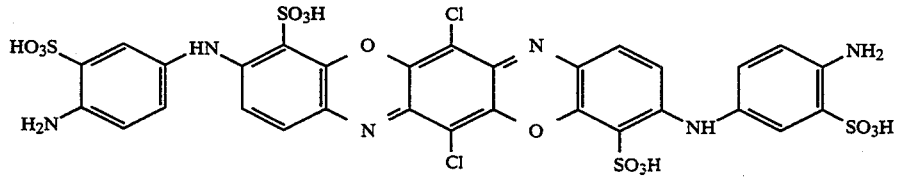

are dissolved in 900 ml of water at a pH of 6. 14.9 g of cyanuric fluoride are added dropwise to the solution at 0°–3°, and the pH is maintained at 4.5–5.0 with 2N sodium carbonate solution.

After stirring is continued for a short period, a neutral solution of 42.8 g of the component from Example 80 in 160 ml of water is added to the primary condensation product, and the pH is maintained at 6.0. After the condensation has gone to completion by gradually increasing the temperature to 20°, the dyestuff of the formula

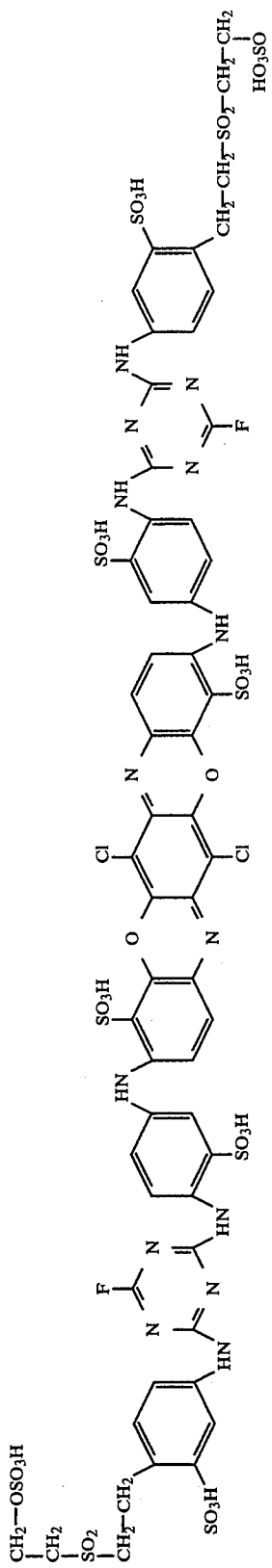

EXAMPLE 253

21.9 g of 1-(4-benzoylamino)-8-hydroxynaphthalene-3,6-disulphonic acid are dissolved in 250 ml of water at a pH of 5.5 After cooling of the solution to 0°–3°, 7.1 g of cyanuric fluoride are swiftly added dropwise, and the pH of the reaction mixture is maintained at 4.5 with dilute sodium carbonate solution. After stirring is continued for a short period, a neutral solution of 16.3 g, cooled to 0°, of the component from Example 81C in 80 ml of water is added, and the pH is maintained at 5.5–6.0 overnight. After condensation is complete, a diazonium salt suspension is added which was obtained in the usual manner by diazotisation of 8.7 g of 2-aminobenzenesulphonic acid, and the coupling reaction is completed at a pH of 6.5–7 by addition of sodium carbonate and initially at 0° for several hours, later increasing to 20°. The dyestuff obtained of the formula

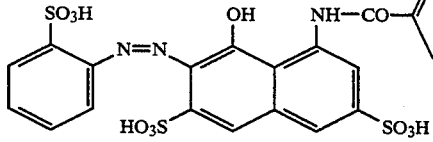

is isolated and dried. It produces, from a long liquor, strong red dyeings on cotton which have good light and wet fastness.

EXAMPLE 254

25.7 g of the triazole of the formula

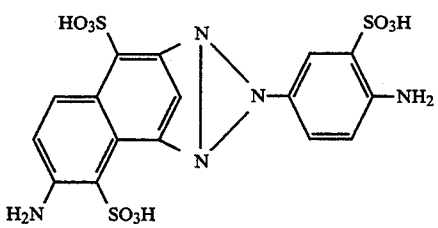

prepared by the procedure given in European Patent 0,013,879, are dissolved in 700 ml of water at a pH of 6.5. The solution is cooled to 0°, and 6.9 g of cyanuric fluoride are slowly added dropwise. The pH is maintained at 6.0–6.5 with sodium bicarbonate solution. When the reaction is complete after a few minutes, a neutral, cooled solution of 20.2 g of the component from Example 80 in 80 ml of water is added, and the pH is further maintained at 6.5 with sodium carbonate solution.

After 2 hours, the temperature is allowed to rise to 20°. 3.7 g of sodium nitrite are added, and the mixture is run into 20 ml of 28% strength hydrochloric acid. After one hour of after-reaction, any excess nitrous acid present is destroyed with sulphamic acid. 6.5 g of barbituric acid are then sprinkled in, and the coupling reaction is carried out first at a pH of 5 by addition of sodium acetate and later at a pH of 5.5–6 using sodium carbonate. After coupling is complete, the dyestuff is isolated and dried at 40° in vacuo. It has the formula

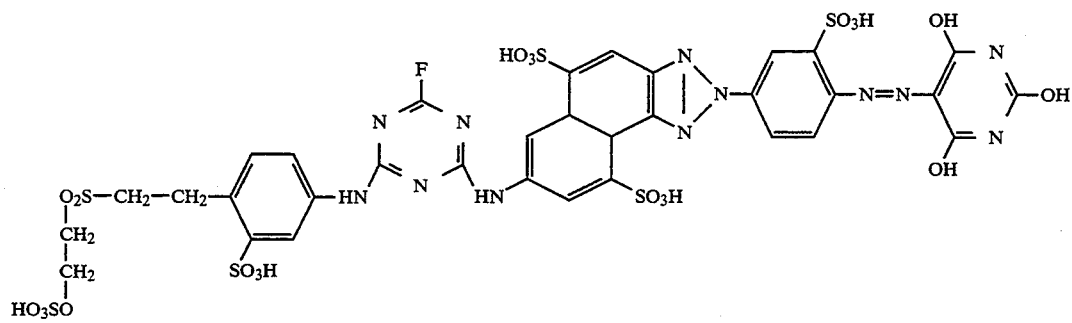

and dyes cotton in brilliant yellow shades.

Similar yellow dyestuffs are obtained by using the following coupling components instead of barbituric acid:

2,6-Dihydroxypyridine-4-carboxylic acid
1-(4-Sulphophenyl)-3-methyl-5-pyrazolone
1-(4-Sulphophenyl)-5-pyrazolone-3-carboxylic acid
1,4-Dimethyl-2-hydroxy-6-pyridone-5-carboxamide
1,4-Dimethyl-2-hydroxy-3-sulphomethylene-6-pyridone-5-carboxamide
N-(2'-Methoxy-5'-methyl-4'-sulphophenyl)acetoacetamide
N-(2',5'-Dimethoxy-4'-sulphophenyl)acetoacetamide
1-Phenyl-3-methyl-5-aminopyrazole
1-(6,8-Disulpho-2-naphthyl)-3-methyl-5-pyrazolone
1,4-Dimethyl-2-hydroxy-5-cyano-6-pyridone.

Further yellow dyestuffs are obtained by using the sulphatoethyl sulphone component from Example 81C instead of that from Example 80.

EXAMPLE 255

3.0 g of pyridine-3-carboxylic acid are added after the coupling reaction to a dyestuff solution synthesised according to Example 76. The solution is heated to 75° to 80° C. and the pH is maintained at 7.0 using 2N sodium carbonate solution until the exchange of the fluorine atom for the nicotinic acid radical is complete.

After cooling, the dyestuff can be salted out or the solution, after desalting and concentrating, can be used as a liquid dyestuff.

The dyestuff has the formula

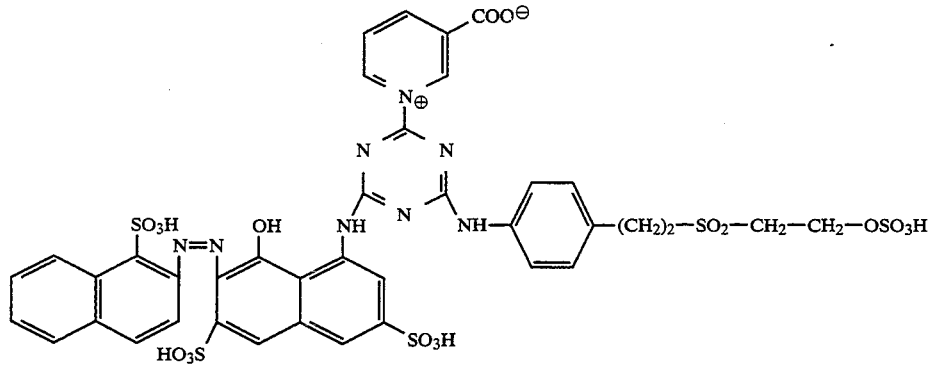

and dyes cotton from a long liquor similar to the dyestuff from Example 76.

Similarly, the other fluorotriazine dyestuffs described in the previous examples can also be converted into the 3-carboxypyridiniumtriazine dyestuff.

We claim:

1. A reactive dyestuff of the formula:

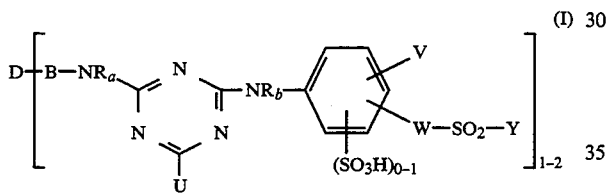

in which

B represents a direct bond or a bridging member on a ring C atom of an aromatic-carbocyclic ring or on a ring C atom or N atom of an aromatic-heterocyclic ring in D;

$R_a$ and $R_b$ are identical or different and represent H, $C_{1-4}$-alkyl or $C_{1-4}$-alkyl substituted by OH, CN, COOH, $OSO_3H$ or $SO_3H$;

Y represents $CH=CH_2$ or $CH_2-CH_2-X$;

V represents H, halogen, $C_{1-4}$-alkoxy, $C_{1-3}$-alkyl, CN, COOH, $CONH_2$ or $SO_3H$;

D represents the radical of a dyestuff from the formazan, phthalocyanine, anthraquinone or triphendioxazine series;

U represents Cl or F;

W represents $C_{1-4}$-alkylene; and

X represents $OSO_3H$, Cl, Br or F.

2. A reactive dyestuff according to claim 1, wherein:

$R_a$ represents H or $C_{1-2}$-alkyl;

$R_b$ represents H, $C_{1-3}$-alkyl, β-hydroxyethyl, β-sulphatoethyl, β-carboxyethyl, β-cyanoethyl or carboxymethyl;

W represents $CH_2$, $C_2H_4$, $-CH_2-CH(CH_3)-$ or $-(CH_2)_3-$;

Y represents $CH=CH_2$ or $CH_2-CH_2-X$;

X represents $OSO_3H$ or Cl; and

V represents H, $C_{1-2}$-alkoxy, $C_{1-2}$-alkyl, COOH or $SO_3H$.

3. A reactive dyestuff according to claim 1, which has one of the following formulas:

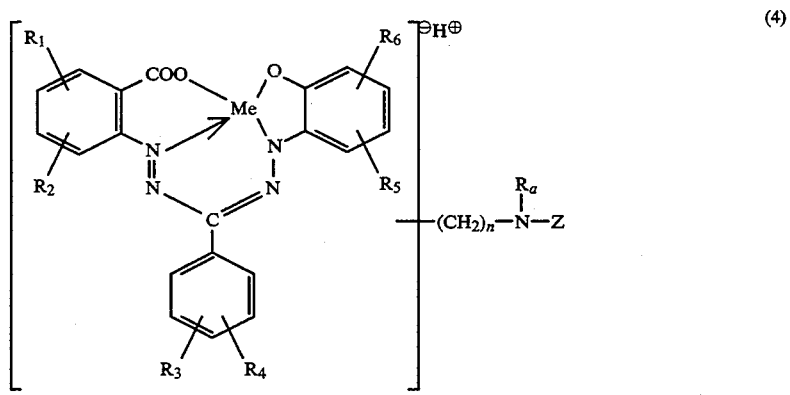

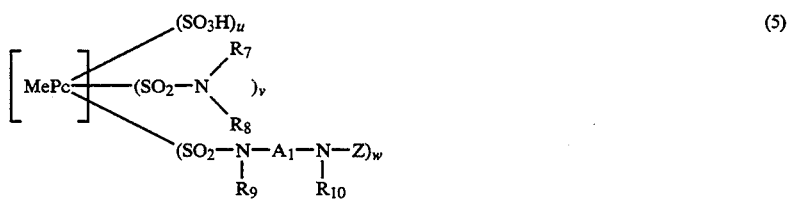

-continued

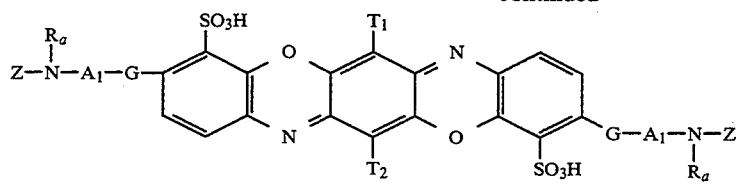
(6)

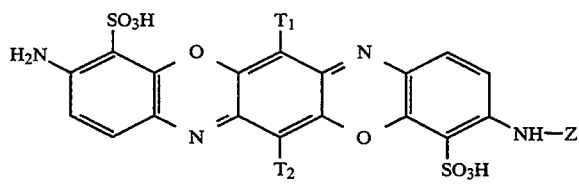
(7)

or

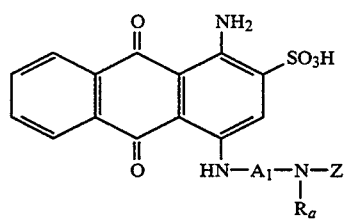
(8)

in which
$R_8$ represents H or $C_{1-2}$-alkyl;
Pc represents a phthalocyanine ring;
Me represents a divalent metal ion;
n represents 0 or 1;
u+v+w is 3–4, with the proviso that
  w is 0.8–2.0,
  v is 0–1.0, and
  u is 1.0–3.0,
$A_1$ represents an aliphatic, araliphatic or aromatic bridging member;
G represents O or N-$R_{11}$;
$R_{11}$ represents H, $C_{1-2}$-alkyl, and, if $A_1$ is $C_2$-alkylene, $R_{11}$ together with $R_a$ can join to form a ring;
$T_1$ and $T_2$ represent H, chlorine, bromine, $C_{1-4}$-alkyl, $C_{1-4}$-alkoxy or acylamino;
$R_1$–$R_6$ independently represent H, $C_{1-4}$-alkyl, $C_{1-4}$-alkoxy, hydroxyl, halogen, carboxyl, sulphonamido, alkyl- or arylcarbonylamino or- sulphonylamino, β-sulphatoethylsulphonyl or $SO_3H$, carboxymethyl or carboxyethyl;
$R_7$–$R_{10}$ independently represent H, $C_{1-2}$-alkyl, which is unsubstituted or substituted by hydroxyl, carboxyl or sulphonyl, and $R_9$ and $R_{10}$ can also be joined to form a ring if A is $C_2$-alkylene;

Z represents a radical of the formula:

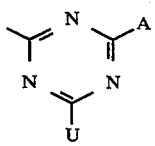
(2a)

U represents Cl or F;
A represents a radical of the formula:

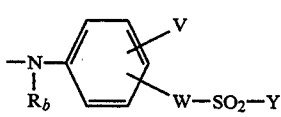
(3a)

W represents $CH_2$, $C_2H_4$, —$CH_2$—$CH(CH_3)$— or —$(CH_2)_3$—;
Y represents $CH=CH_2$ or $CH_2$—$CH_2$—X;
V represents H, $C_{1-2}$-alkoxy, $C_{1-2}$-alkyl, COOH or $SO_3H$; and
$R_b$ represents H, $CH_3$, $C_2H_5$, i—$C_3H_7$, n—$C_3H_7$, $C_2H_4OH$, carboxymethyl or carboxyethyl.

4. A reactive dyestuff according to claim 1, which has the formula:

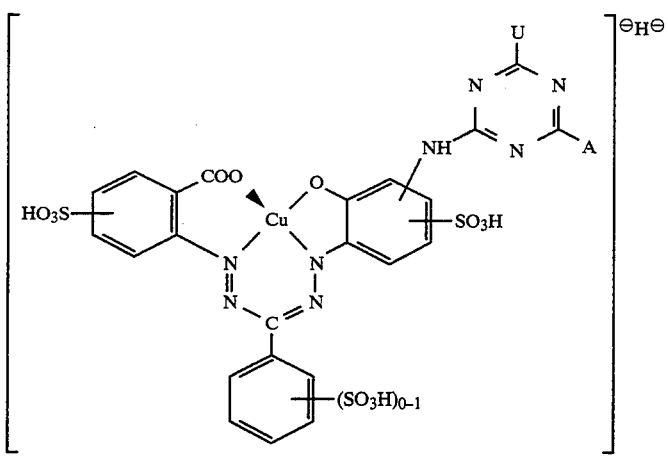

in which
A represents

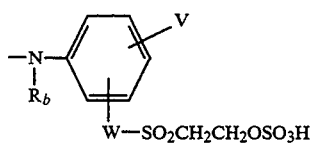

in which

W represents CH₂, C₂H₄, —CH₂—CH(CH₃)— or —(CH₂)₃—;

V represents H, $C_{1-2}$-alkoxy, $C_{1-2}$-alkyl, COOH or SO₃H; and $R_b$ represents H, CH₃, C₂H₅, i—C₃H₇, n—C₃H₇, C₂H₄OH, carboxymethyl or carboxyethyl.

5. An azo-dyestuff selected from the group of compounds having one of the formulas 18–21 and 24–28:

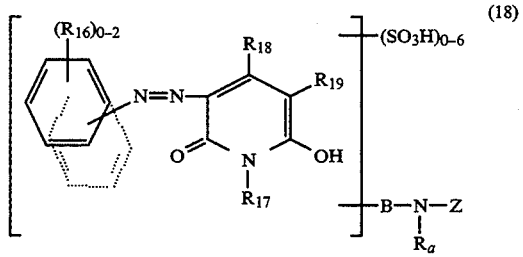
(18)

wherein
$R_{16}$ represents alkyl, alkoxy or halogen;
$R_{17}$ represents H, alkyl, aralkyl or aryl;
$R_{18}$ represents alkyl, aryl, aralkyl or hetaryl; and
$R_{19}$ represents H, CN, CH₂—SO₃H, SO₃H or CONH₂;

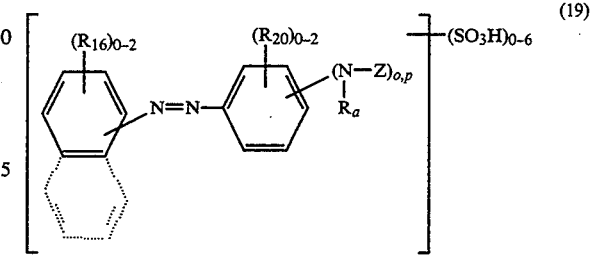
(19)

wherein
$R_{16}$ represents alkyl, alkoxy or halogen;
$R_{20}$ represents alkyl, alkoxy, acylamino or amino; and
o, p indicates ortho or para position bonding relative to the azo group;

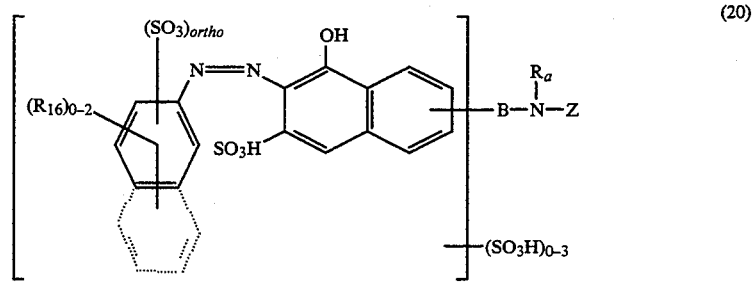
(20)

or

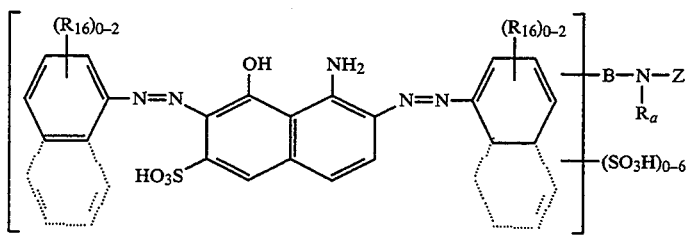

wherein
R$_{16}$ represents alkyl, alkoxy or halogen;

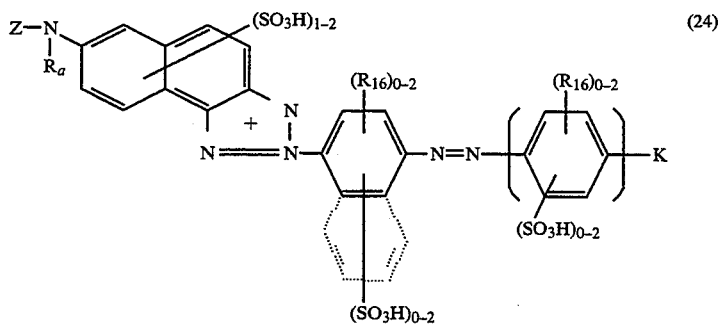
(24)

wherein
R$_{16}$ represents alkyl, alkoxy or halogen; and
K represents the radical of a coupling component;

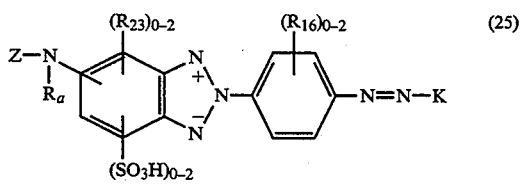
(25)

wherein
R$_{23}$ represents alkyl or halogen;
R$_{16}$ represents alkyl or alkoxy; and
K represents the radical of a coupling component;

(26)

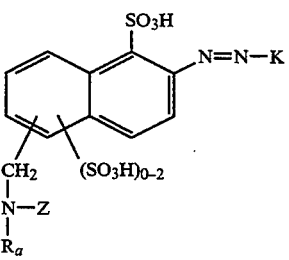

wherein
K represents the radical of a coupling component;

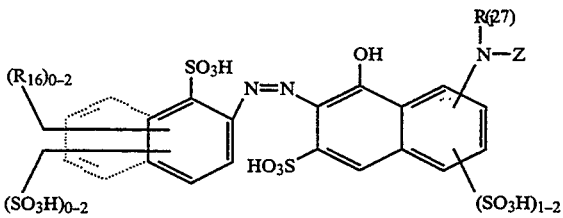

wherein
R$_{16}$ represents alkyl, alkoxy or arylamino; and

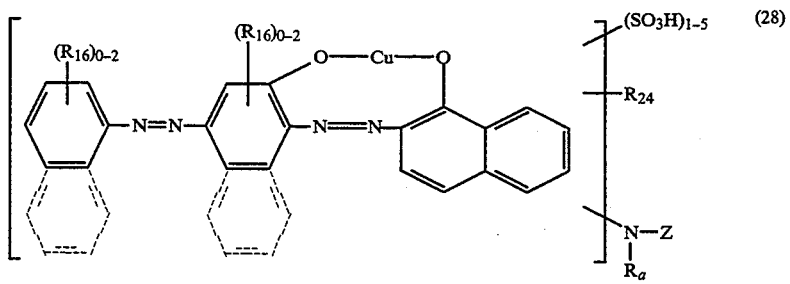
(28)

wherein
R$_{16}$ represents alkyl or alkoxy;
R$_{24}$ represents H, NH$_2$ or arylamino;

$R_a$ represents H or $C_{1-2}$-alkyl;

B represents a direct bond or a bridging member on a ring C atom of an aromatic-carbocyclic ring or on a ring C atom or N atom of an aromatic-heterocyclic ring in D;

Z represents a radical of the formula:

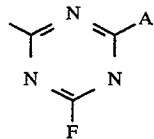

in which

A represents

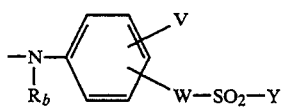

in which

W represents $C_2H_4$, $-CH_2-CH(CH_3)-$ or $-(CH_2)_3-$;

Y represents $CH=CH_2$ or $CH_2-CH_2-X$;

X represents $OSO_3H$ or Cl;

V represents H, $C_{1-2}$-alkoxy, $C_{1-2}$-alkyl, COOH or $SO_3H$; and $R_b$ represents H, $CH_3$, $C_2H_5$, i—$C_3H_7$, n—$C_3H_7$, $C_2H_4OH$, carboxymethyl or carboxyethyl.

6. A reactive dyestuff according to claim 5, wherein in formulas 24–26, K is the radical of a coupling component selected from the group consisting of coupling components from the pyridone, pyrazolone, aceto acid arylide and naphthosulphonic acid series.

7. A process for the dyeing of cellulose and/or polyamide-containing materials comprising applying to said materials a reactive dyestuff according to claim 1.

8. The process according to claim 7, wherein said reactive dyestuff is applied to said materials in admixture with other dyestuffs for trichromatic dyeing.

9. A process for the dyeing of cellulose and/or polyamide-containing materials comprising applying to said materials a reactive dyestuff according to claim 5.

10. The process according to claim 9, wherein said reactive dyestuff is applied to said materials in admixture with other dyestuffs for trichromatic dyeing.

* * * * *